United States Patent
Yeung et al.

(10) Patent No.: US 12,065,968 B2
(45) Date of Patent: *Aug. 20, 2024

(54) SYSTEMS AND METHODS FOR HYDRAULIC FRACTURING

(71) Applicant: BJ Energy Solutions, LLC, The Woodlands, TX (US)

(72) Inventors: Tony Yeung, The Woodlands, TX (US); Ricardo Rodriguez-Ramon, The Woodlands, TX (US); Diankui Fu, The Woodlands, TX (US); Heber Martinez-Barron, The Woodlands, TX (US); Guillermo Rodriguez, The Woodlands, TX (US); Samir Nath Seth, The Woodlands, TX (US); Joseph Foster, The Woodlands, TX (US); Warren Zemlak, The Woodlands, TX (US); Nicholas Tew, The Woodlands, TX (US)

(73) Assignee: BJ Energy Solutions, Inc., The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,207

(22) Filed: Apr. 5, 2023

(65) Prior Publication Data

US 2023/0296050 A1 Sep. 21, 2023

Related U.S. Application Data

(60) Continuation-in-part of application No. 18/148,209, filed on Dec. 29, 2022, now Pat. No. 11,649,766, (Continued)

(51) Int. Cl.
| | | |
|---|---|---|
| B01D 46/42 | (2006.01) | |
| B01D 46/58 | (2022.01) | |

(Continued)

(52) U.S. Cl.
CPC .......... *F02C 7/052* (2013.01); *B01D 46/4263* (2013.01); *B01D 46/58* (2022.01);
(Continued)

(58) Field of Classification Search
CPC .............. B01D 46/002; B01D 46/4263; B01D 2279/60; F02C 6/00; F02C 7/042; F02C 7/052
(Continued)

(56) References Cited

U.S. PATENT DOCUMENTS

| | | | |
|---|---|---|---|
| 1,716,049 A | 6/1929 | Greve | |
| 1,726,633 A | 9/1929 | Smith | |

(Continued)

FOREIGN PATENT DOCUMENTS

| | | |
|---|---|---|
| AU | 9609498 | 7/1999 |
| AU | 737970 | 9/2001 |

(Continued)

OTHER PUBLICATIONS

US 11,555,493 B2, 01/2023, Chang et al. (withdrawn)
(Continued)

*Primary Examiner* — Minh Chau T Pham
(74) *Attorney, Agent, or Firm* — Norton Rose Fulbright US LLP

(57) ABSTRACT

An embodiment of a pumping unit includes a gas turbine engine, an enclosure housing the engine, an exhaust assembly connected to the engine, an air intake duct connected to the engine, and an air treatment system connected to the air intake duct. The air treatment system including one or more inlet pre-cleaners configured to eject debris. Each of the inlet pre-cleaners having a cylindrical tubular portion configured to channel air toward the air intake duct. In addition, the pumping unit includes a gearbox operatively coupled to the engine and a drive shaft having a first end operatively (Continued)

coupled to the gearbox. Further, the pumping unit includes a pump comprising an input shaft operatively coupled to a second end of the drive shaft, wherein the engine, the gearbox, the drive shaft, and the pump are disposed along a longitudinal axis of the pumping unit.

23 Claims, 58 Drawing Sheets

Related U.S. Application Data which is a continuation of application No. 17/954,118, filed on Sep. 27, 2022, now Pat. No. 11,598,263, which is a continuation of application No. 17/403,373, filed on Aug. 16, 2021, now Pat. No. 11,560,845, which is a continuation of application No. 17/326,711, filed on May 21, 2021, now Pat. No. 11,156,159, which is a continuation of application No. 17/213,802, filed on Mar. 26, 2021, now Pat. No. 11,060,455, which is a continuation of application No. 16/948,289, filed on Sep. 11, 2020, now Pat. No. 11,002,189, application No. 18/131,207 is a continuation-in-part of application No. 17/676,949, filed on Feb. 22, 2022, which is a division of application No. 17/519,827, filed on Nov. 5, 2021, now Pat. No. 11,415,056, which is a continuation of application No. 17/502,120, filed on Oct. 15, 2021, now Pat. No. 11,560,848, which is a continuation of application No. 17/498,916, filed on Oct. 12, 2021, now Pat. No. 11,459,954, which is a continuation of application No. 17/182,325, filed on Feb. 23, 2021, now Pat. No. 11,242,802, which is a continuation of application No. 16/948,290, filed on Sep. 11, 2020, now Pat. No. 10,961,914, application No. 18/131,207 is a continuation-in-part of application No. 18/108,821, filed on Feb. 13, 2023, which is a continuation of application No. 17/585,766, filed on Jan. 27, 2022, now Pat. No. 11,719,234, which is a continuation of application No. 17/469,970, filed on Sep. 9, 2021, now Pat. No. 11,280,331, which is a continuation of application No. 17/363,151, filed on Jun. 30, 2021, now Pat. No. 11,149,726, which is a continuation of application No. 17/213,562, filed on Mar. 26, 2021, now Pat. No. 11,092,152, which is a continuation of application No. 16/948,291, filed on Sep. 11, 2020, now Pat. No. 11,015,594, application No. 18/131,207 is a continuation-in-part of application No. 18/116,383, filed on Mar. 2, 2023, now Pat. No. 11,859,482, which is a continuation of application No. 17/976,095, filed on Oct. 28, 2022, now Pat. No. 11,629,584, which is a continuation of application No. 17/555,815, filed on Dec. 20, 2021, now Pat. No. 11,530,602, which is a continuation of application No. 17/203,002, filed on Mar. 16, 2021, now Pat. No. 11,236,739, which is a division of application No. 16/946,079, filed on Jun. 5, 2020, now Pat. No. 10,989,180, application No. 18/131,207 is a continuation-in-part of application No. 18/147,880, filed on Dec. 29, 2022, now Pat. No. 11,655,763, which is a continuation of application No. 17/936,885, filed on Sep. 30, 2022, now Pat. No. 11,578,660, which is a continuation of application No. 17/883,693, filed on Aug. 9, 2022, now Pat. No. 11,512,642, which is a continuation of application No. 17/808,792, filed on Jun. 24, 2022, now Pat. No. 11,473,503, which is a continuation of application No. 17/720,390, filed on Apr. 14, 2022, now Pat. No. 11,401,865, which is a continuation of application No. 17/671,734, filed on Feb. 15, 2022, now Pat. No. 11,346,280, which is a continuation of application No. 17/204,338, filed on Mar. 17, 2021, now Pat. No. 11,319,878, which is a continuation of application No. 17/154,601, filed on Jan. 21, 2021, now Pat. No. 10,982,596, which is a division of application No. 17/122,433, filed on Dec. 15, 2020, now Pat. No. 10,961,912, which is a division of application No. 15/929,924, filed on May 29, 2020, now Pat. No. 10,895,202.

(60) Provisional application No. 62/704,560, filed on May 15, 2020, provisional application No. 62/704,567, filed on May 15, 2020, provisional application No. 62/704,565, filed on May 15, 2020, provisional application No. 62/899,971, filed on Sep. 13, 2019, provisional application No. 62/900,291, filed on Sep. 13, 2019, provisional application No. 62/899,963, filed on Sep. 13, 2019, provisional application No. 62/899,975, filed on Sep. 13, 2019, provisional application No. 62/899,957, filed on Sep. 13, 2019.

(51) Int. Cl.
*F02C 6/00* (2006.01)
*F02C 7/042* (2006.01)
*F02C 7/052* (2006.01)
*F02C 7/143* (2006.01)

(52) U.S. Cl.
CPC ............... *F02C 6/00* (2013.01); *F02C 7/042* (2013.01); *F02C 7/143* (2013.01); *B01D 2279/60* (2013.01)

(58) Field of Classification Search
USPC ........ 55/490.1, 410, 385.1, 473, 482.1, 486, 55/505; 95/8, 10, 14, 273; 96/189
See application file for complete search history.

(56) References Cited

U.S. PATENT DOCUMENTS

| | | |
|---|---|---|
| 2,178,662 A | 11/1939 | Lars |
| 2,427,638 A | 9/1947 | Vilter |
| 2,498,229 A | 2/1950 | Adler |
| 2,535,703 A | 12/1950 | Smith et al. |
| 2,572,711 A | 10/1951 | Fischer |
| 2,820,341 A | 1/1958 | Amann |
| 2,868,004 A | 1/1959 | Runde |
| 2,940,377 A | 6/1960 | Darnell et al. |
| 2,947,141 A | 8/1960 | Russ |
| 2,956,738 A | 10/1960 | Rosenschold |
| 3,068,796 A | 12/1962 | Pfluger et al. |
| 3,191,517 A | 6/1965 | Solzman |
| 3,257,031 A | 6/1966 | Dietz |
| 3,274,768 A | 9/1966 | Klein |
| 3,378,074 A | 4/1968 | Kiel |
| 3,382,671 A | 5/1968 | Ehni, III |
| 3,401,873 A | 9/1968 | Privon |
| 3,463,612 A | 8/1969 | Whitsel |
| 3,496,880 A | 2/1970 | Wolff |
| 3,550,696 A | 12/1970 | Kenneday |
| 3,560,053 A | 2/1971 | Ortloff |
| 3,586,459 A | 6/1971 | Zerlauth |
| 3,632,222 A | 1/1972 | Cronstedt |
| 3,656,582 A | 4/1972 | Alcock |
| 3,667,868 A | 6/1972 | Brunner |
| 3,692,434 A | 9/1972 | Schnear |
| 3,739,872 A | 6/1973 | McNair |
| 3,757,581 A | 9/1973 | Mankin |
| 3,759,063 A | 9/1973 | Bendall |
| 3,765,173 A | 10/1973 | Harris |
| 3,771,916 A | 11/1973 | Flanigan et al. |

(56) References Cited

U.S. PATENT DOCUMENTS

| | | |
|---|---|---|
| 3,773,438 A | 11/1973 | Hall et al. |
| 3,781,135 A | 12/1973 | Nickell |
| 3,786,835 A | 1/1974 | Finger |
| 3,791,682 A | 2/1974 | Mitchell |
| 3,796,045 A | 3/1974 | Foster |
| 3,814,549 A | 6/1974 | Cronstedt |
| 3,820,922 A | 6/1974 | Buse et al. |
| 3,847,511 A | 11/1974 | Cole |
| 3,866,108 A | 2/1975 | Yannone |
| 3,875,380 A | 4/1975 | Rankin |
| 3,963,372 A | 6/1976 | McLain et al. |
| 4,010,613 A | 3/1977 | McInerney |
| 4,019,477 A | 4/1977 | Overton |
| 4,031,407 A | 6/1977 | Reed |
| 4,050,862 A | 9/1977 | Buse |
| 4,059,045 A | 11/1977 | McClain |
| 4,086,976 A | 5/1978 | Holm et al. |
| 4,117,342 A | 9/1978 | Melley, Jr. |
| 4,173,121 A | 11/1979 | Yu |
| 4,204,808 A | 5/1980 | Reese et al. |
| 4,209,079 A | 6/1980 | Marchal et al. |
| 4,209,979 A | 7/1980 | Woodhouse et al. |
| 4,222,229 A | 9/1980 | Uram |
| 4,239,396 A | 12/1980 | Arribau et al. |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,430,047 A | 2/1984 | Ilg |
| 4,442,665 A | 4/1984 | Fick |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,620,330 A | 11/1986 | Izzi, Sr. |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,032,065 A | 7/1991 | Yamamuro |
| 5,135,361 A | 8/1992 | Dion |
| 5,167,493 A | 12/1992 | Kobari |
| 5,245,970 A | 9/1993 | Iwaszkiewicz et al. |
| 5,291,842 A | 3/1994 | Sallstrom et al. |
| 5,326,231 A | 7/1994 | Pandeya |
| 5,362,219 A | 11/1994 | Paul et al. |
| 5,511,956 A | 4/1996 | Hasegawa |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,634,777 A | 6/1997 | Albertin |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,761,084 A | 6/1998 | Edwards |
| 5,811,676 A | 9/1998 | Spalding et al. |
| 5,839,888 A | 11/1998 | Harrison |
| 5,846,062 A | 12/1998 | Yanagisawa et al. |
| 5,875,744 A | 3/1999 | Vallejos |
| 5,983,962 A | 11/1999 | Gerardot |
| 5,992,944 A | 11/1999 | Hara |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,388,317 B1 | 5/2002 | Reese |
| 6,401,472 B2 | 6/2002 | Pollrich |
| 6,530,224 B1 | 3/2003 | Conchieri |
| 6,543,395 B2 | 4/2003 | Green |
| 6,655,922 B1 | 12/2003 | Flek |
| 6,669,453 B1 | 12/2003 | Breeden |
| 6,765,304 B2 | 7/2004 | Baten et al. |
| 6,786,051 B2 | 9/2004 | Kristich et al. |
| 6,832,900 B2 | 12/2004 | Leu |
| 6,851,514 B2 | 2/2005 | Han et al. |
| 6,859,740 B2 | 2/2005 | Stephenson et al. |
| 6,901,735 B2 | 6/2005 | Lohn |
| 6,962,057 B2 | 11/2005 | Kurokawa et al. |
| 7,007,966 B2 | 3/2006 | Campion |
| 7,047,747 B2 | 5/2006 | Tanaka |
| 7,065,953 B1 | 6/2006 | Kopko |
| 7,143,016 B1 | 11/2006 | Discenzo et al. |
| 7,222,015 B2 | 5/2007 | Davis et al. |
| 7,281,519 B2 | 10/2007 | Schroeder |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,167,980 B2 | 5/2012 | Hiner et al. |
| 8,186,334 B2 | 5/2012 | Ooyama |
| 8,196,555 B2 | 6/2012 | Keda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 * | 4/2013 | Raje ............... B01D 46/4218 55/486 |
| 8,469,826 B2 | 6/2013 | Brosowske |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |

(56) References Cited

U.S. PATENT DOCUMENTS

| | | |
|---|---|---|
| 8,673,040 B2 | 3/2014 | Handley et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,840,364 B2 | 9/2014 | Warton et al. |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,845,730 B2 | 12/2017 | Betti et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,648,531 B2 | 5/2020 | Maienschein et al. |

(56) References Cited

U.S. PATENT DOCUMENTS

| | | |
|---|---|---|
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,225 B2 | 11/2020 | Repaci |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1* | 1/2021 | Yeung .................. F02C 7/20 |
| 10,900,475 B2 | 1/2021 | Weightman et al. |
| 10,907,459 B1 | 2/2021 | Yeung et al. |
| 10,907,698 B2 | 2/2021 | Moreno Castro |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1* | 3/2021 | Yeung .................. F04B 53/22 |
| 10,961,914 B1* | 3/2021 | Yeung .................. F01D 25/30 |
| 10,961,993 B1 | 3/2021 | Ji et al. |
| 10,961,995 B2 | 3/2021 | Mayorca |
| 10,892,596 B2 | 4/2021 | Yeung et al. |
| 10,968,837 B1 | 4/2021 | Yeung et al. |
| 10,982,523 B1 | 4/2021 | Hill et al. |
| 10,982,596 B1* | 4/2021 | Yeung .................. F02C 7/32 |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2* | 5/2021 | Yeung .................. B01D 46/58 |
| 11,008,950 B1 | 5/2021 | Ethier et al. |
| 11,014,444 B2 | 5/2021 | Wetzel |
| 11,015,423 B1 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1* | 7/2021 | Yeung .................. F02C 7/042 |
| 11,066,915 B1 | 7/2021 | Yeung et al. |
| 11,068,455 B2 | 7/2021 | Shabi et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B2 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1* | 10/2021 | Yeung .................. F02C 7/143 |
| 11,168,681 B2 | 11/2021 | Boguski |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Yeung et al. |
| 11,205,881 B2 | 12/2021 | Yeung et al. |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 | 2/2022 | Yeung et al. |
| 11,242,737 B2 | 2/2022 | Zhang et al. |
| 11,242,802 B2* | 2/2022 | Yeung .................. F02C 6/00 |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,280,331 B2* | 3/2022 | Yeung .................. F16F 15/12 |
| 11,306,835 B1 | 4/2022 | Dille et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,415,056 B1* | 8/2022 | Yeung .................. F02C 7/24 |
| 11,428,165 B2 | 8/2022 | Yeung et al. |
| 11,441,483 B2 | 9/2022 | Li et al. |
| 11,448,122 B2 | 9/2022 | Feng et al. |
| 11,459,954 B2* | 10/2022 | Yeung .................. F01D 25/30 |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2* | 1/2023 | Yeung .................. B01D 46/58 |
| 11,560,848 B2* | 1/2023 | Yeung .................. F01D 25/30 |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2* | 3/2023 | Yeung .................. F02C 7/143 |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,589 B2 | 4/2023 | Lin et al. |
| 11,649,766 B1* | 5/2023 | Griffin .................. F02C 6/00 62/317 |
| 11,655,763 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 11,767,791 B2 | 9/2023 | Yeung et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |

(56) References Cited

U.S. PATENT DOCUMENTS

| | | |
|---|---|---|
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0083419 A1 | 4/2011 | Upadhyay et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0023973 A1 | 2/2012 | Mayorca |
| 2012/0048242 A1 | 3/2012 | Surnilla et al. |
| 2012/0085541 A1 | 4/2012 | Love et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324843 A1 | 12/2012 | Saraswathi et al. |
| 2012/0324903 A1 | 12/2012 | Dewis et al. |
| 2013/0068307 A1 | 3/2013 | Hains et al. |
| 2013/0087045 A1* | 4/2013 | Sullivan ............ F28F 13/14 |
| | | 55/490.1 |
| 2013/0087945 A1 | 4/2013 | Kusters et al. |
| 2013/0134702 A1 | 5/2013 | Boraas et al. |
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251129 A1 | 9/2014 | Upadhyay et al. |
| 2014/0251143 A1 | 9/2014 | Hawkinson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0007720 A1 | 1/2015 | Vu et al. |
| 2015/0027730 A1 | 1/2015 | Hall et al. |
| 2015/0078924 A1 | 3/2015 | Zhang et al. |
| 2015/0082758 A1 | 3/2015 | Saraswathi et al. |
| 2015/0101344 A1 | 4/2015 | Jarrier et al. |
| 2015/0107199 A1 | 4/2015 | Smith et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0240720 A1 | 8/2015 | Brunner |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |

(56) References Cited

U.S. PATENT DOCUMENTS

| | | |
|---|---|---|
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevåg et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |

(56) References Cited

U.S. PATENT DOCUMENTS

| | | |
|---|---|---|
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |

(56) References Cited

U.S. PATENT DOCUMENTS

| | | | |
|---|---|---|---|
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |
| 2023/0182063 A1 | 6/2023 | Lennhager et al. |

FOREIGN PATENT DOCUMENTS

| | | | |
|---|---|---|---|
| CA | 2043184 | | 8/1994 |
| CA | 2829762 | | 9/2012 |
| CA | 2737321 | | 9/2013 |
| CA | 2876687 | A1 | 5/2014 |
| CA | 2693567 | | 9/2014 |
| CA | 2964597 | | 10/2017 |
| CA | 2876687 | C | 4/2019 |
| CA | 3138533 | | 11/2020 |
| CA | 2919175 | | 3/2021 |
| CN | 2622404 | | 6/2004 |
| CN | 2779054 | | 5/2006 |
| CN | 2890325 | | 4/2007 |
| CN | 200964929 | Y | 10/2007 |
| CN | 101323151 | A | 12/2008 |
| CN | 201190660 | Y | 2/2009 |
| CN | 201190892 | Y | 2/2009 |
| CN | 201190893 | Y | 2/2009 |
| CN | 101414171 | A | 4/2009 |
| CN | 201215073 | Y | 4/2009 |
| CN | 201236650 | Y | 5/2009 |
| CN | 201275542 | Y | 7/2009 |
| CN | 201275801 | Y | 7/2009 |
| CN | 201333385 | Y | 10/2009 |
| CN | 201443300 | U | 4/2010 |
| CN | 201496415 | U | 6/2010 |
| CN | 201501365 | U | 6/2010 |
| CN | 201507271 | U | 6/2010 |
| CN | 101323151 | B | 7/2010 |
| CN | 201560210 | U | 8/2010 |
| CN | 201581862 | U | 9/2010 |
| CN | 201610728 | U | 10/2010 |
| CN | 201610751 | U | 10/2010 |
| CN | 201618530 | U | 11/2010 |
| CN | 201661255 | U | 12/2010 |
| CN | 101949382 | | 1/2011 |
| CN | 201756927 | U | 3/2011 |
| CN | 101414171 | B | 5/2011 |
| CN | 102128011 | A | 7/2011 |
| CN | 102140898 | A | 8/2011 |
| CN | 102155172 | A | 8/2011 |
| CN | 102182904 | | 9/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |
| CN | 202156297 | U | 3/2012 |
| CN | 202158355 | U | 3/2012 |
| CN | 202163504 | U | 3/2012 |
| CN | 202165236 | U | 3/2012 |
| CN | 202180866 | U | 4/2012 |
| CN | 202181875 | U | 4/2012 |
| CN | 202187744 | U | 4/2012 |
| CN | 202191854 | U | 4/2012 |
| CN | 202250008 | U | 5/2012 |
| CN | 101885307 | | 7/2012 |
| CN | 102562020 | A | 7/2012 |
| CN | 202326156 | U | 7/2012 |
| CN | 202370773 | U | 8/2012 |
| CN | 202417397 | U | 9/2012 |
| CN | 202417461 | U | 9/2012 |
| CN | 102729335 | A | 10/2012 |
| CN | 202463955 | U | 10/2012 |
| CN | 202463957 | U | 10/2012 |
| CN | 202467739 | U | 10/2012 |
| CN | 202467801 | U | 10/2012 |
| CN | 202531016 | U | 11/2012 |
| CN | 202544794 | U | 11/2012 |
| CN | 102825039 | A | 12/2012 |
| CN | 202578592 | U | 12/2012 |
| CN | 202579164 | U | 12/2012 |
| CN | 202594808 | U | 12/2012 |
| CN | 202594928 | U | 12/2012 |
| CN | 202596615 | U | 12/2012 |
| CN | 202596616 | U | 12/2012 |
| CN | 102849880 | A | 1/2013 |
| CN | 102889191 | A | 1/2013 |
| CN | 202641535 | U | 1/2013 |
| CN | 202645475 | U | 1/2013 |
| CN | 202666716 | U | 1/2013 |
| CN | 202669645 | U | 1/2013 |
| CN | 202669944 | U | 1/2013 |
| CN | 202671336 | U | 1/2013 |

(56) References Cited

FOREIGN PATENT DOCUMENTS

| | | |
|---|---|---|
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935216 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |

(56) References Cited

FOREIGN PATENT DOCUMENTS

| | | |
|---|---|---|
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |

(56) References Cited

FOREIGN PATENT DOCUMENTS

| | | |
|---|---|---|
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |

(56) References Cited

FOREIGN PATENT DOCUMENTS

| | | |
|---|---|---|
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| IN | 103247220 A | 8/2013 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021038604 | 3/2021 |
| WO | 2021041783 | 3/2021 |

OTHER PUBLICATIONS

Europump and Hydrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

HCI Jet Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (Solar Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Bragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas'yanov et al., Application of gas-turbine engines in pumping units complexes of hydraulic fracturing of oil and gas reservoirs; Exposition Oil & Gas; (Oct. 2012) (published in Russian).

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.

Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.

(56) References Cited

OTHER PUBLICATIONS

Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.
Final written decision of PGR2021-00102 dated Feb. 6, 2023.
Final written decision of PGR2021-00103 dated Feb. 6, 2023.
ResearchGate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.

Chun, M. K., H. K. Song, and R. Lallemand. "Heavy duty gas turbines in petrochemical plants: Samsung's Daesan blant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
I-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
AFGlobal Corporation, Durastim Hydraulic Fracturing Pump, A Revolutionary Design for Continuous Duty Hydraulic Fracturing, 2018.
SPM® Qem 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.

(56) References Cited

OTHER PUBLICATIONS

Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PIkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.
De Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org/about, accessed Dec. 30, 2021.
About API, American Petroleum Institute, WaybackMachine Capture, https://web.archive.org/web/20110422104346/http://api.org/aboutapi/, captured Apr. 22, 2011.
Publications, American Petroleum Institute, WaybackMachine Capture, https://web.archive.org/web/20110427043936/http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/858692269&referer=brief_results, accessed Dec. 30, 2021; and https://www.worldcat.org/title/special-purpose-couplings-for-petroleum-chemical-and-gas-industry-services/bclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_detail.cfm?document_name=API%20STD%20674&item_s_key=00010672#doc-detail-history-anchor, accessed Dec. 30, 2021; and https://global.ihs.com/doc_detail.cfm?&input_doc_number=671&input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.

* cited by examiner

| Alt (ft) | Temp (F) | Pressure at 59F (inH2O) | Density at 59F (lbm/ft3) | Density at 65F (lbm/ft3) | Density at 75F (lbm/ft3) | Density at 85F (lbm/ft3) | Density at 90F (lbm/ft3) | Density at 100F (lbm/ft3) |
|---|---|---|---|---|---|---|---|---|
| 0 | 59.0 | 407.2 | 0.0765 | 0.0756 | 0.0742 | 0.0728 | 0.0722 | 0.0709 |
| 500 | 57.2 | 399.9 | 0.0754 | 0.0743 | 0.0729 | 0.0715 | 0.0709 | 0.0696 |
| 1000 | 55.4 | 392.7 | 0.0743 | 0.0729 | 0.0716 | 0.0703 | 0.0696 | 0.0684 |
| 2000 | 51.9 | 378.6 | 0.0721 | 0.0703 | 0.0690 | 0.0677 | 0.0671 | 0.0659 |
| 3000 | 48.3 | 364.9 | 0.0700 | 0.0678 | 0.0665 | 0.0653 | 0.0647 | 0.0635 |
| 4000 | 44.7 | 351.7 | 0.0679 | 0.0653 | 0.0641 | 0.0629 | 0.0623 | 0.0612 |
| 5000 | 41.2 | 338.8 | 0.0659 | 0.0629 | 0.0617 | 0.0606 | 0.0601 | 0.0590 |

FIG. 25

| With Assumed m, r1 and Known Inertia |||||||
|---|---|---|---|---|---|---|
| I = 1.047 (kg-m²) | m (kg) | r1 (m) | r2 (m) | m (lb) | r1 (in) | r2 (in) |
| | 10 | 0.0635 | 0.4533 | 22.05 | 2.50 | 17.85 |
| | 15 | 0.0635 | 0.3683 | 33.075 | 2.50 | 14.50 |
| | 20 | 0.0635 | 0.3174 | 44.1 | 2.50 | 12.49 |
| | 25 | 0.0635 | 0.2824 | 55.125 | 2.50 | 11.12 |
| | 30 | 0.0635 | 0.2565 | 66.15 | 2.50 | 10.10 |
| | 35 | 0.0635 | 0.2363 | 77.175 | 2.50 | 9.30 |
| | 40 | 0.0635 | 0.2199 | 88.2 | 2.50 | 8.66 |
| | 45 | 0.0635 | 0.2062 | 99.225 | 2.50 | 8.12 |
| | 50 | 0.0635 | 0.1946 | 110.25 | 2.50 | 7.66 |
| | 55 | 0.0635 | 0.1845 | 121.275 | 2.50 | 7.27 |
| | 60 | 0.0635 | 0.1757 | 132.3 | 2.50 | 6.92 |
| | 65 | 0.0635 | 0.1679 | 143.325 | 2.50 | 6.61 |
| | 70 | 0.0635 | 0.1609 | 154.35 | 2.50 | 6.34 |
| | 75 | 0.0635 | 0.1546 | 165.375 | 2.50 | 6.09 |
| | 80 | 0.0635 | 0.1488 | 176.4 | 2.50 | 5.86 |
| | 85 | 0.0635 | 0.1436 | 187.425 | 2.50 | 5.65 |
| | 90 | 0.0635 | 0.1387 | 198.45 | 2.50 | 5.46 |
| | 95 | 0.0635 | 0.1342 | 209.475 | 2.50 | 5.28 |
| | 100 | 0.0635 | 0.1301 | 220.5 | 2.50 | 5.12 |
| | 105 | 0.0635 | 0.1262 | 231.525 | 2.50 | 4.97 |
| | 110 | 0.0635 | 0.1225 | 242.55 | 2.50 | 4.82 |
| | 115 | 0.0635 | 0.1191 | 253.575 | 2.50 | 4.69 |

FIG. 43

SYSTEMS AND METHODS FOR HYDRAULIC FRACTURING

CROSS-REFERENCE TO RELATED APPLICATIONS

This application is a continuation-in-part of U.S. Non-Provisional application Ser. No. 18/148,209, filed Dec. 29, 2022, titled "MOBILE GAS TURBINE INLET AIR CONDITIONING SYSTEM AND ASSOCIATED METHODS," now U.S. Pat. No. 11,649,766, issued May 16, 2023, which is a continuation of U.S. Non-Provisional application Ser. No. 17/954,118, filed Sep. 27, 2022, titled "MOBILE GAS TURBINE INLET AIR CONDITIONING SYSTEM AND ASSOCIATED METHODS," now U.S. Pat. No. 11,598,263, issued Mar. 7, 2023, which is a continuation of U.S. Non-Provisional application Ser. No. 17/403,373, filed Aug. 16, 2021, titled "MOBILE GAS TURBINE INLET AIR CONDITIONING SYSTEM AND ASSOCIATED METHODS," now U.S. Pat. No. 11,560,845, issued Jan. 24, 2023, which is a continuation of U.S. Non-Provisional application Ser. No. 17/326,711, filed May 21, 2021, titled "MOBILE GAS TURBINE INLET AIR CONDITIONING SYSTEM AND ASSOCIATED METHODS," now U.S. Pat. No. 11,156,159, issued Oct. 26, 2021, which is a continuation U.S. Non-Provisional application Ser. No. 17/213,802, filed Mar. 26, 2021, titled "MOBILE GAS TURBINE INLET AIR CONDITIONING SYSTEM AND ASSOCIATED METHODS," now U.S. Pat. No. 11,060,455, issued Jul. 13, 2021, which is a continuation of U.S. Non-Provisional application Ser. No. 16/948,289, filed Sep. 11, 2020, titled "MOBILE GAS TURBINE INLET AIR CONDITIONING SYSTEM AND ASSOCIATED METHODS," now U.S. Pat. No. 11,002,189, issued May 11, 2021, which claims priority to and the benefit of U.S. Provisional Application No. 62/704,565, filed May 15, 2020, titled "MOBILE GAS TURBINE INLET AIR CONDITIONING SYSTEM AND ASSOCIATED METHODS," and U.S. Provisional Application No. 62/900,291, filed Sep. 13, 2019, titled "MOBILE GAS TURBINE INLET AIR CONDITIONING SYSTEM," the disclosures of which are incorporated herein by reference in their entireties.

This application is also a continuation-in-part of U.S. Non-Provisional application Ser. No. 17/676,949, filed Feb. 22, 2022, titled "TURBINE ENGINE EXHAUST DUCT SYSTEM AND METHODS FOR NOISE DAMPENING AND ATTENUATION," which is a divisional of U.S. Non-Provisional application Ser. No. 17/519,827, filed Nov. 5, 2021, titled "TURBINE ENGINE EXHAUST DUCT SYSTEM AND METHODS FOR NOISE DAMPENING AND ATTENUATION," now U.S. Pat. No. 11,415,056, issued Aug. 16, 2022, which is a continuation of U.S. Non-Provisional application Ser. No. 17/502,120, filed Oct. 15, 2021, titled "METHODS FOR NOISE DAMPENING AND ATTENUATION OF TURBINE ENGINE," now U.S. Pat. No. 11,560,848, issued Jan. 24, 2023, which is a continuation of U.S. Non-Provisional application Ser. No. 17/498,916, filed Oct. 12, 2021, titled "TURBINE ENGINE EXHAUST DUCT SYSTEM AND METHODS FOR NOISE DAMPENING AND ATTENUATION," now U.S. Pat. No. 11,459,954, issued Oct. 4, 2022, which is a continuation of U.S. Non-Provisional application Ser. No. 17/182,325, filed Feb. 23, 2021, titled "TURBINE ENGINE EXHAUST DUCT SYSTEM AND METHODS FOR NOISE DAMPENING AND ATTENUATION," now U.S. Pat. No. 11,242,802, issued Feb. 8, 2022, which is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," now U.S. Pat. No. 10,961,914, issued Mar. 30, 2021, which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of which are incorporated herein by reference in their entireties.

This is also a continuation-in-part of U.S. Non-Provisional application Ser. No. 18/108,821, filed Feb. 13, 2023, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," which is a continuation of U.S. Non-Provisional application Ser. No. 17/585,766, filed Jan. 27, 2022, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,719,234, issued Aug. 8, 2023, which is a continuation of U.S. Non-Provisional application Ser. No. 17/469,970, filed Sep. 9, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,280,331, issued Mar. 22, 2022, which is a continuation of U.S. Non-Provisional application Ser. No. 17/363,151, filed Jun. 30, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,149,726, issued Oct. 19, 2021, which is a continuation of U.S. Non-Provisional application Ser. No. 17/213,562, filed Mar. 26, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,092,152, issued Aug. 17, 2021, which is a continuation of U.S. Non-Provisional application Ser. No. 16/948,291, filed Sep. 11, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,015,594, issued May 25, 2021, which claims priority to and the benefit of U.S. Provisional Application No. 62/704,560, filed May 15, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," and U.S. Provisional Application No. 62/899,963, filed Sep. 13, 2019, titled "USE OF SINGLE MASS FLYWHEEL ALONGSIDE TORSIONAL VIBRATION DAMPER SYSTEM FOR SINGLE ACTING RECIPROCATING PUMP," the disclosures of which are incorporated herein by reference in their entireties.

This application is also a continuation-in-part of U.S. Non-Provisional application Ser. No. 18/116,383, filed Mar. 2, 2023, titled "POWER SOURCES AND TRANSMISSION NETWORKS FOR AUXILIARY EQUIPMENT ONBOARD HYDRAULIC FRACTURING UNITS AND ASSOCIATED METHODS," which is a continuation of U.S. Non-Provisional application Ser. No. 17/976,095, filed Oct. 28, 2022, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,629,584, issued Apr. 18, 2023, which is a continuation of U.S. Non Provisional application Ser. No. 17/555,815, filed Dec. 20, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,530,602, issued Dec. 20, 2022, which is a continuation of U.S. Non-Provisional Application Ser. No. 17/203,002, filed Mar. 16, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,236,739, issued Feb. 1, 2022, which is a divisional of U.S. Non-Provisional application Ser. No. 16/946,079, filed Jun. 5, 2020, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 10,989,180, issued Apr. 27, 2021, which claims the benefit of and priority to U.S. Provisional Patent Application No. 62/899,971, filed Sep. 13, 2019, titled "AUXILIARY DRIVE SYSTEMS AND ALTERNATIVE POWER SOURCES," the disclosures of which are incorporated herein by reference in their entireties.

This application is also continuation-in-part of U.S. Non-Provisional application Ser. No. 18/147,880, filed Dec. 29, 2022, titled "DIRECT DRIVE UNIT REMOVAL SYSTEM AND ASSOCIATED METHODS," now U.S. Pat. No. 11,655,763, issued May 23, 2023, which is a continuation of U.S. Non-Provisional application Ser. No. 17/936,885, filed Sep. 30, 2022, titled "DIRECT DRIVE UNIT REMOVAL SYSTEM AND ASSOCIATED METHODS," now U.S. Pat. No. 11,578,660, issued Feb. 14, 2023, which is a continuation of U.S. Non-Provisional application Ser. No. 17/883,693, filed Aug. 9, 2022, titled "DIRECT DRIVE UNIT REMOVAL SYSTEM AND ASSOCIATED METHODS," now U.S. Pat. No. 11,512,642, issued Nov. 29, 2022, which is a continuation of U.S. Non-Provisional application Ser. No. 17/808,792, filed Jun. 24, 2022, titled "DIRECT DRIVE UNIT REMOVAL SYSTEM AND ASSOCIATED METHODS," now U.S. Pat. No. 11,473,503, issued Oct. 18, 2022, which is a continuation of U.S. Non-Provisional application Ser. No. 17/720,390, filed Apr. 14, 2022, titled "DIRECT DRIVE UNIT REMOVAL SYSTEM AND ASSOCIATED METHODS," now U.S. Pat. No. 11,401,865, issued Aug. 2, 2022, which is a continuation of U.S. Non-Provisional application Ser. No. 17/671,734, filed Feb. 15, 2022, titled "DIRECT DRIVE UNIT REMOVAL SYSTEM AND ASSOCIATED METHODS," now U.S. Pat. No. 11,346,280, issued May 31, 2022, which is a continuation of U.S. Non-Provisional application Ser. No. 17/204,338, filed Mar. 17, 2021, titled "DIRECT DRIVE UNIT REMOVAL SYSTEM AND ASSOCIATED METHODS," now U.S. Pat. No. 11,319,878, issued May 3, 2022, which is a continuation of U.S. Non-Provisional application Ser. No. 17/154,601, filed Jan. 21, 2021, titled "DIRECT DRIVE UNIT REMOVAL SYSTEM AND ASSOCIATED METHODS," now U.S. Pat. No. 10,982,596, issued Apr. 20, 2021, which is a divisional of U.S. Non-Provisional application Ser. No. 17/122,433, filed Dec. 15, 2020, titled "DIRECT DRIVE UNIT REMOVAL SYSTEM AND ASSOCIATED METHODS," now U.S. Pat. No. 10,961,912, issued Mar. 30, 2021, which is a divisional of U.S. Non-Provisional application Ser. No. 15/929,924, filed May 29, 2020, titled "DIRECT DRIVE UNIT REMOVAL SYSTEM AND ASSOCIATED METHODS," now U.S. Pat. No. 10,895,202, issued Jan. 19, 2021, which claims the benefit of and priority to U.S. Provisional Application No. 62/899,975, filed Sep. 13, 2019, titled "TURBINE REMOVAL SYSTEM," the disclosures of which are incorporated herein by reference in their entireties.

BACKGROUND

This disclosure generally relates to hydraulic fracturing. More particularly, this disclosure relates to systems for performing hydraulic fracturing that include one or more hydraulic fracturing units (or pumping units).

Hydraulic fracturing is an oilfield operation that stimulates production of hydrocarbons, such that the hydrocarbons may more easily or readily flow from a subsurface formation to a well. For example, a hydraulic fracturing system may be configured to fracture a formation by pumping a fracturing or fracking fluid into a well at high pressure and high flow rates. Some fracturing fluids may take the form of a slurry including water, proppants (e.g., sand), and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation fails and begins to fracture.

By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracking fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

The one or more pumps may be arranged in a plurality of hydraulic fracturing units positioned at the fracturing operation site. Each hydraulic fracturing unit may include at least one of the one more pumps and a prime mover. In addition, each hydraulic fracturing unit may be mobilized on, for example, a skid or a tractor-trailer.

Hydraulic fracturing has been utilized in a great number of wells to enhance, initiate, or reinitiate production of oil, gas, or other formation fluids. As a result, hydraulic fracturing operations have steadily been improved. However, there remains an ever-present need for further improvements to a hydraulic fracturing operation to enhance performance and efficiency.

BRIEF SUMMARY

Some embodiments disclosed herein are directed to a pumping unit. In some embodiments, the pumping unit includes a gas turbine engine, an enclosure housing the gas turbine engine, an exhaust assembly connected to the gas turbine engine, an air intake duct connected to the gas turbine engine, and an air treatment system connected to the air intake duct. The air treatment system comprising one or more inlet pre-cleaners configured to eject debris. Each of the one or more inlet pre-cleaners having a cylindrical tubular portion configured to channel air toward the air intake duct. In addition, the pumping unit includes a gearbox operatively coupled to the gas turbine engine. Further, the pumping unit includes a drive shaft having a first end and a second end, wherein the first end of the drive shaft is operatively coupled to the gearbox. Still further, the pumping unit includes a pump comprising an input shaft operatively coupled to the second end of the drive shaft, wherein the gas turbine engine, the gearbox, the drive shaft, and the pump are disposed along a longitudinal axis of the pumping unit.

In some embodiments, the pumping unit includes a chassis and an enclosure disposed on the chassis. The enclosure houses a gas turbine engine and a gearbox operatively coupled to the gas turbine engine. The enclosure includes a first lateral side, a second lateral side, and a door mounted on the first lateral side proximate to the gas turbine engine. In addition, the pumping unit includes an exhaust assembly connected to the gas turbine engine, an air intake duct connected to the gas turbine engine, and an air treatment system connected to the air intake duct, the air treatment system comprising one or more inlet pre-cleaners configured to eject debris particles via inertia of the debris particles. Further, the pumping unit includes a drive shaft having a first end and a second end, wherein the first end of the drive shaft is operatively coupled to the gearbox. Still further, the pumping unit includes a pump disposed on the chassis, the pump comprising an input shaft operatively coupled to the second end of the drive shaft, wherein the gas turbine engine, the gearbox, the drive shaft, and the pump are disposed along a longitudinal axis of the pumping unit.

Some embodiments disclosed herein are directed to a hydraulic fracturing system. In some embodiments, the hydraulic fracturing system includes a plurality of hydraulic fracturing units and a fuel line configured to supply fuel from a fuel source to the plurality of hydraulic fracturing units. A first hydraulic fracturing unit of the plurality of hydraulic fracturing units includes a gas turbine engine, an enclosure housing the gas turbine engine, an exhaust assembly connected to the gas turbine engine, an air intake duct connected to the gas turbine engine, an air treatment system connected to the air intake duct, the air treatment system comprising one or more inlet pre-cleaners configured to eject debris, a gearbox operatively coupled to the gas turbine engine, and a drive shaft having a first end and a second end, wherein the first end of the drive shaft is operatively coupled to the gearbox. In addition, the first hydraulic fracturing unit incudes a pump comprising an input shaft operatively coupled to the second end of the drive shaft. The gas turbine engine, the gearbox, the drive shaft, and the pump are disposed along a longitudinal axis of the pump, and a longitudinal axis of the drive shaft is offset from a longitudinal axis of the input shaft of the pump.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those having ordinary skill in the art upon reading the following detailed description, and by referring to the accompanying drawings. It should be appreciated that this disclosure may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various embodiments, reference will now be made to the accompanying drawings in which:

FIG. 25 illustrates, in table form, air properties at different elevations and temperatures according to some embodiments of this disclosure;

FIG. 43 is a table providing exemplary properties of flywheels that each have the same moment of inertia according to some embodiments of this disclosure;

DETAILED DESCRIPTION

Figure 1:
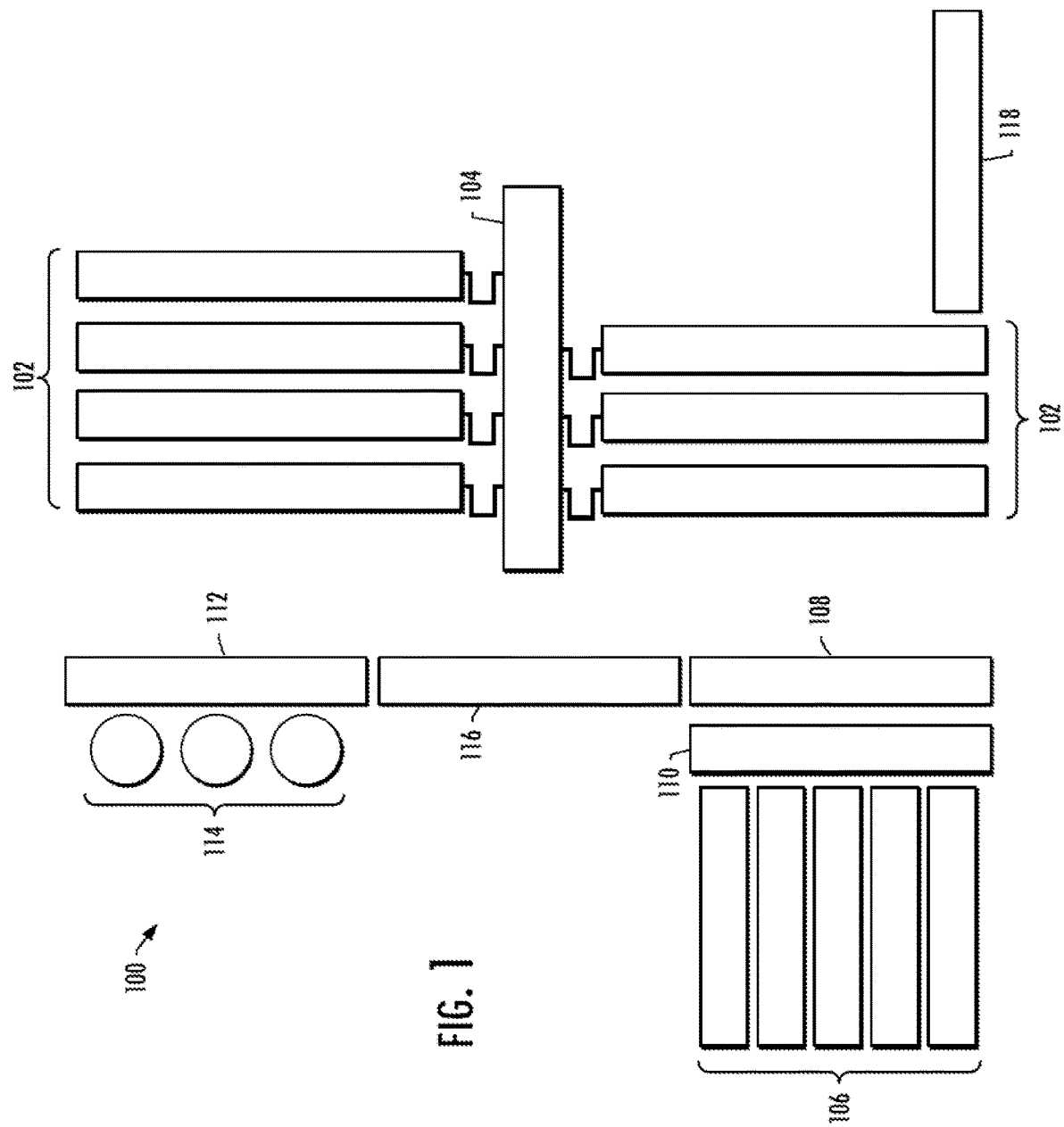
FIG. 1 is a block diagram of a system for fracturing a well according to some embodiments of this disclosure.

As previously described, there is a continuing need for further improvements to a hydraulic fracturing operation to enhance performance and efficiency. In some circumstances, a gas turbine engine may be used to power the pump(s) of the hydraulic fracturing unit during a hydraulic fracturing operation. Gas turbine engines carry a number of advantages, including (for instance) a generally smaller size and higher power to weight ratio than a traditional diesel engine. However, the use of gas turbine engines to power the one or more pumps for a hydraulic fracturing operation also includes a unique set of challenges. For instance, a hydraulic fracturing system (and particularly one that employs gas turbine engines) may face challenges relating to power distribution, spacing (and footprint management), operational noise, vibration management (e.g., within the hydraulic fracturing units), operation of the gas turbine engines in a range of environmental conditions, etc.

Accordingly, the embodiments disclosed herein provide systems and methods for addressing many of the challenges associated with performing a hydraulic fracturing operation, including some challenges that are associated with the use of gas turbine engines to power the one or more pumps of the hydraulic fracturing system.

While a number of embodiments of systems and methods are described herein, it should be appreciated that other embodiments are contemplated that utilize a combination (including a subset) of features of one or more (or all) of the various embodiments that are particularly described. Thus, the description of the various embodiments should not be interpreted as limiting the particular combinations or subcombinations of features that may be utilized in other embodiments according to this disclosure. Moreover, at least some of the embodiments disclosed herein may also be relevant to hydraulic fracturing system that utilize prime movers that are not gas turbine engines (such as diesel engines, electric motors, etc.). Thus, unless otherwise specified, the embodiments disclosed herein may be employed to improve the operations of hydraulic fracturing systems that do and that do not employ gas turbine engines.

Some embodiments disclosed herein include electric power arrangements for a hydraulic fracturing system that are to deliver power (such as electrical power) to one or more components thereof. For instance, hydraulic fracturing units (including those that employ gas turbine engines, or other prime movers such as diesel engines or electric motors) have onboard auxiliary equipment that is operated in conjunction with the powertrain to ensure that equipment is lubricated and protected, and also to enhance to efficiency of the equipment. Examples of these onboard auxiliary equipment include lubrication pumps that provide low-pressure and high-pressure gear oil injection into the reciprocating pump crank case and bearing housings. The injection of this oil into the pump's power end ensures that friction between mating surfaces is reduced, and it also mitigates the heat rejection from this friction and prevents it from elevating to a temperature that may cause wear and premature failure.

Cooling equipment is another example of auxiliary equipment onboard many hydraulic fracturing units. The cooling equipment includes multiple cooling circuits for engine cooling, transmission cooling, pump lube oil cooling, hydraulic cooling and the like. This cooling equipment may include tube and shell heat exchangers, but it is more common to utilize fan-driven heat exchangers that allow for the control of fan speed that permits operators to mitigate the amount of cooling performed and conserve energy used to drive fan motors.

The auxiliary equipment needs driving power to allow the equipment to perform respective functions and operate efficiently. Thus, some embodiments disclosed herein include hydraulic fracturing systems that include one or more electric power arrangements configured to power the auxiliary equipment of the hydraulic fracturing units. As will be described in more detail below, each electric power arrangement may include an engine-generator set configured to generate electric power, and an electric power network coupled to the engine-generator set and the electric motors. The electric power network may also be coupled to a utility power grid, a battery bank or a second engine-generator set of a neighboring hydraulic fracturing unit. The electric power network may be configured to deliver the electric power generated by the engine-generator set to one or more electric motors to drive the auxiliary equipment. In addition, the electric power network may be configured to switchably connect the utility power grid, the battery bank or the second engine-generator set to deliver power to the electric motors responsive to a failure or fault of the engine-generator set.

FIG. 1 illustrates a system 100 for fracturing a well according to some example implementations of the present disclosure. As shown, the system generally includes a plurality of plurality of hydraulic fracturing units 102 configured to pump a fracturing fluid, and a manifold 104 from which the fracturing fluid is delivered to the well.

More particularly, in the system 100 shown in FIG. 1, water from tanks 106 and gelling agents dispensed by a chemical unit 108 are mixed in a hydration unit 110. The discharge from hydration unit, along with sand (and/or other proppants) carried on conveyors 112 from sand tanks 114 is fed into a blender 116 that mixes the gelled water and sand into fracturing fluid (a slurry). The blender discharges the fracturing fluid through low-pressure hoses that convey it into two or more low-pressure lines in the manifold 104. The low-pressure lines in the manifold feed the fracturing fluid to the hydraulic fracturing units 102, perhaps as many as a dozen or more, through low-pressure "suction" hoses.

The hydraulic fracturing units 102 take the fracturing fluid and discharge it at high pressure through individual high-pressure "discharge" lines into two or more high-pressure lines or "missiles" on the manifold 104. The missiles flow together, such that they are manifolded on the manifold. Several high-pressure flow lines run from the manifolded missiles to a "goat head" that delivers the fracturing fluid into a "zipper" manifold. The zipper manifold allows the fracturing fluid to be selectively diverted to, for example, one of two well heads. Once fracturing is complete, flow back from the fracturing operation discharges into a flowback manifold which leads into flowback tanks.

Because systems for fracturing a well are required on site for a relatively short period of time, the larger components of the system 100 typically are transported to a well site on skids, trailers, or trucks as more or less self-contained units. As used herein, the term "trailer" refers to any transportation assembly, including, but not limited to, a transport, truck, skid, and/or barge used to transport relatively heavy structures, such as fracturing equipment. Once the components of the system 100 arrive at the well site, they are then connected to the system by one kind of conduit or another. In FIG. 1, for example, the hydraulic fracturing units, chemical unit 108, hydration unit 110 and blender 116 may be mounted on a trailer that is transported to the well site by a truck. Because they are designed to be more or less self-contained units, however, they are complex machines and incorporate several distinct subsystems and a large number of individual components.

Figure 2:
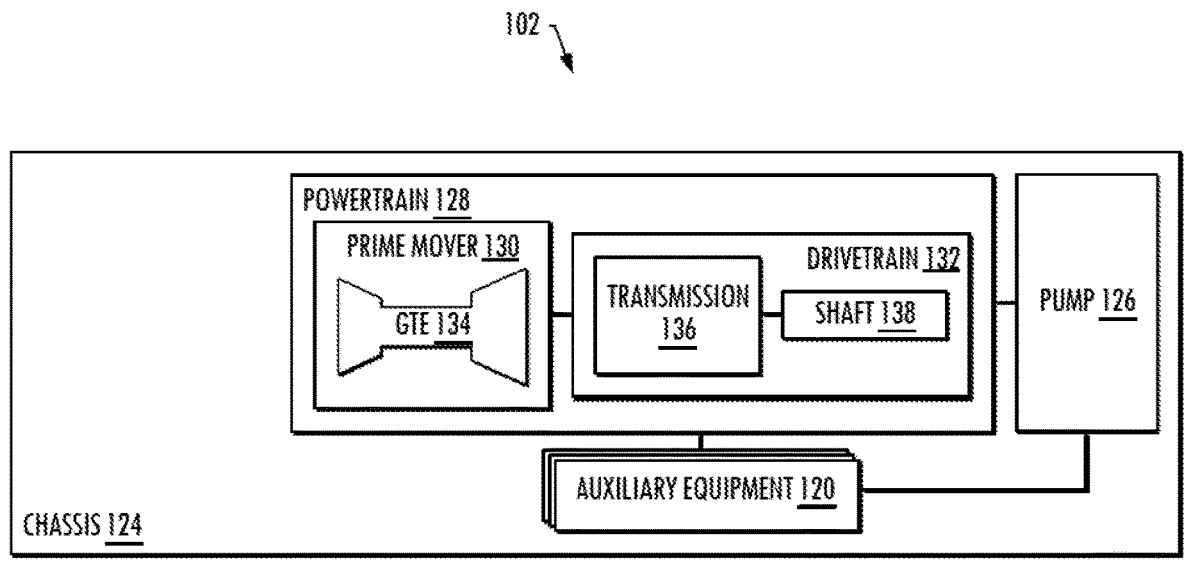
FIG. 2 is a block diagram of a hydraulic fracturing unit according to some embodiments of this disclosure.

FIG. 2 illustrates a hydraulic fracturing unit 102 according to some example implementations of the present disclosure. The hydraulic fracturing unit includes a chassis 124, and a pump 126, such as a reciprocating pump, connected to the chassis and configured to pump a fracturing fluid. In some examples, the chassis 124 may include a trailer (e.g., a flat-bed trailer) and/or a truck body to which the components of the hydraulic fracturing unit may be connected. For example, the components may be carried by trailers and/or incorporated into trucks, so that they may be easily transported between well sites.

The pump 126 may be reciprocating plunger pump including a power end and a fluid end. The power end transforms rotational motion and energy from a powertrain 128 into the reciprocating motion that drives plungers in the fluid end. In the fluid end, the plungers force fluid into a pressure chamber that is used to create high pressure for well servicing. The fluid end may also include a discharge valve assembly and a suction valve assembly.

The hydraulic fracturing unit 102 includes the powertrain 128 also connected to the chassis 124 and configured to power the pump 126. In this regard, the powertrain includes a prime mover 130 and a drivetrain 132. In some examples, the hydraulic fracturing unit is a direct drive turbine (DDT) unit in which the prime mover 130 is or includes a gas turbine engine (GTE) 134. As also shown, the drivetrain 132 includes a reduction transmission 136 (such as a gearbox) connected to a drive shaft 138, which, in turn, is connected to the pump such as via an input shaft or input flange of the pump. Other types of GTE-to-pump arrangements are contemplated.

In some examples, the GTE 134 may be a direct drive GTE. The GTE may be a dual-fuel or bi-fuel GTE, for example, operable using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, etc. Gaseous fuels may be supplied by CNG bulk vessels, a gas compressor, a liquid natural gas vaporizer, line gas, and/or well-gas produced natural gas. Other types and sources of fuel are contemplated. The GTE may be operated to provide horsepower to drive the pump 126 via the drivetrain 132 to safely and successfully fracture a formation during a well stimulation project.

As also shown, the hydraulic fracturing unit 102 includes auxiliary equipment 120 located onboard the chassis 124 and configured to support operation of the hydraulic fracturing unit including the pump 126 and the powertrain 128. As described above, the auxiliary equipment onboard the hydraulic fracturing unit may include lubrication and cooling equipment such as cooling fans and lubrication pumps. More particular examples of auxiliary equipment include a lube oil pump coupled to the reduction transmission 136, a cooling fan coupled to a reduction transmission lube oil pump, a lube oil pump coupled to the power end of the pump, a cooling fan coupled to a power end lube oil pump, a cooling fan to the GTE 134, a GTE air cooling fan, a screw type air compressor, an air dryer, greaser equipment for the pump 126, an air intake blower fan motor, a GTE controller, a hydraulic starter pump, a GTE lube cooling fan, a telescope exhaust winch, a master programmable logic controller (PLC), and the like.

Figure 3:
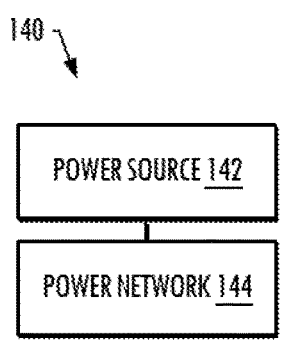
FIG. 3 illustrates a power arrangement configured to power auxiliary equipment onboard the hydraulic fracturing unit, according to some embodiments of this disclosure.

As shown in FIG. 3, example implementations of the present disclosure provide a power arrangement 140 configured to power the auxiliary equipment 120. As explained in greater detail below, the system 100 may include the power arrangement 140 may be located onboard the hydraulic fracturing unit 102, such as on the gooseneck of a trailer. Additionally or alternatively, the system 100 may include the power arrangement 140 configured to power the auxiliary equipment across the plurality of hydraulic fracturing units if not also backside equipment such as the chemical unit 108, hydration unit 110, conveyors 112, sand tanks 114, blender 116 and the like. In some examples, the backside equipment may also include a data center 118.

As shown, the power arrangement 140 generally includes a power source 142 and a power network 144. The power source 142 is configured to generate power for the auxiliary equipment 120. The power network 144 is coupled to the power source 142 and the auxiliary equipment 120 and configured to deliver the power generated by the power source 142 to the auxiliary equipment 120.

Figure 4:
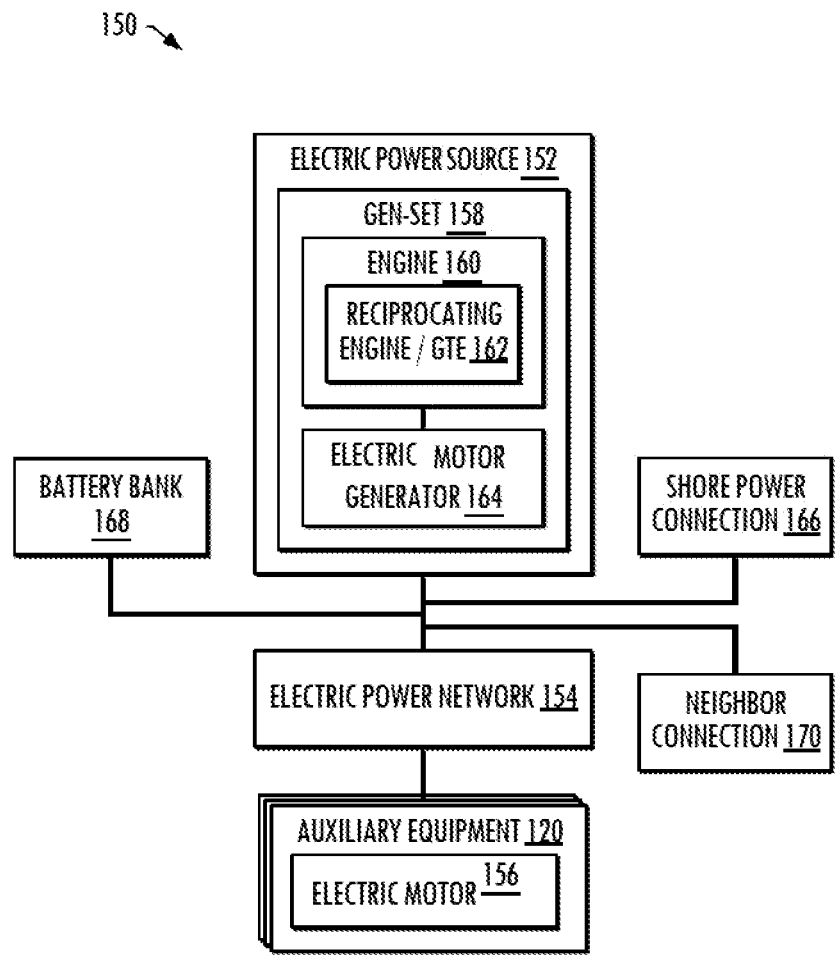
FIG. 4 illustrates an example in which the power arrangement is an electric power arrangement, according to some embodiments of this disclosure.

In various examples, the power arrangement 140 may be an electric power arrangement or a hydraulic power arrangement. FIG. 4 illustrates an example in which the power arrangement 140 is an electric power arrangement 150. In this example, the power source 224 is an electric power source 152 configured to generate electric power for the auxiliary equipment 120, and the power network is an electric power network 154 configured to deliver the electric power to the auxiliary equipment, which may include one or more electric motors 156.

As shown in FIG. 4, in some examples, the electric power source 152 includes an engine-generator set 158 with an engine 160, such as a reciprocating engine or GTE 162, and an electric generator such as an electric motor generator 164. One example of a suitable reciprocating engine is a diesel engine such as a tier four diesel engine, and one example of a suitable electric motor generator is a permanent magnet (PM) motor generator.

One particular example of a suitable GTE 162 that could be made part of the electric power source 152 is a microturbine from Capstone Turbine Corporation, although other turbines with similar technology and compact foot print could also be used. Gas turbine engines such as Capstone microturbines can be installed individually or in a parallel multipack configuration to create a local power grid that can be quiet, lightweight, modular and have low maintenance. Capstone microturbines and others like them have similar fuel capabilities to that of the Vericor TF50F turbine engine in such a way that even though natural gas is their preferred fuel source, diesel can be introduced as fuel for the turbine for a short period of time making this turbine adaptable to operating conditions and fuel shortage scenarios.

The utilization of a microturbine as the GTE 162 in the electric power source 152 may result in lower emissions to that of a reciprocating engine such as a diesel engine. This may allow for a single fuel hook up for CNG, reduce total operating costs, and reduce the power generation package size on the hydraulic fracturing unit 102. Other machinery and components associated with the main turbine air intake conditioning such as chillers and filters may also be shared with this microturbine.

In some examples, the electric power arrangement 150 further includes a connection 166 to shore power from an external source of electric power, such as a utility power grid, another engine-generator set or the like, from which the auxiliary equipment 120 are also powerable. Additionally or alternatively, in some examples, the electric power arrangement further includes a battery bank 168 chargeable from the power generated by the electric motor generator 164, and from which the auxiliary equipment are also powerable. The battery bank may include one or more batteries such as lithium on or lead acid batteries. In some examples in which the power arrangement 140 is onboard the hydraulic fracturing unit 102, and the hydraulic fracturing units of the system 100 include respective power arrangements, the electric power arrangement further includes a connection 170 to a second power arrangement of a neighboring hydraulic fracturing unit from which the auxiliary equipment are also powerable.

The auxiliary equipment 120 may be powered from the engine-generator set 158, the shore power from the external source of electric power, the second electric power arrangement from a neighboring hydraulic fracturing unit 102, or the battery bank 168. In some examples, the electric power network 154 is configured to deliver the electric power generated by the engine-generator set to the electric motors 156 to drive the auxiliary equipment. In some of these examples in which the engine-generator set experiences a fault or failure, the electric power network may then, in response, switchably connect the utility power grid, the battery bank or the second engine-generator set to deliver power to the electric motors.

Figure 5:
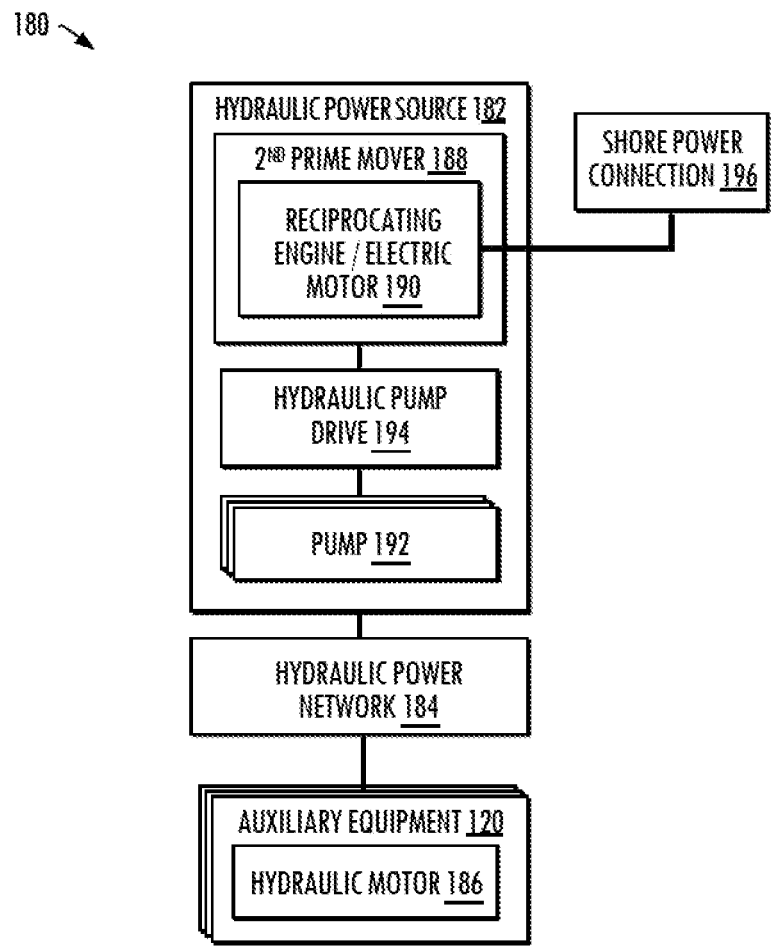
FIGS. 5 and 6 illustrate examples in which the power arrangement is a hydraulic power arrangement, according to some embodiments of this disclosure.

FIG. 5 illustrates an example in which the power arrangement 140 is a hydraulic power arrangement 180. In this example, the power source 142 is a hydraulic power source 182 configured to generate hydraulic power for the auxiliary equipment 120, and the power network 144 is a hydraulic power network 184 configured to deliver the hydraulic power to the auxiliary equipment 120, which may include one or more hydraulic motors 186. As shown in FIG. 5, the hydraulic power source 182 includes a second prime mover 188, such as a reciprocating engine or an electric motor 190, connected to a plurality of pumps 192 via a hydraulic pump drive 194. One example of a suitable electric motor is a PM motor. In some examples, the hydraulic power arrangement further includes a connection 196 to shore power from an external source of electric power, such as a utility power grid, another engine-generator set or the like, from which the electric motor may be powered.

Figure 6:
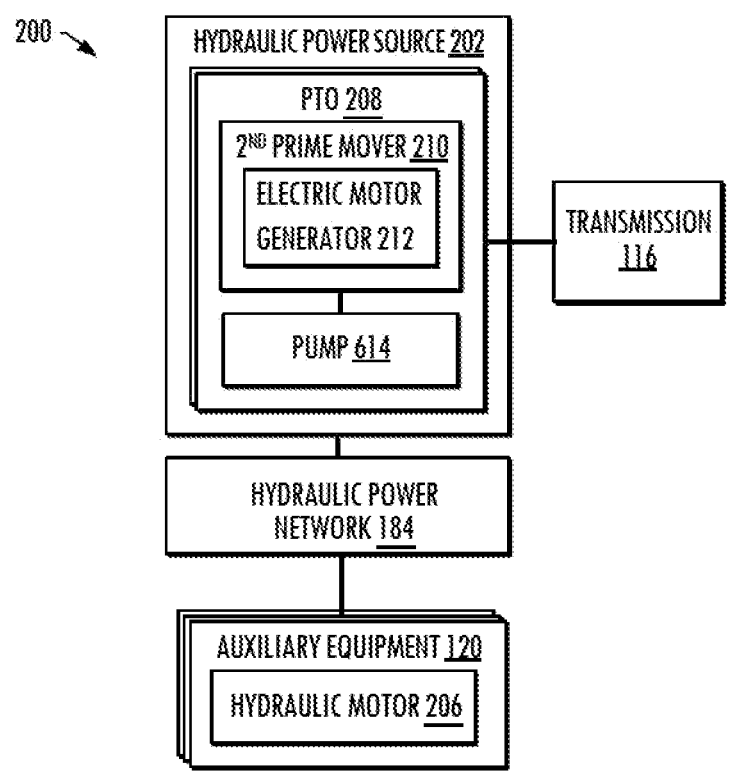

FIG. 6 illustrates another example in which the power arrangement 140 is a hydraulic power arrangement 200. Similar to FIG. 5, in this example, the power source 142 is a hydraulic power source 202 configured to generate hydraulic power for the auxiliary equipment 120, and the power network 144 is a hydraulic power network 184 configured to deliver the hydraulic power to the auxiliary equipment, which may include hydraulic motors 606. As shown in FIG. 6, however, the hydraulic power source includes a plurality of power takeoffs (PTOs) 208 connected to the transmission 136 of the hydraulic fracturing unit 102. Each of the plurality of PTOs is equipped with a second prime mover 210, such as an electric motor generator 212, and a pump 214. The hydraulic power source therefore including a plurality of PTOs with respective second prime movers and pumps.

Figure 7:
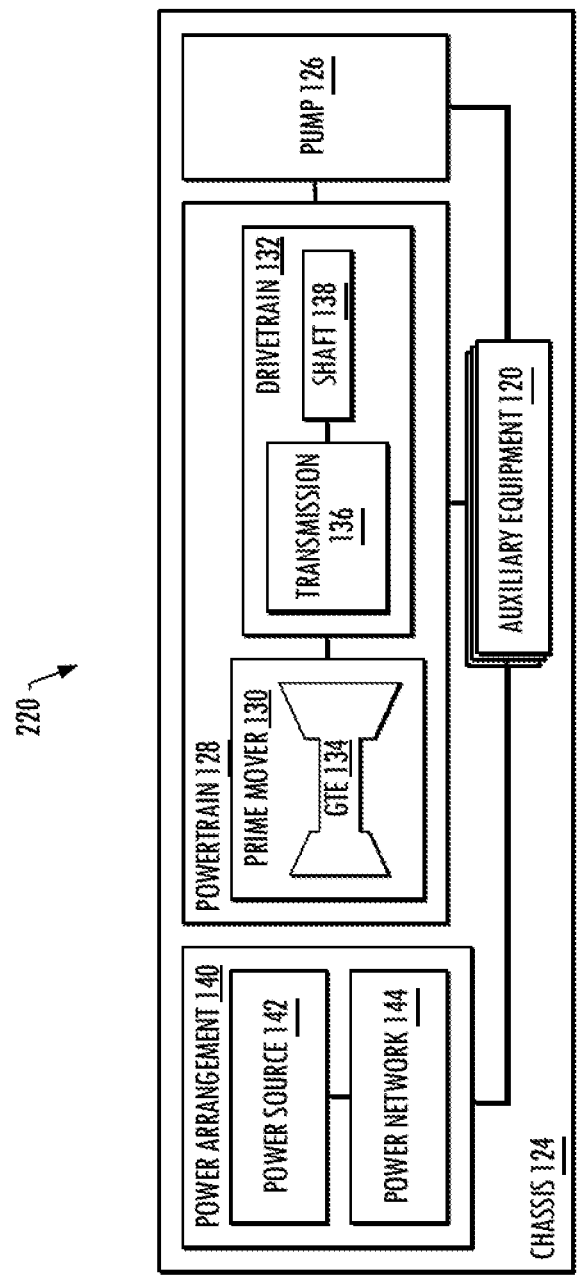
FIG. 7 illustrates an example in which the power arrangement is onboard the hydraulic fracturing unit, according to some embodiments of this disclosure.
Figure 8:
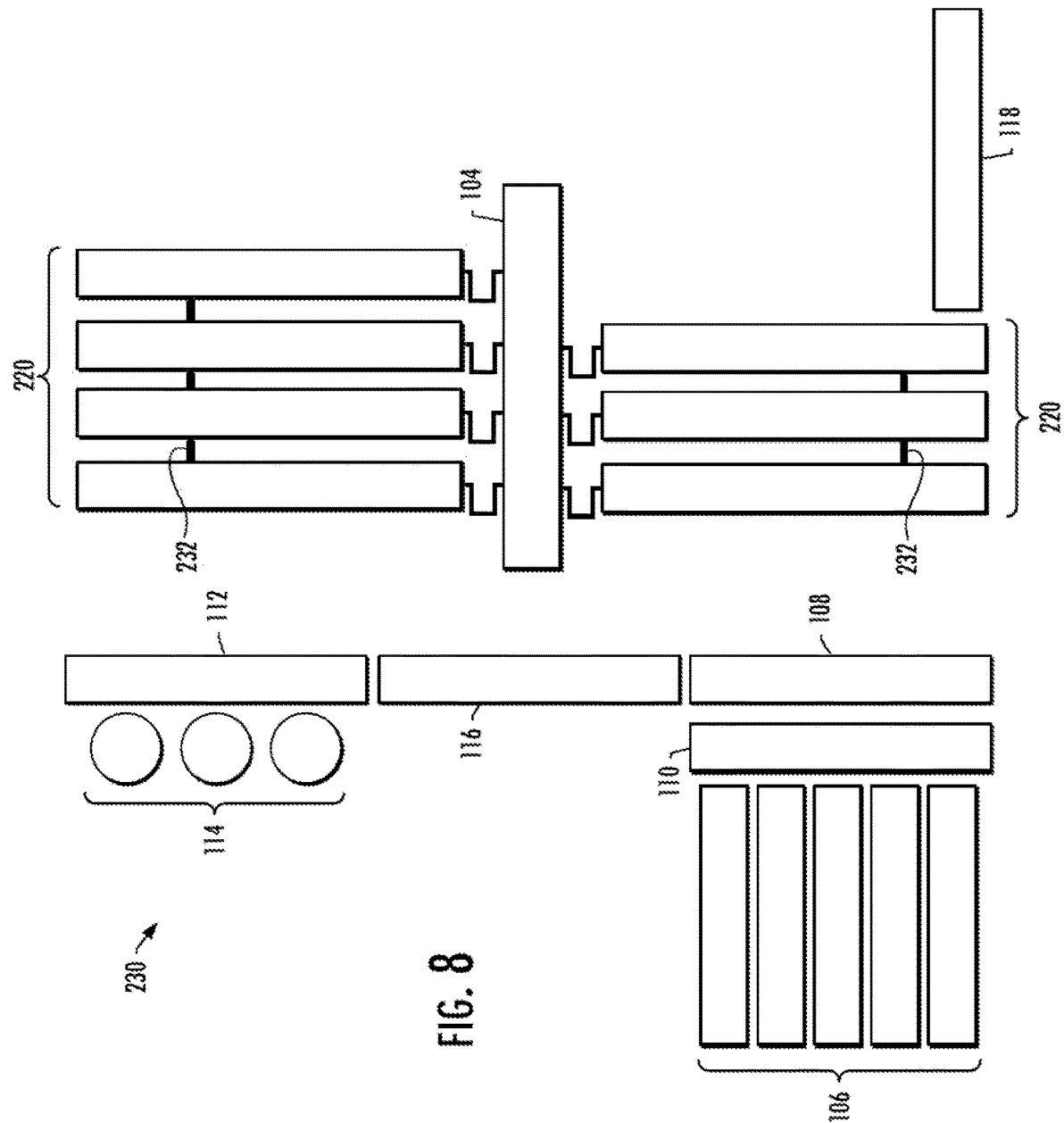
FIGS. 8, 9, and 10 are block diagrams of a system with a plurality of hydraulic fracturing units with respective onboard power arrangements configured to power to respective auxiliary equipment, according to some embodiments of this disclosure.
Figure 9:
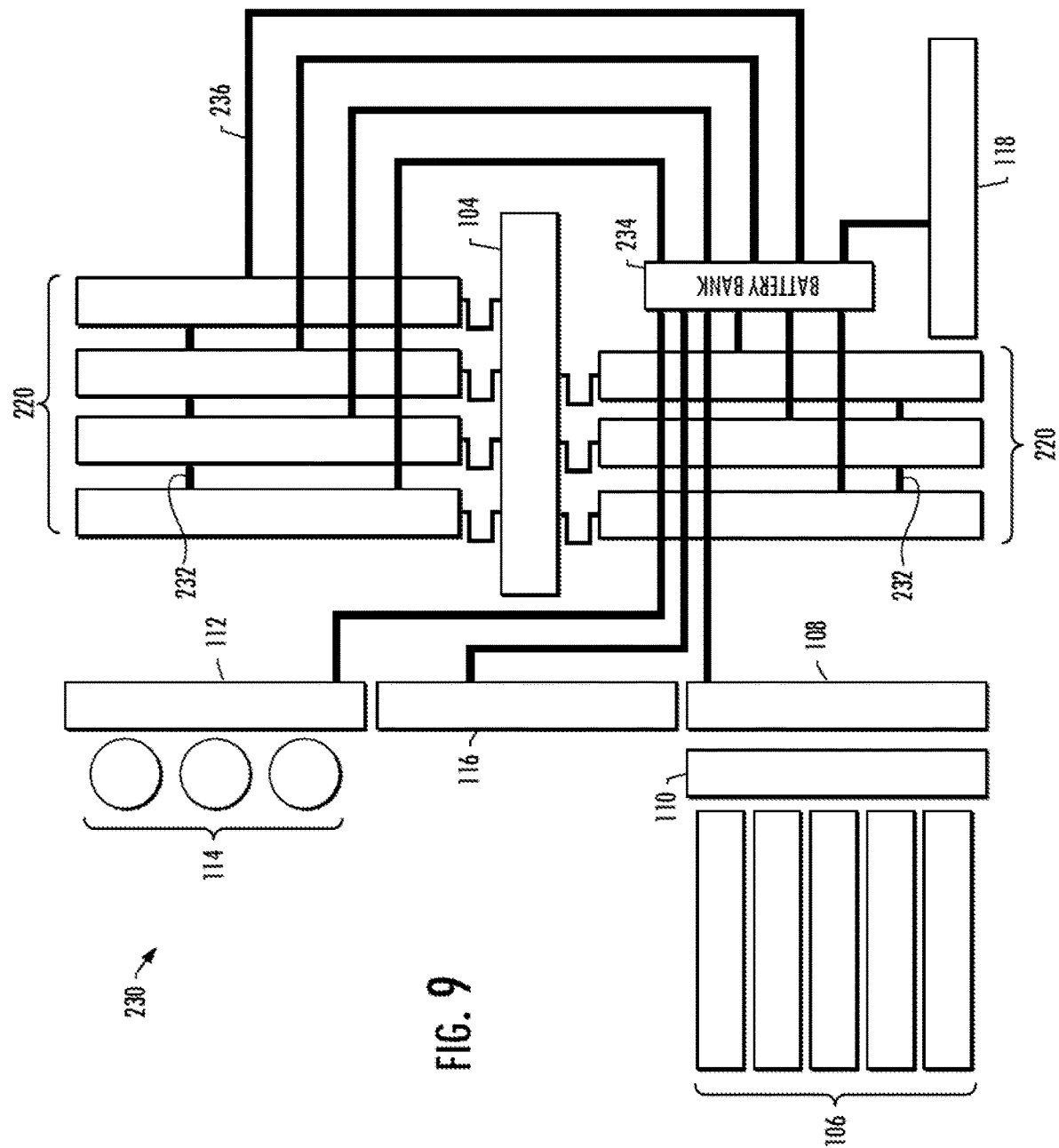
Figure 10:
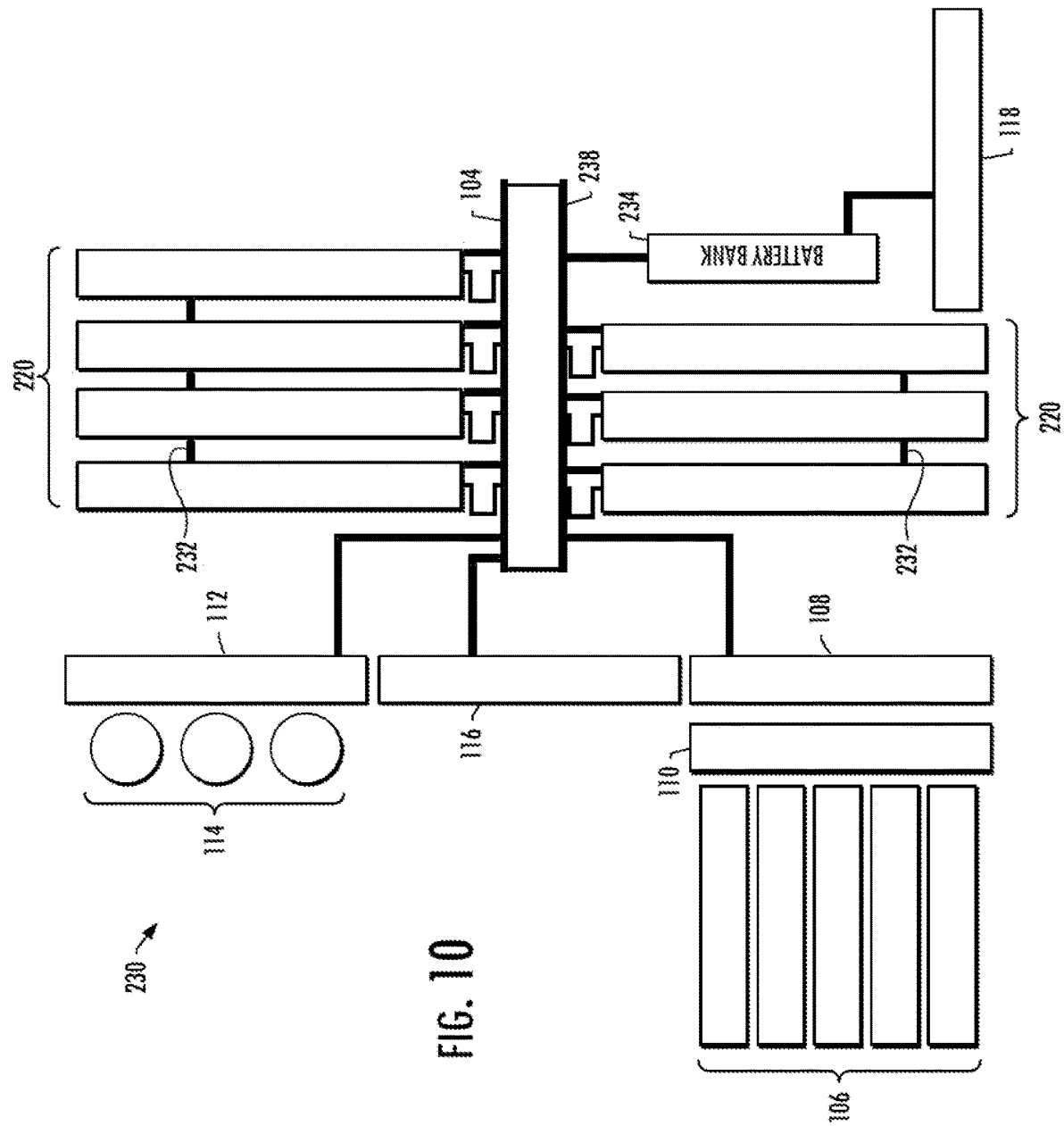

As indicated above, the power arrangement 140 the power arrangement may be located onboard the hydraulic fracturing unit 102. FIG. 7 illustrates an example implementation of a hydraulic fracturing unit 220 in which the power arrangement 140 is connected to the chassis and configured to power the auxiliary equipment 120. FIGS. 8, 9 and 10 illustrate examples of a system 230 including a plurality of these hydraulic fracturing units 220 with respective power arrangements.

As shown in FIGS. 7 and 8, the system 230 for fracturing a well includes a plurality of hydraulic fracturing units 220 including respective pumps 126 configured to pump a fracturing fluid. The plurality of hydraulic fracturing units include respective powertrains 128 configured to power the respective pumps, and respective auxiliary equipment 120 configured to support operation of respective ones of the plurality of hydraulic fracturing units including the respective pumps and the respective powertrains. In addition, the plurality of hydraulic fracturing units further includes respective power arrangements 140 configured to power to the respective auxiliary equipment.

In some examples, the plurality of hydraulic fracturing units 220 include neighboring hydraulic fracturing units, and the respective power arrangements 140 of the neighboring hydraulic fracturing units are connected to one another, and from which the respective auxiliary equipment 120 of the neighboring hydraulic fracturing units are also powerable. This is shown by power cables 232 between neighboring hydraulic fracturing units in FIG. 8.

In the event power is lost on a hydraulic fracturing unit 220 equipped with a respective power arrangement 140, an automatic switching mechanism may allow neighboring hydraulic fracturing units joined by a receptacle and plug to share power. The neighboring hydraulic fracturing unit, then, may be able to provide power to the hydraulic fracturing unit allowing its auxiliary equipment. If for some reason both hydraulic fracturing units wanted to operate at the same time and distribute both of their power to a third hydraulic fracturing unit, the inclusion of synchronizing components such as a synchro scope may ensure the speed and frequency of their power arrangements are the same.

As shown in FIGS. 9 and 10, in some examples, the system 230 further includes a battery bank 234 connected to the respective power arrangements of the hydraulic fracturing units 220 that are configured to generate power from which the battery bank is chargeable. In some of these examples, the battery bank is configured to power the respective auxiliary equipment 120 from the power generated by the respective power arrangements. In addition, backside equipment such as one or more of the chemical unit 108, hydration unit 110, conveyors 112, sand tanks 114, blender 116 or data center 118 may be powered by the battery bank.

In FIG. 9, the battery bank 234 is directly connected to the respective power arrangements by respective power cables 236. In FIG. 10, in some examples, the system 230 further includes an electric bus 238 connecting the respective power arrangements of the hydraulic fracturing units 220, if not also the backside equipment, to the battery bank. The electric bus may also function as the power share and distribution path. In some of these other examples, the electric bus is connected to the manifold 104. Even further, in some examples, the battery bank 234 is also connected to shore power from an external source of electric power (e.g., utility power grid), from which the battery bank 234 may also be chargeable and/or the respective auxiliary equipment may also be powerable. This is shown in FIGS. 9 and 10 in which the battery bank 234 is connected to the data center 118 that is in turn connected to shore power from the external source of electric power.

In other example implementations, the system may include the power arrangement configured to power the auxiliary equipment across the plurality of hydraulic fracturing units 102 if not also backside equipment such as the chemical unit 108, hydration unit 110, conveyors 112, sand tanks 114, blender 116, data center 118 and the like. FIGS. 11, 12, 13 and 14 illustrate examples of a system 250 including a plurality of hydraulic fracturing units 102, and a power arrangement 140 connected to the hydraulic fracturing units 102 and configured to power the respective auxiliary equipment 120 across hydraulic fracturing units 102. In addition, backside equipment may be powered by the power arrangement 140.

Due to high amperage draw from hydraulic fracturing units 102, single power cables carrying the necessary voltage from the power arrangement 140 to the hydraulic fracturing units 102 may not be suitable due to this amperage rating being unachievable. Each hydraulic fracturing unit 102 that relies on the power arrangement to power its auxiliary equipment 120 may have a divided bus to allow the total amperage to the hydraulic fracturing unit to be halved over an aluminum or copper bus bar allowing a single power cable to power each bus. Some backside equipment such as the chemical unit 108 and data center 118 may not require high continuous power and can be equipped with a single power distribution such as a bus bar.

Figure 11:
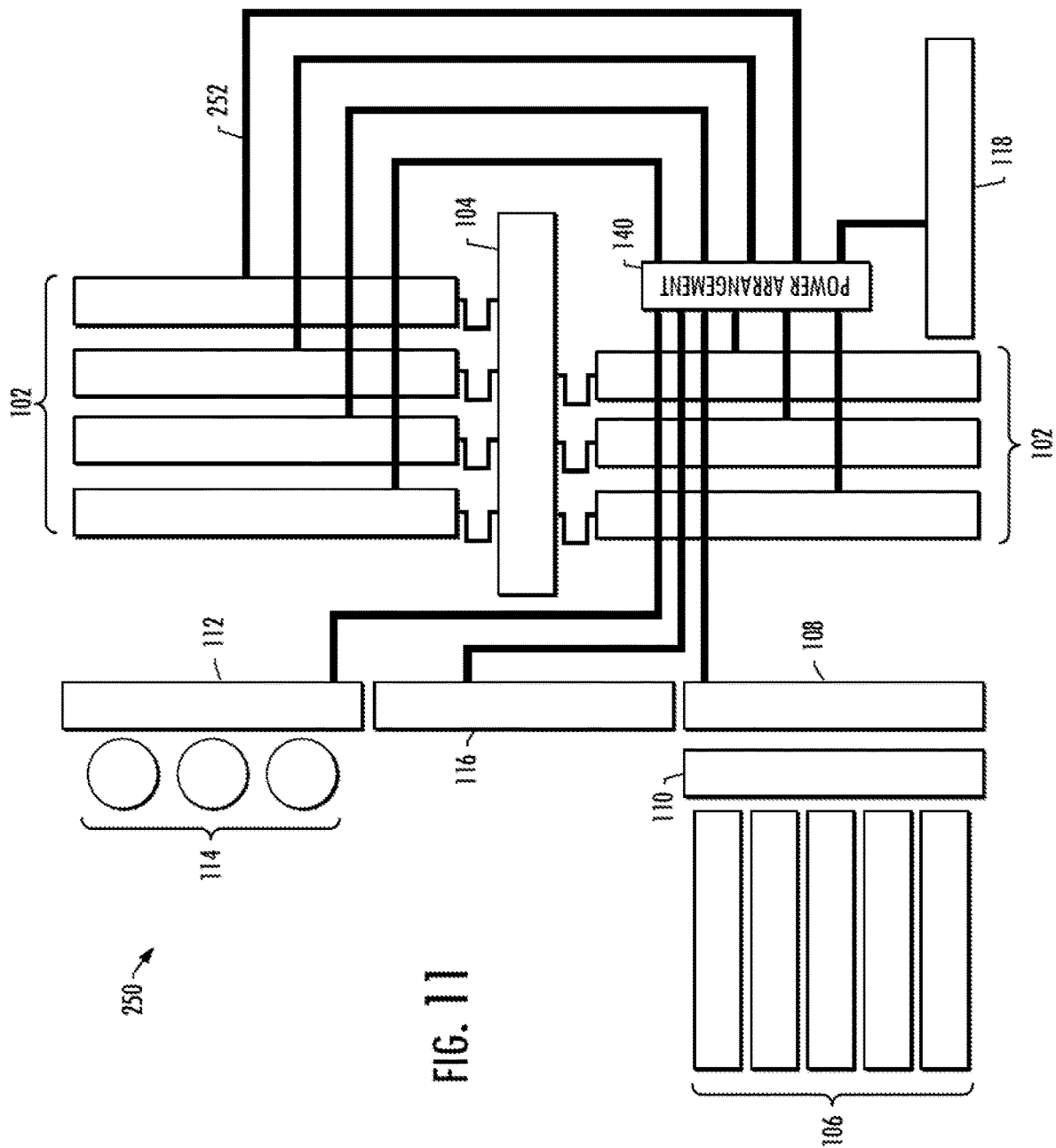
FIGS. 11-14 are block diagrams of a system with a plurality of hydraulic fracturing units, and a power arrangement configured to power to respective auxiliary equipment across the plurality of hydraulic fracturing units, according to some embodiments of this disclosure.
Figure 12:
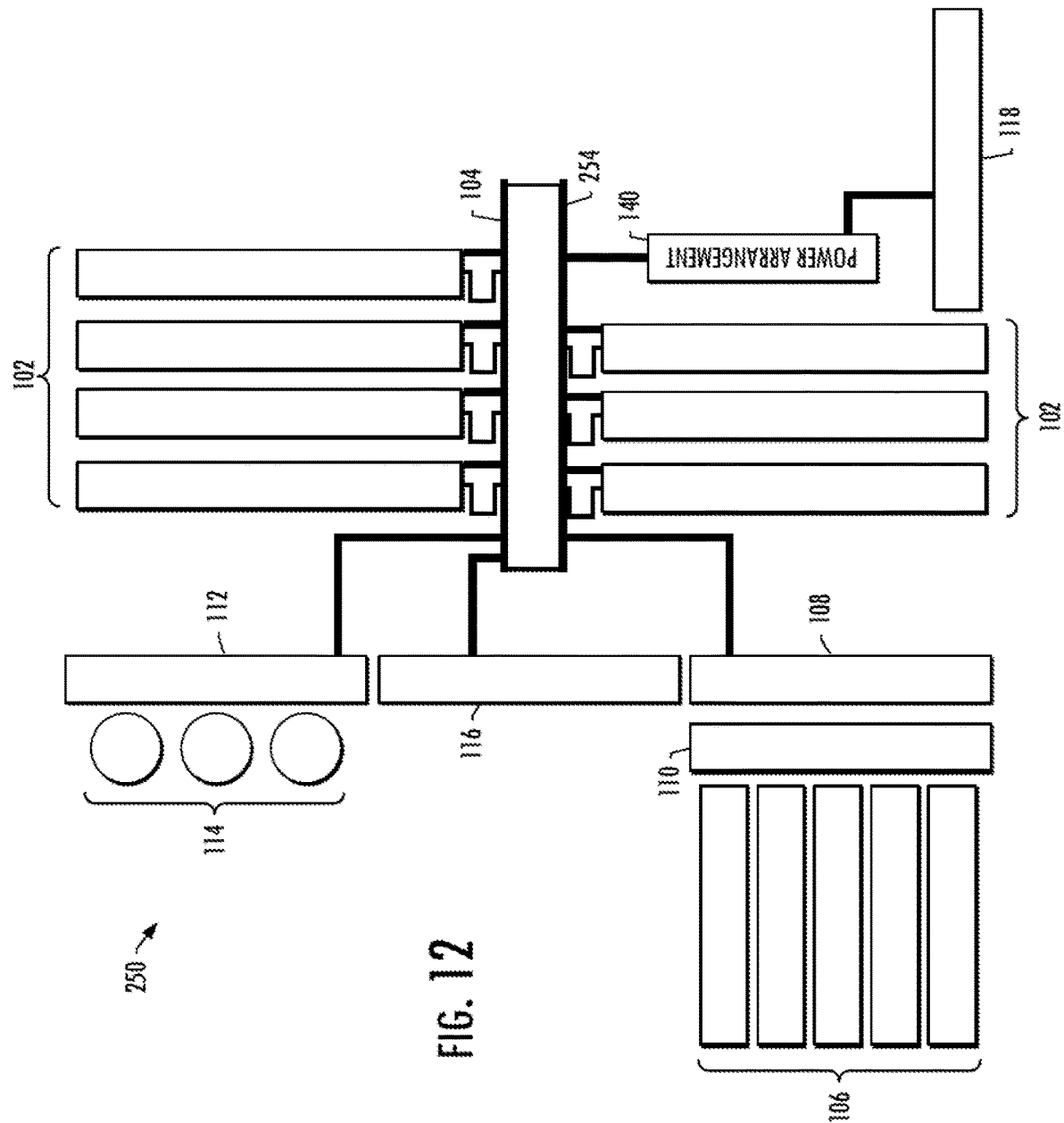

In FIG. 11, the power arrangement 140 is directly connected to the hydraulic fracturing units 102 (and perhaps also the backside equipment) by respective power cables 252. In FIG. 12, in some examples, the system 250 further includes an electric bus 254 connecting the hydraulic fracturing units 102 (and perhaps also the backside equipment) to the power arrangement 140. Similar to before, in some of these other examples, the electric bus 254 is connected to the manifold 104. Even further, in some examples, the power arrangement is also connected to shore power from an external source of electric power (e.g., utility power grid), from which the respective auxiliary equipment may also be powerable. This is shown in FIGS. 11 and 12 in which the power arrangement is connected to the data center 118 that is in turn connected to shore power from the external source of electric power.

Figure 13:
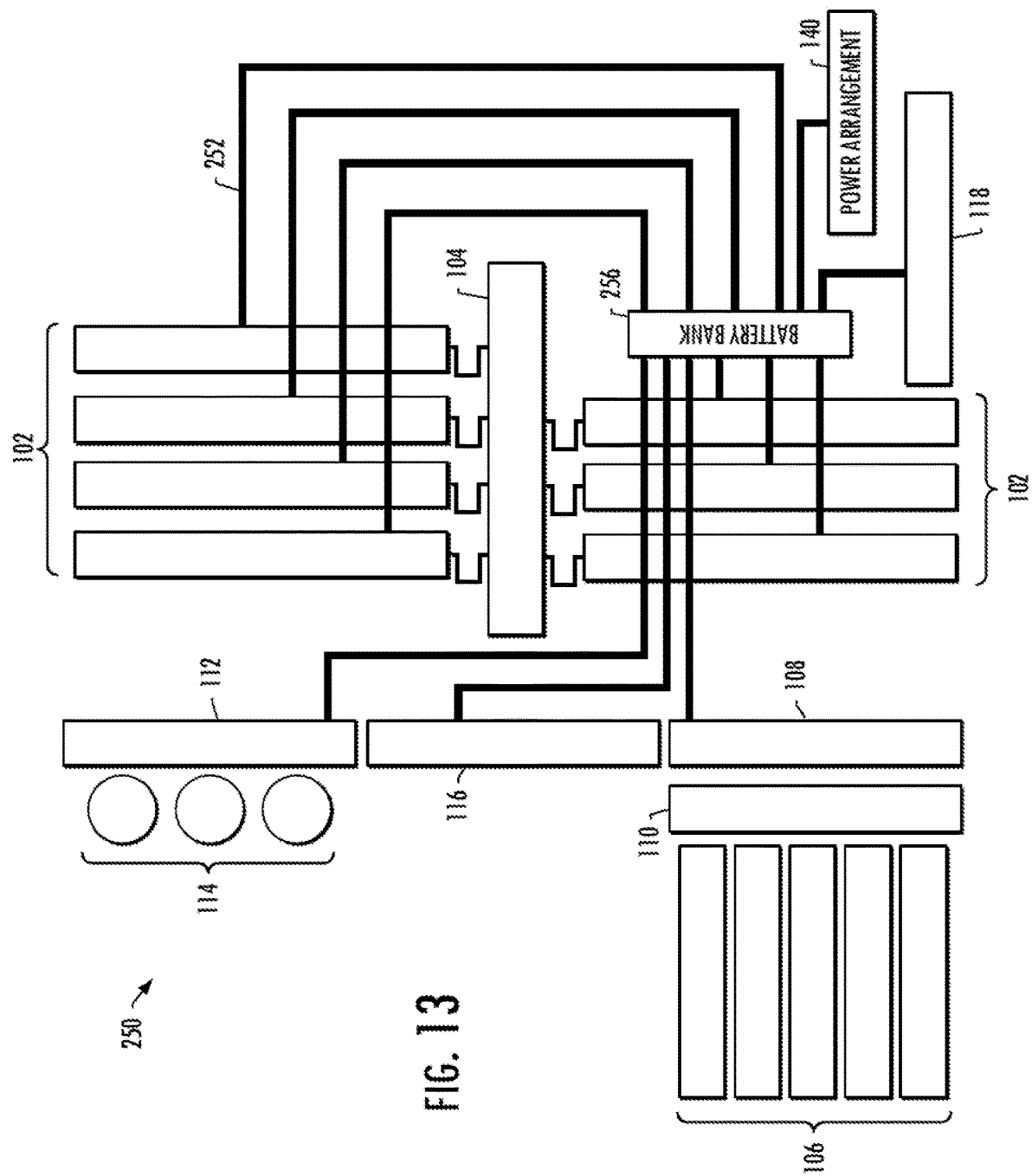
Figure 14:
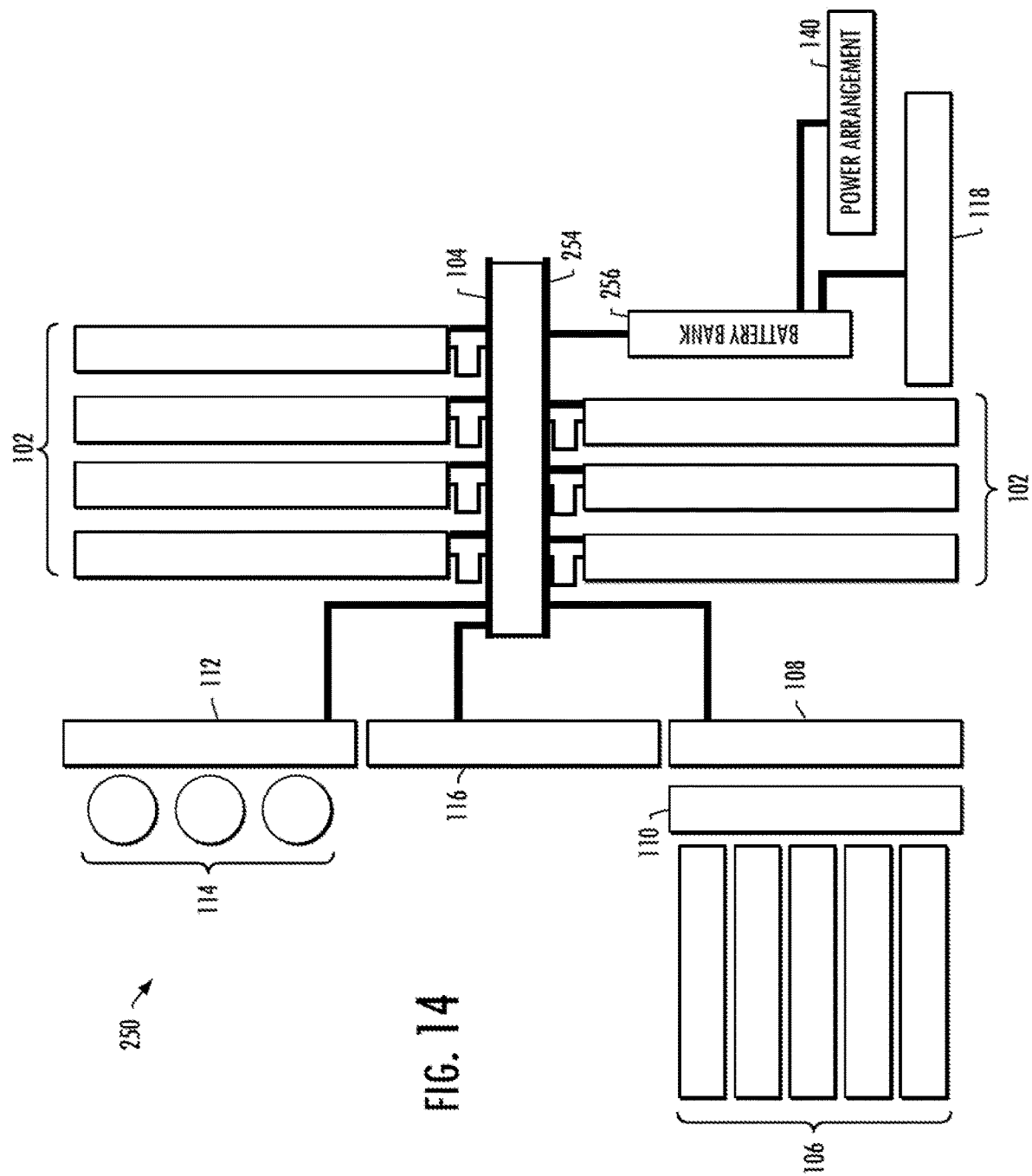

As shown in FIGS. 13 and 14, in some examples in which the power arrangement 140 is an electric power arrangement 150, and includes an electric power source 152, the system further includes a battery bank 256 chargeable from the power generated by the electric power arrangement 140. The battery bank 256 may supply power to the equipment as required. Prior to commencing operations, if the battery bank 256 is charged and fuel to the power arrangement 140, the battery bank 256 may act as a buffer to complete a job. In some examples, when the battery bank 256 is charged, the power arrangement 140 may bypass the battery bank 256, and the battery bank 256 may act as a hub to supply power to the hydraulic fracturing units 102 (and perhaps also the backside equipment).

FIG. 13 is similar to FIG. 11 in that the battery bank 256 is directly connected to the hydraulic fracturing units 102 (and perhaps also the backside equipment) by respective power cables 252. FIG. 14 is similar to FIG. 12 in that the system 250 further includes the electric bus 254 connecting the hydraulic fracturing units 102 (and perhaps also the backside equipment) to the battery bank 256. In FIGS. 13 and 14, the battery bank 256 is configured to power the respective auxiliary equipment 120 across the plurality of hydraulic fracturing units 102. Even further, in some examples, the battery bank 256 is also connected to shore power from the external source of electric power (e.g., utility power grid via connection to the data center 118), from which the battery bank 256 may also be chargeable and/or the respective auxiliary 120 equipment may also be powerable.

Figure 15:
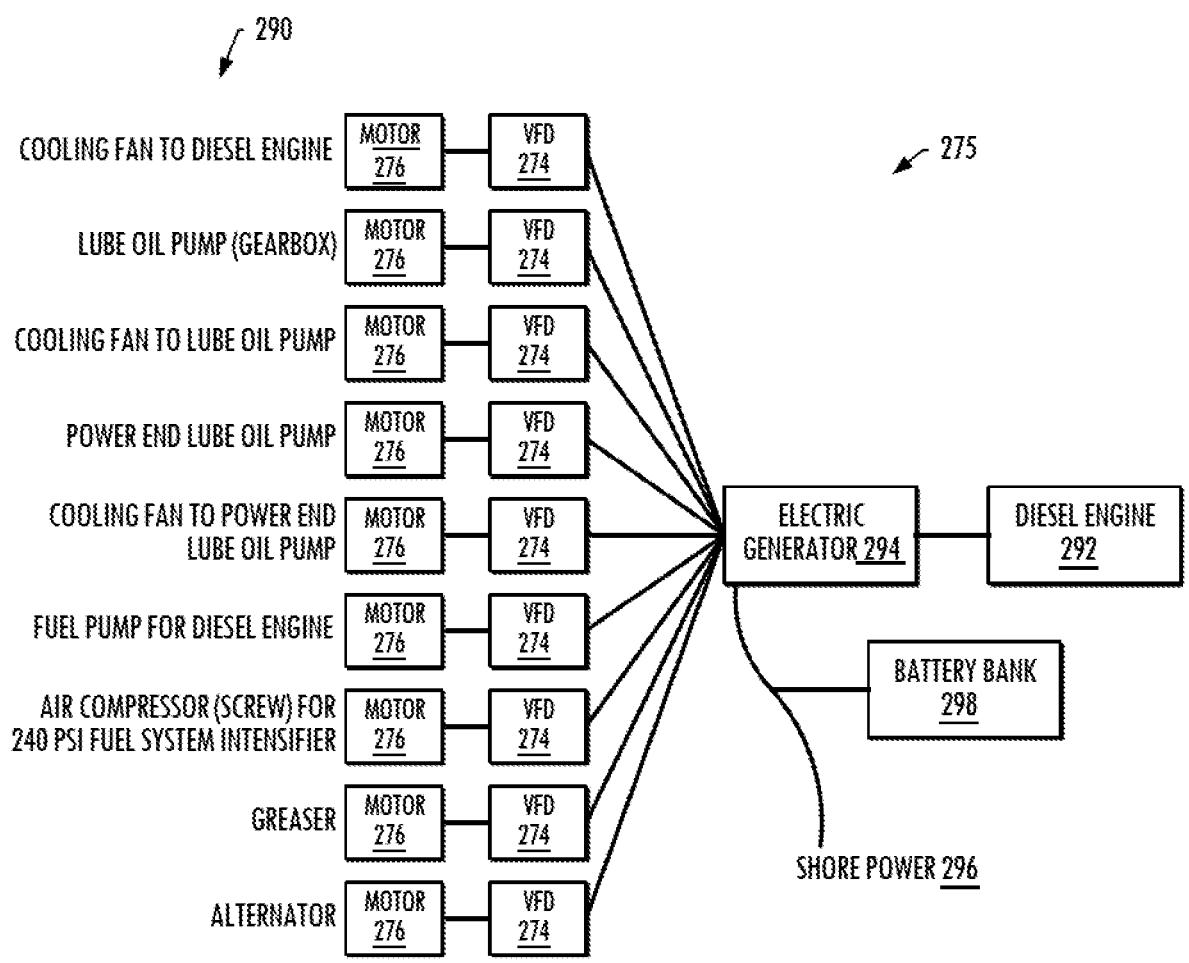
FIG. 15 illustrates another example of an electric power arrangement according to some embodiments of this disclosure.

To further illustrate example implementations of the present disclosure, FIG. 15 is a block diagram a particular electric power arrangement 275 that in some examples may correspond to electric power arrangement 150 shown in FIG. 4. As shown, the electric power arrangement may include a diesel engine 292 and an electric generator 294 to supply power to the system. In some examples, the diesel engine is a 225-300 HP Caterpillar C7 (maximum power rating of 300 HP and a speed between 1,800 to 2,200 RPM), a 335-456 BHP Caterpillar C9 (maximum power rating of 456 HP and a speed between 1,800 to 2,200 RPM), or similar.

The diesel engine 292 may be operatively coupled to the electric generator 294 to supply electrical power to multiple electric drivers that power one or more auxiliary equipment such as cooling fans and lube oil pumps. Examples of a suitable electric generator include a Caterpillar Model SR4 200KW, a Kato 200 KW Model A250180000, and the like. In some examples, the electric generator 294 may be configured to provide 230/240-volt, 3-phase power or 460/480-volt, 3-phase power to individual variable frequency drives (VFDs) 1504 to power various motors 1506 of the auxiliary equipment.

Figure 16:
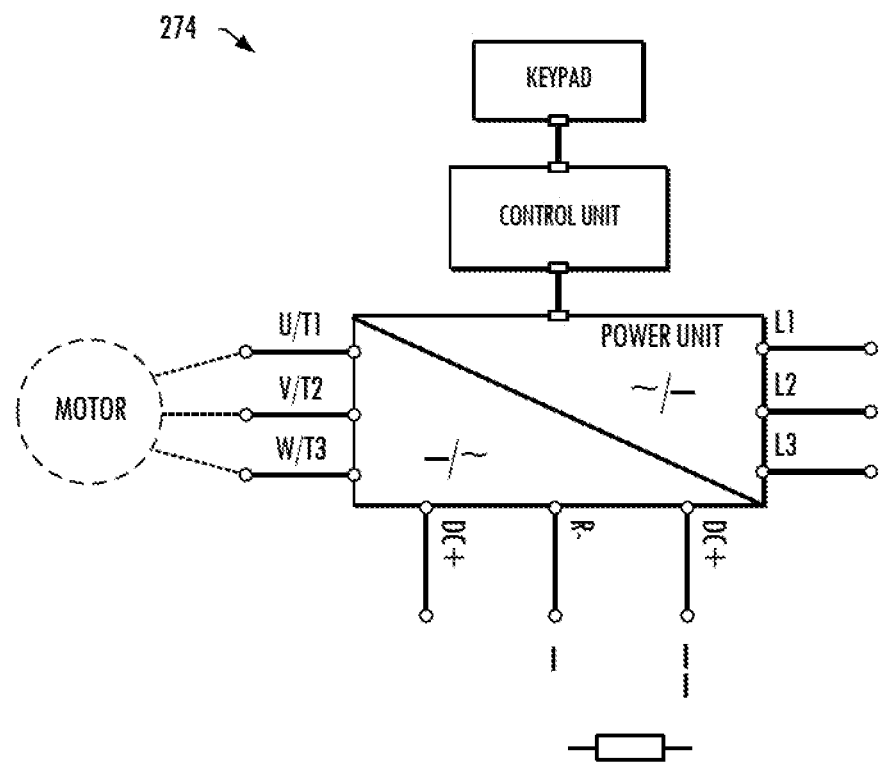
FIG. 16 illustrates an example of a variable frequency drive (VDD) with connections to an AC motor, according to some embodiments of this disclosure.

The VFD 274 may include a full wave three-phase rectifier configured to convert incoming three-phase AC voltage to a desired DC voltage through a plurality (e.g., 9) of silicon controlled rectifiers (SCRs) or diodes. This DC voltage may then power those of the motors 276 that are DC motors. Alternatively, the generated electrical current may be sent through an inverter at the prescribed voltage and synthesized sine wave frequency such that the VFDs may selectively control the operation of AC motors. This may be by the providing prescribed voltage and synthesized sine wave frequency the VFD selectively controls the speed and direction of the AC motors. In some examples, the VFDs 274 may be configured to directly supply AC power to the AC motors 276, thereby eliminating the use on an external inverter. One example of a suitable VFD with connections to an AC motor is depicted in FIG. 16. Examples of suitable VFDs include a Delta #CP 2000 VFD rated for 230 or 460 VAC, max power 1 to 536 HP, a Danfoss #13060888 FC301 460V 3-phase, A Danfoss Vacon 100X, and the like.

The VFDs 274 may power the motors 276 of various auxiliary equipment 290, the operation of each of which may add a load onto the electric power arrangement 275. Examples of various auxiliary equipment and respective approximate loads include:

lube oil pump to the gearbox (1 HP)
cooling fan to gearbox lube oil pump (15 HP)
lube oil pump to the power end (15 HP)
cooling fan to the power end lube oil pump×2 (15 HP each)
cooling fan to the CAT C9 engine (10 HP)
CAT C9 engine air cooling fan (10 HP)

screw type air compressor to provide 150 pounds per square inch (PSI) air for fuel equipment intensifier to amplify to >200 PSI (7.5 HP) with air dryer (0.75 HP)

greaser equipment for the fracturing pump (0.25 HP)

air intake blower fan motors×2 (40 HP each)

GTE controller (1 HP)

hydraulic starter pump equipment (60 HP)

turbine lube cooling fan (4 HP)

telescope exhaust winch×2 (1 HP each)

master PLC for VFD/electric generator (2 HP)

Total 236.5 HP/176 kW

Each auxiliary equipment may add a horsepower drag on the overall electric power arrangement 275, and this drag may depend on characteristics of the auxiliary equipment 290.

As suggested above, in some examples, the electric power arrangement 275 may be more efficient with finer control of cooling and lubrication through feedback loops continuously monitored by processing circuitry such as a programmable logic controller (PLC). Examples of suitable controllers include a Parker IQANTM controller, a Danfoss Plus+ One® controller, or a custom process controller.

In some examples, the electric power arrangement 275 may also be powered by shore power 296 through a separate connection to an external source of electric power. If using shore power, a selectable switch may be configured to selectably separate the electric generator 294 from the shore power 296. In some examples, the electric power arrangement 275 may include or be connected to a battery bank 298 that may supply power in the case of diesel engine failure or shore power failure.

Further consider examples of the system 250 in FIGS. 11-14 in which the hydraulic fracturing units 102 are connected to a power arrangement 140 configured to power the respective auxiliary equipment 120 across hydraulic fracturing units 102. Also consider a particular example in which the system includes seven hydraulic fracturing units. Taking into account efficiency of the electric generator 294 (commonly 80%), a minimum of 300 HP may be distributed per hydraulic fracturing unit. The total demand of the hydraulic fracturing units may depend on how many are rigged up. Further including backside equipment, the electric generator may power the following with respective approximate loads:

hydraulic fracturing units (×7)=1655.5 HP chemical unit=107 HP hydration unit=665 HP sand tanks=750 HP blender=1433 HP data center=500 HP The total horsepower supplied may be approximately 5110 HP (3806 kW). In the case of an electric generator 294 driven by a GTE, one example of a suitable GTE is a Vericor TF50 turbine with a rated to 5600 HP (4200 kW).

Figure 17:
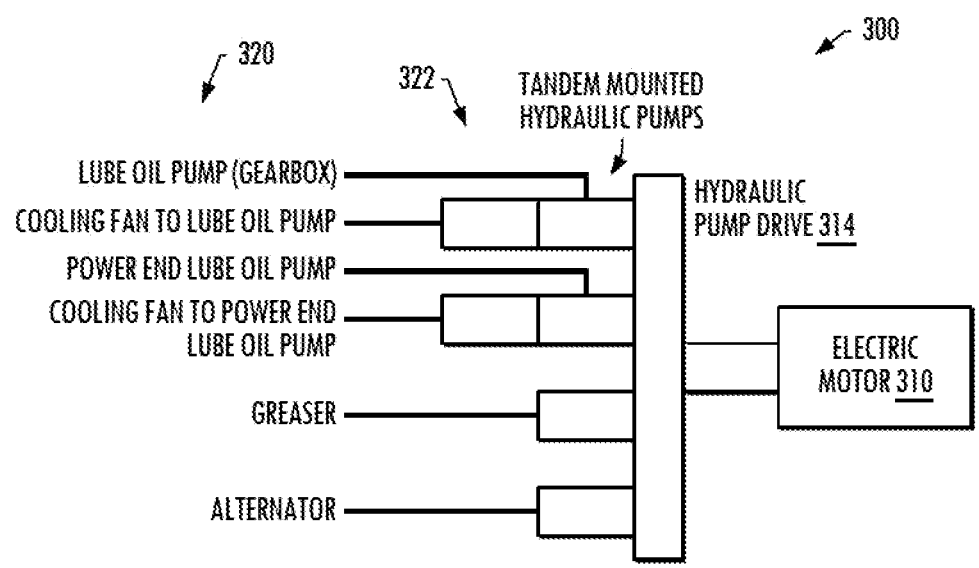
FIG. 17 is a block diagram another example hydraulic power arrangement according to some embodiments of this disclosure.

FIG. 17 is a block diagram a particular hydraulic power arrangement 300 that in some examples may correspond to hydraulic power arrangement 180 shown in FIG. 5. As shown, the hydraulic power arrangement includes an electric motor 310 such as a 300 HP electric motor coupled to a module hydraulic pump drive 314 with multiple (e.g., four) output gear shafts. The number of module hydraulic pump drives and output gear shafts may be varied to suit a particular application. Examples of a suitable electric motor include a Grainger 300 HP fire pump motor (460 V, 3-phase, 1780 RPM), a Baldor 300 HP motor (460 V, 3-phase, 1780 RPM), or the like. One example of a suitable module hydraulic pump drive is a Durst hydraulic pump drive gearbox #4PD08.

The module hydraulic pump drive 314 may power auxiliary equipment 320 though motors and hydraulic pumps 322, which may be coupled to the module hydraulic pump drive individually or in tandem. In this regard, the hydraulic pumps may be configured to supply hydraulic fluid to corresponding hydraulic motors of various auxiliary equipment. These again may power auxiliary equipment such as cooling fans and lube oil pumps. Examples of various auxiliary equipment and respective approximate loads include:

lube oil pump to the gearbox (1 HP)

cooling fan to gearbox lube oil pump (8 HP)

lube oil pump to the power end low pressure (11 HP)

lube oil pump to the power end high pressure (18 HP)

cooling fan to the power end lube oil pump (40 HP)

greaser equipment for the fracturing pump (1 HP)

Turbine Fuel Pump (1.5 HP)

Turbine Washing System (1 HP)

Turbine/Gearbox/Hydraulic Cooler Fan (40 HP)

Air exchange Fans (10 HP)

Hydraulic Pump for Turbine Starter, Lid openings, Compressor etc (70 HP)

Total 201 HP/150.37 kW

This hydraulic power arrangement 300 does not rely on a diesel engine but instead an electric motor that may operate off shore power from an external source of electric power that may supply power to multiple units on a jobsite, thereby eliminating at least several components that may be required for a diesel engine (e.g., a fuel pump, an air compressor, an engine cooling fan).

Figure 18:
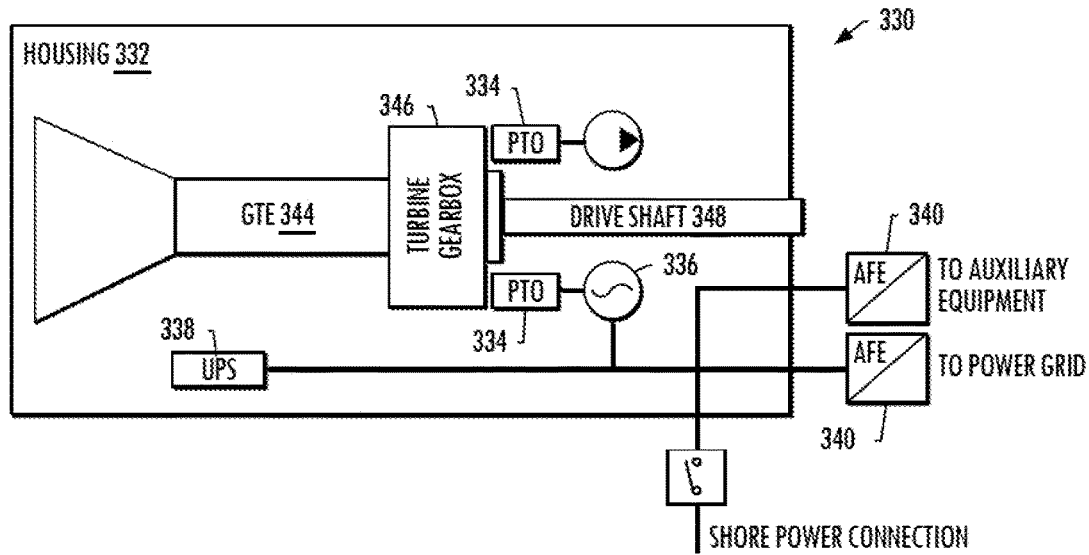
FIG. 18 is a block diagram another power arrangement according to some embodiments of this disclosure.

FIG. 18 is a block diagram another particular power arrangement 330 that may be connected to a powertrain 332 that corresponds to powertrain 128. As shown, the powertrain includes a housing with a GTE 344 coupled to a turbine gearbox 346 (reduction transmission) connected to a drive shaft 348, which, in turn, may be connected to the pump such as via an input shaft or input flange of the pump. The hydraulic power source includes a plurality of PTOs 334 connected to the turbine gearbox, and at least one of the PTOs may be connected to an alternator 336 or other electric generator. The alternator 336 may be configured to generate electric power from which auxiliary equipment may be powered, and any unused electric power may be feedback to an external source such as the utility power grid.

In some examples, the alternator 336 may be engaged with or disengaged from the PTO 334 via a hydraulic or pneumatic clutch to allow the GTE 344 to direct more power through the drivetrain and into the pump if needed. When disengaged from the PTO, the auxiliary equipment may be powered from shore power connections and other generated grid power. When the alternator is engaged with the PTO 334, as well as feeding auxiliary equipment such as cooling fans and compressors, an uninterrupted power source (UPS) 338 may be constantly charged during pumping operations. This UPS 338 may be used to solely drive a hydraulic pump that will be used to start the GTE by feeding hydraulic power to the motor starter.

Figure 19:
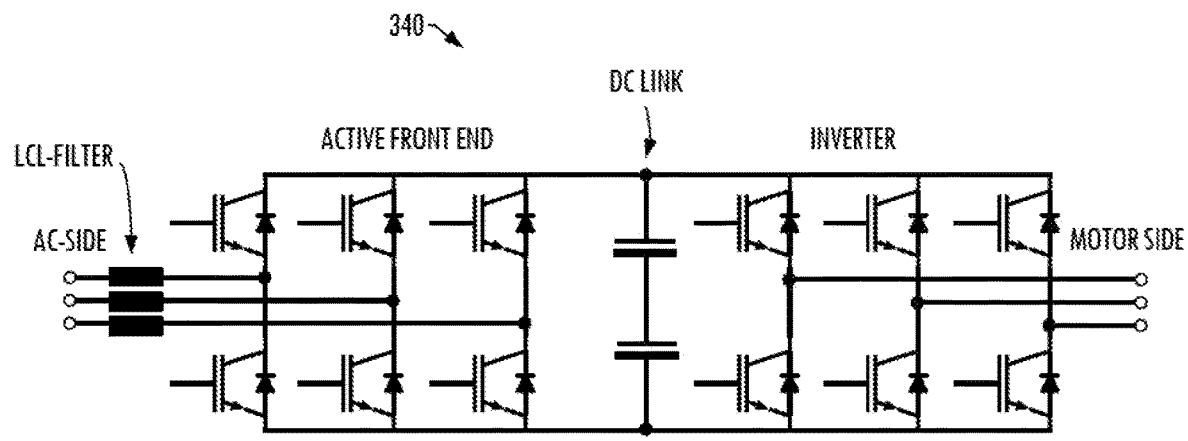
FIG. 19 illustrates an active front end (AFE) according to some embodiments of this disclosure.

An active front end (AFE) 340 may be placed on the two outputs of the alternator 336 to change AC voltage to DC. FIG. 19 illustrates one example of a suitable AFE 340. As shown, the AFE 340 may include IBGTs (insulated bipolar gate resistors), which may ensue that harmonics and other power sent through the AFE 340 are dampened and power efficiency is increased. As well as treating alternator power, another AFE 340 may also treat raw shore power coming into the grid in the same way.

Figure 20:
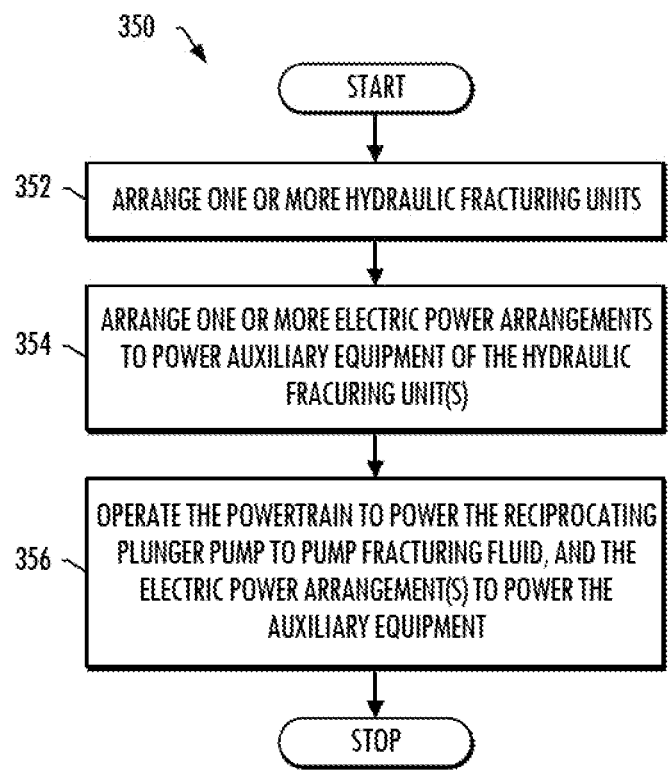
FIGS. 20 and 21 are flowcharts illustrating various operations in methods of fracturing a well, according to some embodiments of this disclosure.

FIG. 20 is a flowchart illustrating various operations in a method 350 of fracturing a well, according to various example implementations. The method 350 includes arranging one or more hydraulic fracturing units 102, 220, as shown at block 352. Each hydraulic fracturing unit includes a reciprocating plunger pump 126 configured to pump a fracturing fluid, a powertrain 128 configured to power the reciprocating plunger pump, and auxiliary equipment 120 driven to support operation of the hydraulic fracturing unit including the reciprocating plunger pump and the powertrain. The method 350 includes arranging one or more electric power arrangements 150 to power the auxiliary equipment, as shown at block 354. And the method 350 includes operating the powertrain to power the reciprocating plunger pump to pump the fracturing fluid, and the electric power arrangement to power the auxiliary equipment, as shown at block 356.

Figure 21:
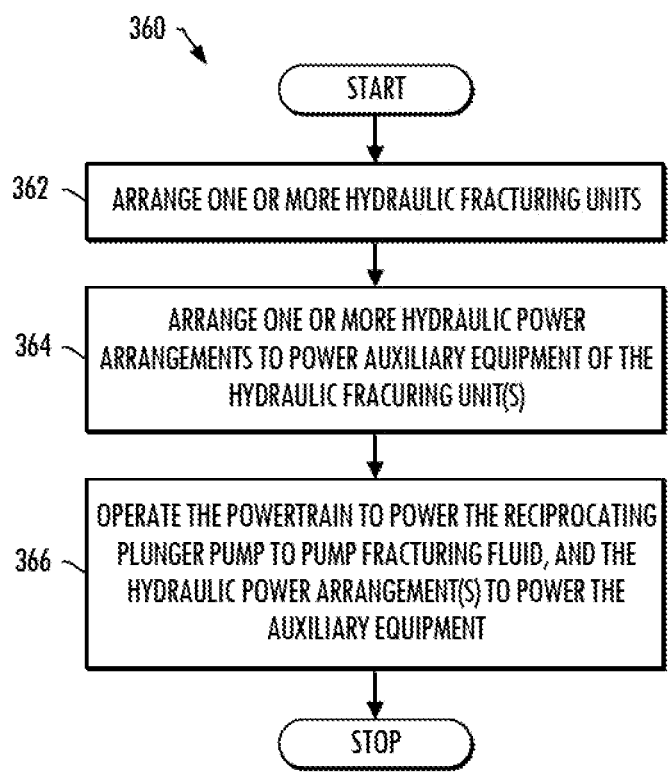

FIG. 21 is a flowchart illustrating various operations in a method 360 of fracturing a well, according to various other example implementations. The method 360 includes arranging one or more hydraulic fracturing units 102, 220, as shown at block 362. Each hydraulic fracturing unit includes a reciprocating plunger pump 126 configured to pump a fracturing fluid, a powertrain 128 configured to power the reciprocating plunger pump, and auxiliary equipment 120 driven to support operation of the hydraulic fracturing unit including the reciprocating plunger pump and the powertrain. The method 360 includes arranging one or more hydraulic power arrangements 180, 200 to power the auxiliary equipment, as shown at block 364. And the method 360 includes operating the powertrain to power the reciprocating plunger pump to pump the fracturing fluid, and the hydraulic power arrangement to power the auxiliary equipment, as shown at block 366.

As described above and reiterated below with further example implementation details, various example implementations are disclosed herein that provide power arrangements and methods for powering of auxiliary equipment onboard a hydraulic fracturing unit such as a DDT hydraulic fracturing unit or trailer. The auxiliary equipment include, for example, cooling of process fluids through heat exchangers, pumping equipment, compressor units, winches and linear actuators, electrical control equipment, heats/coolers and hydraulic equipment. The power arrangements of example implementations may be configurable and may be adjusted to suit the needs of each individual scenario and situation.

Some example implementations of a power arrangement include an engine or prime mover onboard the gooseneck area of a GTE-driven hydraulic fracturing unit. The engine/prime mover may be connected to an electric power generator such as a PM motor or a hydraulic pump drive with one or more pumps.

Some example implementations include a diesel reciprocating engine onboard the GTE-driven hydraulic fracturing unit, and other example implementations includes an electric motor in place of the diesel engine. The location of the engine/motor may be the gooseneck area of a trailer, but the design of the trailer may permit installation of the engine/motor on the rear axles of the trailer.

In examples including the diesel engine, it may be equipped with supporting equipment such as fuel reservoirs, coolant reservoirs, battery banks, diesel exhaust fluid tanks and cooling fans. The cooling fan on the diesel engine may be supplied by the engine manufacturer and mounted from a PTO located on the engine or it may be made external and powered from the hydraulic power network coming from the hydraulic pump drive. In another implementation, the diesel engine may be replaced with an electric motor that when installed is accompanied by electric switch gear that houses overload protection as well as a form of isolating the electric motor. Directly mounted from the diesel engine may be the hydraulic pump drive, which may be connected to the electric motor in another implementation.

The hydraulic pump drive may have a female spur shaft connection that is installed onto the diesel engine or electric motor, and the two components may be secured via a bell housing that connects a face of the engine/motor to a face of the hydraulic pump drive. Once installed the hydraulic pump drive may be configured to house up to four pumps but will be rated by the total amount of horse power and torque it may yield at each output gear. Depending on the application, the use of a large displacement single pump directly coupled to the diesel engine may be beneficial. But there may be equal portion of components over the trailer that are operating at different pressures, such as a compressor and fans that operate at a flow that will generate 2000 PSI, and the pumps may operate at 3000 PSI at rated flow. Therefore, a variable displacement hydraulic pump with a compensator setting of 2000 PSI, and another pump with a compensator setting of 3000 PSI, may meet pressure requirements of each circuit bearing in mind that the output flow rate of each pumps should meet the flow demand from all components.

Depending on the configuration of pumps there may be multiple hydraulic reservoirs installed on the hydraulic fracturing unit that would allow for each individual pump installed on the hydraulic pump drive to draw fluid from. This may mean that a pump with a greater suction vacuum would not take away fluid from a pump with a small displacement therefore a smaller suction pressure. Alternatively pump suction lines may be positioned in a way this does not happen, but the size of the reservoir and mounting location of the reservoir dictate this. The space taken up by the hydraulic reservoir may depend on flow demand within the auxiliary equipment. The dwell time for fluid may be greater in the individual or group of reservoirs due to the hydraulic power network being open circuit, meaning that the displaced fluid from the pump may go to the desired component and then return to tank opposed to returning to the pumps suction side.

The hydraulic power network coming from the hydraulic pump drive may be equipped with filtration in the form of single or double housings that ensure fluid cleanliness is maintained to the best industry standard that is usually dictated by the International Organization for Standardization (ISO) fluid cleanliness classification.

A diesel engine directly coupled to a hydraulic pump drive that is installed with hydraulic pumps may allow for great versatility. The adjustment of pump pressure and flow settings may allow the pumps to operate at their maximum efficiency while still ensuring they meet the power demands of the auxiliary equipment.

Working in conjunction with the hydraulic pumps may be hydraulic directional control valves that isolate fluid going to individual circuits, and when actuated, allow a valve spool to shift and direct flow through the ports. In the case of hydraulic motors driving fluid pumps and fans, these components may be controlled to operate in a single direction to avoid damage to pumps and mis-operation of fans. This may be done by selecting a directional control valve with a closed center and two positions.

In a de-energized state there may be no flow through the valve, resulting in the pump swash plate to move to the neutral position and stop displacing fluid. When operated via an electric signal energizing the solenoid from an electric control system, or commonly referred to as a supervisory control system (SCS), flow may be allowed to pass through the control valve to the designated auxiliary equipment that may operate a hydraulic motor. Return fluid may also be plumbed back to the hydraulic control valve and passed to a return line where it may be diverted back to the hydraulic reservoir. The control valves may be installed in multiple valves assemblies, commonly referred to as a "valve bank."

Another part of the hydraulic power arrangement may be cooling circuits. The operation of hydraulic power networks may generate heat as the fluid flowing through different orifices, and the resulting pressure drop yields heat into the fluid that may not only degrade fluid lubrication properties but also cause problems to the components being operated with the fluid. To mitigate this, hydraulic cooling circuits may be installed that are activated by thermostatic control valves. When the fluid gets too hot, the valve may open and diverts fluid though a fan driven heat exchanger ensuring that it's cooled prior to returning to the reservoir and being introduced back into the hydraulic power network.

The diesel engine and hydraulic package may be configured to easily fit onto the gooseneck of a standard hydraulic fracturing unit while still ensuring space for additional components such as reservoirs, heat exchangers and compressors. Hydraulic pumps installed from the hydraulic pump drive or directly from the engine are often very versatile. Ensuring that the flow requirements may be met, the pumps pressure compensator setting, as well as the introduction of load sensing, may ensure that only the required amount of power is drawn from the hydraulic pump. This may mean that the engine is operated at the power required, and that wasted energy and fuel is eradicated, thereby improving efficiency.

The complexity of an individual hydraulic power network is not high, and the introduction of a hydraulic pump drive with multiple individual network branches may still maintain a simple approach without the need to interface all pumps into a single common pressure line. The versatility of adding hydraulic pump drives with different output gears while still maintaining the same circuitry in place may be a benefit of a driven hydraulic network branch and allow for expansion in circuitry without the need to perform complex adjustments.

Operation of a circuit during hydraulic fracturing may be as follows. The SCS may operate from a battery storage device, which may be charged from an alternator or shore power provided to the implementation inclusive of an electric motor driving the hydraulic power network. The SCS may interface with the diesel engine through the engines electric control module (ECM), and from this, the engine may be given start, stop or throttle commands. Engine equipment information may also be sent through J1939 communication protocol.

During startup of the hydraulic fracturing unit, the diesel engine may be sent a start command and reach idle speed; or in another example implementation, electric power brought onboard may enter a VFD. The SCS may send a digital output to the drive to start up. In addition to that digital signal, an analog signal in the state of 4-20 mA or 0-10V may be used to control the speed. The SCS may command the prime mover on the diesel engine to then go to a run speed which is typically 1900 RPM for most systems but could be as high as 2100 or as low as 1700 RPM. This speed may allow the hydraulic power source to operate at maximum power output and begin supplying flow into the hydraulic power network. The directional control valves may then be operated in a sequence ensuring that all pre-conditions are met before bringing the turbine engine online.

When the fuel and lubrication pumps are operating within the correct parameters, the GTE start motor may be operated. This axial motor may be installed on a gearbox or other transmission toward a cold end of the turbine engine, and it may receive hydraulic flow. When the GTE reaches an idle speed, a sprag clutch in the turbine starter motor assembly may disengage, allowing combustion within the turbine combustion chamber to maintain the turbine speed. Upon reaching the idle speed, a signal may be removed from the hydraulic control valves to halt fluid to the starter motor. The hydraulic power arrangement may then operate the turbine engine and pump auxiliary equipment to distribute hydraulic flow through the control valves as per logic programmed into the SCS. As with startup of the diesel engine or operation of the electric motor, the SCS may be responsible for sending shutdown signals to either the diesel engine's ECM or electric motor frequency drive.

In other example implementations, the hydraulic power arrangement may be replaced with an electric motor such as a PM motor that is directly coupled to the engine output shaft and connected to the engine housing via a bell housing adapter. However, a splined coupling may interface the two shafts, and a coupling may connect these splined adapters together. The PM motor may operate at an optimal speed of 1900 RPM to generate 500 VAC power. At this speed and power generation, an electric generator may yield a power factor of 0.93 making the generator highly efficient.

The electric generator may also include a cooling circuit that is operable between 5-10 gallons per minute (GPM) and acts as a heat exchanger through the generator ensuring that the temperature on the generator winding does not exceed 175 degrees Celsius. A small pump to circulate this fluid may be first driven from battery storage device until the electric generator comes online and begins to re-charge the battery storage device and then power its own cooling pump.

Coming from the generator may be the electric conditioning station that may also be located on the gooseneck in a water and dust proof IP66 enclosure. A cable carrying three-phase power may enter the enclosure into a main isolation breaker with overload protection, and from this, the power cable may be run into an AFE drive that may condition the signal into a DC voltage. Control of this AFE may be through the SCS, and communication may be carried out via modbus protocol. Downstream of the AFE may be a main DC bus bar that may hold the electric potential to distribute power to each individual control circuit around the hydraulic fracturing unit.

From the bus bar there may be an individual circuit protection breaker for each control circuit that may be equipped with overload protection. In the event the current drawn from the motor in the control circuit is too great, the overload protection may trip the breaker resulting in power loss to that circuit and protection of all components in that circuit. From these individual circuit breakers, armored and shielded cables may then leave the enclosure through bulkhead connections equipped with explosion proof glands and assembly methods that ensure the integrity of the main switch gear assembly may be protected from potentially combustible gases. The cables may be secured in a cable tray that may then run to areas in which the electric motors may be in place.

Prior to terminating the electric supply cables to the motor, the cables may first be terminated to an inverter drive that may convert the DC voltage into an AC voltage. The benefit of this may be the ease of sourcing AC electric motors and their lower capital costs. The inverter may condition the power coming in and leaving the drive. The inverter may also allow for proportional speed control of the motor and soft start functioning of the motor to reduce a current rush into the motor potentially tripping any circuit overload protection in the drive or back at the main isolator coming from the common bus bar.

The electric motors connected to the electric drives may be used in place of hydraulic motors as detailed in other example implementation but may still be fluidly connected to the driven equipment such as pumps, fans, compressors with the use of couplings and bell housing adapters. Other driven equipment may be driven with the use of electric motors and are contemplated herein.

A method of operation of the power arrangement of some examples may be as follows. The engine may be brought online in a similar manor to the previously described implementation in which the SCS may send a start signal to the diesel engine ECM via J1939 communication protocol. The engine may be brought online to a speed of 1900 RPM, at which point the electric generator may be producing 500 VAC electric power with the electric potential of up to 223KW.

The alternating current power form the electric generator may enter the electric conditioning assembly including the main isolator and the AFE rectifier that may convert the power to DC and distribute it over the electric bus bar. Current may be then able to flow into the main isolator for each electric circuit. The current may then flow around the hydraulic fracturing unit via the correctly sizes armor shielded electric cable into the inverter drive. The inverters may be networked and communicated with from the SCS. The SCS may function the inverter drive and alter the frequency in which the IBGTs of the AFE sequence, which may result in the frequency leaving the drive to the motor to be controlled, and thereby controlling the speed of which the motors turns.

The power arrangement of these example implementations may allow for very accurate control of the individual circuitry. The analog signals to the drives may ensure that the frequency provided to the electric motors allows for exact RPMs to be met within 5-10 RPM tolerance. Electric motors may also provide a robust option for driving pumps and other auxiliary equipment. The lack of potential fluid contamination or fluid degradation usually allows these motors to stay in service longer ensuring that load bearings are greased and correct mounting of the motor may be performed. This implementation to drive auxiliary equipment of the hydraulic fracturing unit with electric motors may also provide benefit from lack of fluid travelling the entirety of the hydraulic fracturing unit, which may be susceptible to pressure drops and leaks.

As previously mentioned, the ability to share generated power may be a benefit of the diesel engine and generator set up. For example, if ten hydraulic fracturing units are on location, and each generator produces more power than may be required on the individual hydraulic fracturing unit, a shared power configuration could see a portion of the ten hydraulic fracturing unit gen-sets taken offline and the remainder of the hydraulic fracturing units providing all hydraulic fracturing units with the total amount of electric energy required.

Another example implementation of a method to power auxiliary equipment onboard hydraulic fracturing units may utilize the GTE transmission and include PTOs on the transmission to power a smaller electric generator and a single multistage pump. In some of these examples, a transmission such as a gearbox with a single input and output shaft may be modified to account for two additional PTOs positioned either side of the main output shaft or flange. These PTOs may be equipped with clutches that may be operated either pneumatically or hydraulically (or electrically in other example implementations).

As well as the installation of the transmission with the PTOs, additional equipment may be installed onto the GTE-driven hydraulic fracturing unit to ensure that a controlled startup may be performed to get to a point where it may be self-sustained from its own operation. Taking this into account, a battery bank with one or more high-powered lithium-ion batteries may be used to provide the starting power for onboard auxiliary equipment such as lube and fuel pumps as well as powering the electric motor that may be coupled to the GTE starter gear. Once the GTE is at running speed and there is motion at the output shaft, the clutches may be engaged to allow for the pumps and electric generator to receive torque and motion from the transmission and start to displace fluid and generate power.

A single pump may address the needs of the reciprocating fracturing pump, and the single pump be a multistage pump that allows fluid to enter both low and high pressure sides of the pump. In other example implementations, the electric generator installed onto the diesel engine may supply enough power to all of the onboard auxiliary equipment. This may be not feasible when using a PTO from the transmission due to the footprint available and the large cantilever loading from the transmission as it may already support the mass of the GTE. Therefore, by taking away the reciprocating pump lube power requirements from the total KW load, there may or may not be use of a smaller generator capable of driving small motors coupled to fans that could range from 1 to 5 HP, as well as low pressure low flow fuel pumps and transmission lube pumps.

As in other implementations, the SCS may be powered from a separate battery bank but may still allow for generated power to replenish the battery charge when operational. The remaining auxiliary equipment to be powered from the smaller generator coupled to the transmission may follow the same assembly methodology as stated above with respect to an earlier example implementation.

According to these more recently-described example implementations, a method of operation may be as follows. The SCS may be online and command the GTE's primary auxiliary equipment to come online, which may result in fuel pumps and lube pumps to start. The GTE starter motor may then be functioned, allowing the GTE to reach an idle speed, after which the electric motor coupled to the starter gear may be disengaged and its power may be isolated. Once the power output shaft is functioned, and the GTE torque and power are transferred to the transmission, the clutches may be operated allowing the multistage pump and electric generator to be engaged and start rotating. The power from the electric generator may be then converted to DC through an AFE rectifier as described above, and distributed over a common DC bus. The power may be then distributed over the hydraulic fracturing unit and sent to drives that are controlling the speed of electric motors.

As previously described, a hydraulic fracturing unit (such as the hydraulic fracturing units 102, 220 previously described) may include a gas turbine engine. The performance of a gas turbine engine is dependent on the conditions under which the gas turbine engine operates. For example, ambient air pressure and temperature are large factors in the output of the gas turbine engine, with low ambient air pressure and high ambient temperature reducing the maximum output of the gas turbine engine. Low ambient pressure and/or high ambient temperature reduce the density of air, which reduces the mass flow of the air supplied to the intake of the gas turbine engine for combustion, which results in a lower power output. Some environments in which hydraulic fracturing operations occur are prone to low ambient pressure, for example, at higher elevations, and/or higher temperatures, for example, in hot climates. In addition, gas turbine engines are subject to damage by particulates in air supplied to the intake. Thus, in dusty environments, such as at many well sites, the air must be filtered before entering the intake of the gas turbine engine. However, filtration may reduce the pressure of air supplied to the intake, particularly as the filter medium of the filter becomes obstructed by filtered particulates with use. Reduced power output of the gas turbine engines reduces the pressure and/or flow rate provided by the corresponding hydraulic fracturing pumps of the hydraulic fracturing units. Thus, the effectiveness of a hydraulic fracturing operation may be compromised by reduced power output of the gas turbine engines of the hydraulic fracturing operation.

To generate additional power from an existing gas turbine, an inlet air conditioning system may be used. The air conditioning system may increase the airstream density by lowering the temperature of the airstream. This increases the mass flowrate of air entering the compressor, resulting in increased efficiency and power output of the gas turbine. An air conditioning system may include, for example, but not limited to, a chiller, an evaporative cooler, a spray cooler, or combinations thereof, located downstream of an inlet filter house within an inlet assembly of the gas turbine. Some air conditioning systems, however, add resistance to the airstream entering the compressor. This resistance may cause a pressure drop in the inlet assembly. Reduced gas turbine efficiency and power output may result from inlet assembly pressure drop.

The higher the inlet assembly pressure drop, the lower the efficiency and power output of the gas turbine. Typical pressure drop values across the gas turbine inlet assembly for power generation varies from about two (2) to about five (5) inches of water column (about five to about 12.7 centimeters of water). This includes the pressure drop across the air conditioning system, which varies from about 0.5 inches to about 1.5 inches of water column (about 1.27 to about 3.8 centimeters of water). Depending on the size of the gas turbine frame, the value of this pressure drop adversely affects the gas turbine output. For example, a gas turbine could lose up to 5% of rated output power from the pressure drop alone if the altitude and temperature remained at ISO conditions. Any change in temperature and/or pressure from ISO rated conditions could increase the rated output power loss. Every point of efficiency and power, however, is essential in the competitive business of power generation or the variety of other uses for mechanical drive gas turbines.

Accordingly, some embodiments of the present disclosure are generally directed to systems and methods for increasing the efficiency of operation of a gas turbine, for example, during operation in a wide variety of ambient conditions and/or under fluctuating loads. In some embodiments, a system for increasing the efficiency of a conventional gas turbine having an inlet assembly and a compressor, the inlet assembly being located upstream of the compressor, may include a housing, an air treatment module, and at least one air conditioning module. As contemplated and discussed above, performance losses may be expected at increased temperatures, increased altitude, and/or increased humidity when using a dual fuel turbine system in a mobile application that is configured to drive a reciprocating hydraulic fracturing pump or drive a generator as part of a gen-set. These environmental conditions may lead to the air being less dense, which may adversely affect turbine system performance as the turbine mass air flow through the air intake axial compression stages are directly proportional to the turbines performance output. The air treatment module may include one or more air conditioning modules that may condition input air to effect a desired increase in the mass flow of air through the air intake axial compression stages of the turbine.

According to some embodiments, the housing may be configured to channel an airstream towards the inlet assembly, the housing being positioned upstream of the inlet assembly, which channels the airstream to the compressor. The air treatment module may be positioned at a proximal end of the housing and may include a plurality of inlet air filters and at least one blower in fluid communication with an interior of the housing and configured to pressurize air entering the air treatment module. The at least one conditioning module may be mounted downstream of the air treatment module and may be configured to adjust the temperature of the airstream entering the compressor, such that the airstream enters the air conditioning module at a first temperature and exits the air conditioning module at a second temperature.

Figure 22:
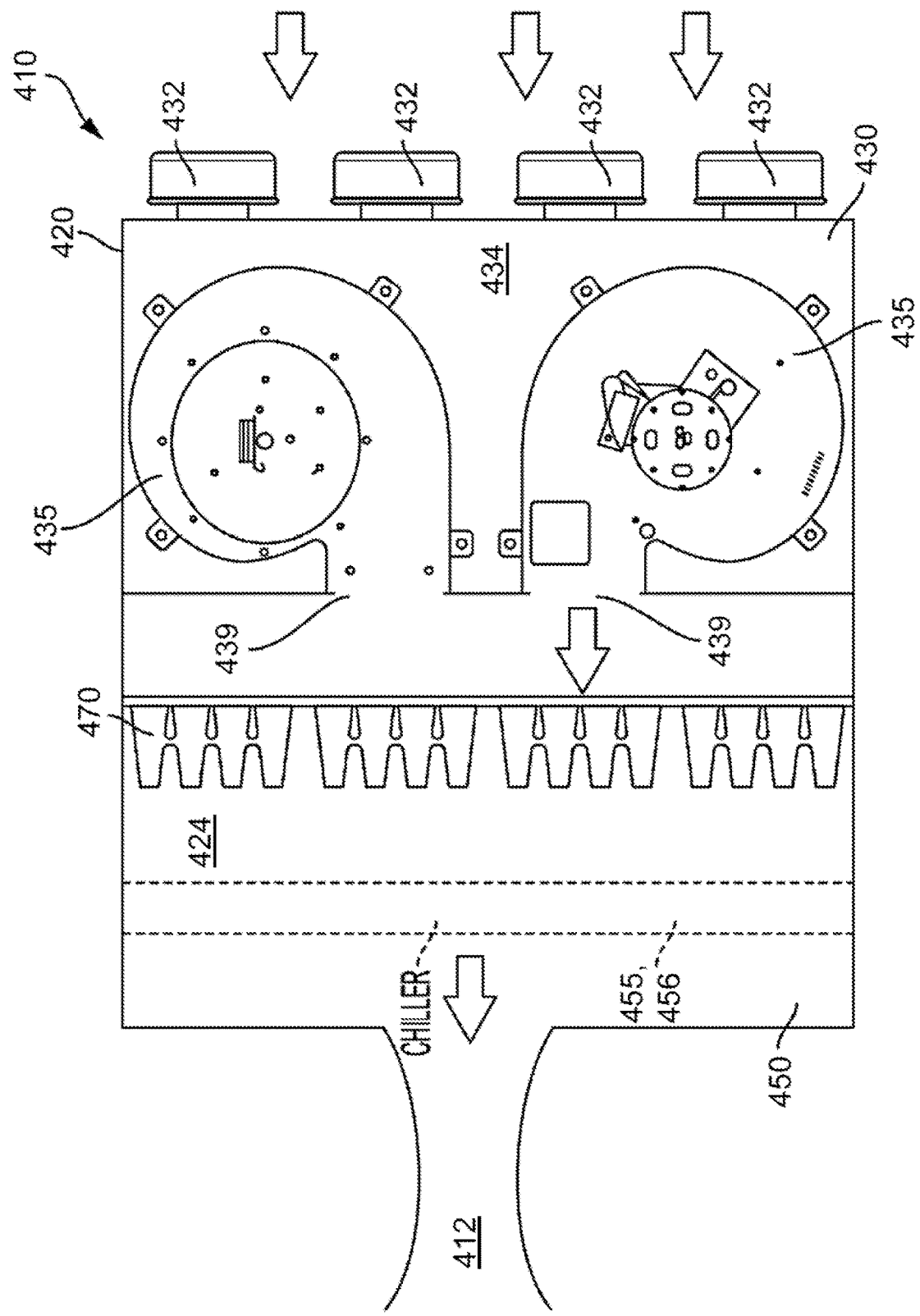
FIG. 22 is a schematic diagram of an embodiment of an air treatment system for increasing the efficiency of a gas turbine according to some embodiments of this disclosure.
Figure 23:
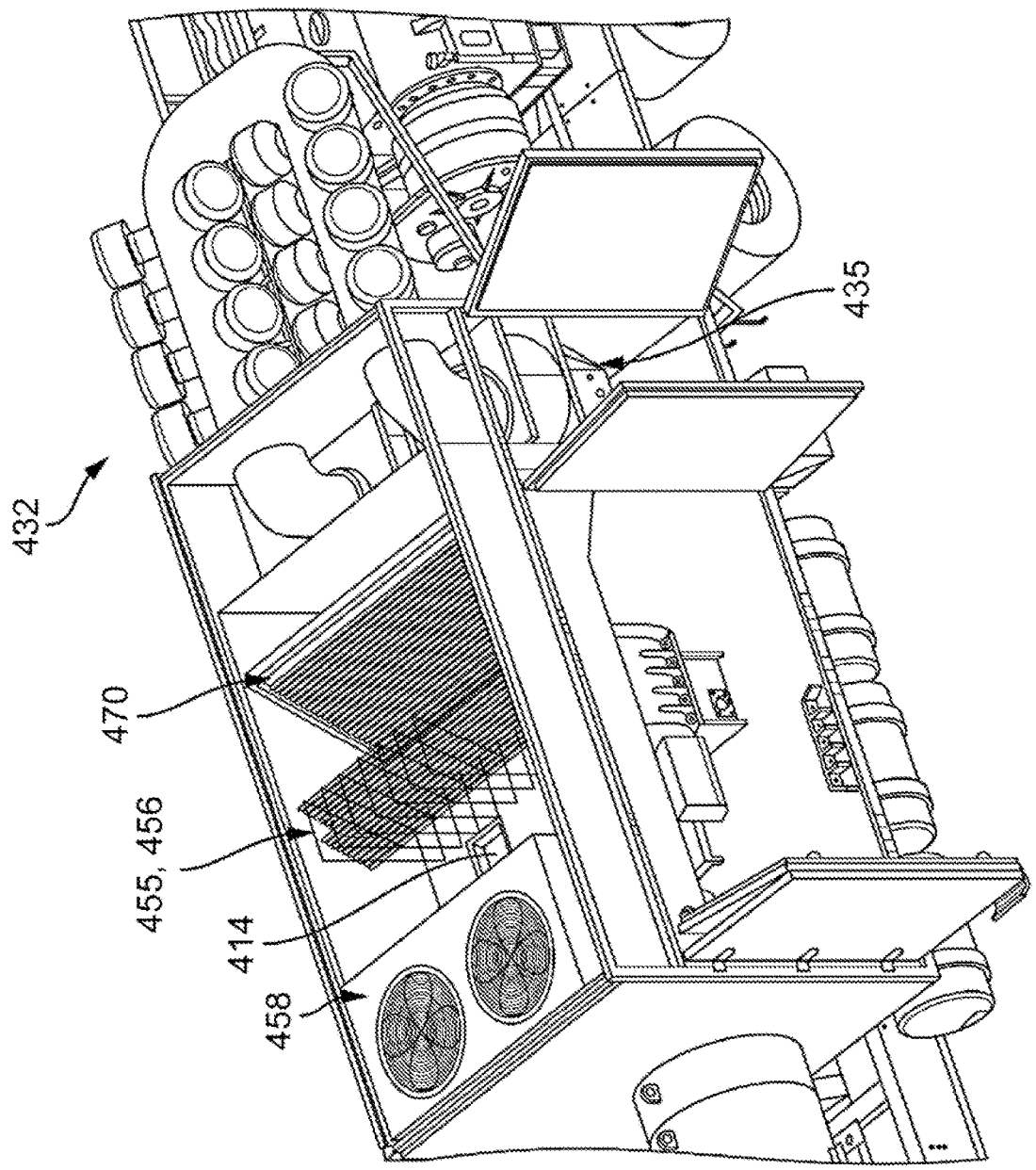
FIG. 23 shows an exemplary system setup of the air conditioning system according to some embodiments of this disclosure.

Referring to FIGS. 22 and 23, an example air treatment system 410 is described for operation with a gas turbine 412. Such a gas turbine 412 may generally include, in serial flow arrangement, an inlet assembly including an inlet 414 for receiving and channeling an ambient airstream, a compressor which receives and compresses that airstream, a combusting system that mixes a fuel and the compressed airstream, ignites the mixture, and allows for the gaseous by-product to flow to a turbine section, which transfers energy from the gaseous by-product to an output power. Other components of the gas turbine may be used therein as will be understood by those skilled in the art.

In some embodiments, the air treatment system 410 may be incorporated into a hydraulic fracturing unit (such as hydraulic fracturing units 102, 220, previously described). For example, a hydraulic fracturing unit may include a trailer and a hydraulic fracturing pump to pump fracturing fluid into a wellhead, with the hydraulic fracturing pump connected to the trailer. The hydraulic fracturing unit also may include a gas turbine to drive the hydraulic fracturing pump, for example, via a gearbox, and the air treatment system 410, in some embodiments, may be used to increase the efficiency of the gas turbine 412. Hydraulic fracturing may be performed generally at any geographic location and during any season of the year, often in harsh environmental conditions. As a result, hydraulic fracturing may occur under a wide variety of ambient temperatures and pressures, depending on the location and time of year. In addition, the load on the hydraulic fracturing pumps and thus the gas turbine engines may change or fluctuate greatly, for example, depending on the build-up and release of pressure in the formation being fractured. In some embodiments, the air treatment system 410 may be configured to increase the efficiency of operation of a gas turbine, for example, during operation in a wide variety of ambient conditions and/or under fluctuating loads. As referenced above, performance losses may be expected at increased temperatures, increased altitude, and/or increased humidity when using a dual fuel turbine system for a mobile hydraulic fracturing unit configured to drive a reciprocating hydraulic fracturing pump via a gearbox or drive a generator as part of a gen-set. These environmental conditions may lead to the air being less dense, which may adversely affect turbine system performance as the turbine mass air flow through the air intake axial compression stages are directly proportional to the turbines performance output. In some embodiments, the air treatment system 410 may include one or more air conditioning modules that may condition input air to effect a desired increase in the mass flow of air through the air intake axial compression stages of the gas turbine, thereby at least partially mitigating or overcoming any performance losses of the gas turbine of a hydraulic fracturing unit due to increased temperatures, increased altitude, and/or increased humidity, while being able to respond to fluctuating loads In some embodiments, the air treatment system 410 may include a housing 420, an air treatment module 430, and/or at least one air conditioning module 450. Optionally, the air treatment system 410 may further include a filter module 470 positioned intermediate the at least one conditioning module 450 and the input side of the gas turbine. As contemplated and discussed above, performance losses may be expected at increased temperatures, increased altitude, and/or increased humidity, for example, when using a dual fuel turbine system in a mobile application that is configured to drive a reciprocating hydraulic fracturing pump or drive a generator as part of a gen-set. These environmental conditions may lead to the air being less dense. One skilled in the art will appreciate that the relative density of air may be an important factor for a turbine as turbine mass air flow through the air intake axial compression stages may be directly proportional to the turbine's performance output. The air treatment system 410 described herein may allow for the selective conditioning of air, which may affect a desired increase in air density of air entering the intake of the turbine. As described in more detail below, the air treatment module 430 and/or the at least one air conditioning module 470 of the air treatment system may filter air entering the air treatment system, may boost the pressure of air entering the air treatment system, and may lower the temperature of the air entering the air treatment system air to increase the operating efficiency of the turbine.

As illustrated, the example housing 420 may be configured to channel an airstream towards the inlet assembly of the turbine and may be positioned upstream of the input side of the turbine, which channels the airstream to the compressor. The housing 420 may have a shape that is configured for allowing for structural integration with the inlet assembly of the turbine. The integration of the inlet assembly of the turbine and the housing may allow for more controlled flow of the airstream flowing through the air treatment module 430 and the air conditioning module 450 and then flowing to the inlet assembly of the turbine. The housing 420 may be joined to the inlet assembly of the turbine via a plurality of connection means, such as, but are not limited to, welding, bolting, other fastening methods, or combinations thereof. The housing 420 may be formed of or include any material(s) capable of supporting the air treatment module and/or the air conditioning module. Such material(s) may include, for example, but are not limited to, a metal, an alloy, and/or other structural materials as will be understood by those skilled in the art.

The air treatment module 430 may include a plurality of inlet air filters or pre-cleaners 432 and at least one blower fan 435 configured to pressurize air. In some embodiments, the air treatment module 430 may be positioned at a proximal end 422 of the housing 20. The plurality of inlet air filters 432 may be in fluid communication with a first internal chamber 434 of the air treatment module, and the at least one blower fan 435 may be mounted in the first internal chamber 434 to pressurize air entering the first internal chamber 434 via the plurality of inlet air filters. In some embodiments, it is contemplated that plurality of inlet air filters may knock down debris, including mud, snow, rain, leaves, sawdust, chaff, sand, dust, and the like. As shown, the inlet air filters 432 may be configured to continuously or intermittently eject debris before reaching an optional filter module 470 that may be mounted internally within the housing, for example, without the need for further cleaning or shutting-down the unit to replace one or more of the plurality of inlet air filters.

As one skilled in the art will appreciate, to compensate for the pressure drop through the plurality of inlet air filters and to boost the pressure and flow of the air to the turbine, the at least one blower fan 435, which may be operated by an electrical or hydraulic motor, may be installed to bring the overall airflow up to a desired air feed rate, such as, for example and without limitation, about 28,000 CFM, to increase the inlet pressure at the inlet of the turbine with a resultant increase in efficiency of the turbine. Without limitation, in the schematic example shown in FIG. 22, at least one blower fan 435 with a coupled electrical motor may be positioned in the first internal chamber 434 of the air treatment module to boost the pressure of intake air to a desired level after the pressure drop through the plurality of inlet air filters and into the downstream filter module 470. For example, the at least one blower fan 435 may be a squirrel cage blower fan. However, and without limitation, other conventional electrically or hydraulically powered blower fans, such as vane axial fans, and the like, are contemplated. Optionally, the air treatment system 410 may be integrated with a bypass. The bypass may reduce the pressure drop derived from a non-operating air conditioning system.

It is contemplated that the at least one blower fan 435 may pressurize the air exiting the air treatment module to a degree sufficient to at least partially overcome the pressure losses associated with passing through the upstream plurality of air filters 432 and through the downstream air conditioning module 450 and, if used, a downstream filter module 470 positioned upstream of the at least one conditioning module, and any other losses the system may encounter, such as rarefication of the inlet air to the blower. In such embodiments, the downstream filter module 470 may be a conventional high-efficiency filter, such as, and without limitation, a conventional vane inlet with a low cartridge- or bag-type pre-filter that would be suitable for periodic cleaning and changing.

It is contemplated that the at least one blower fan 435 may be oversized to allow for further pressurization of the air at the downstream inlet of the turbine or engine. Oversizing may allow for suitable compensation for the loss of atmospheric pressure and air density, for example, with increased elevation. The change in pressure due to a change in elevation may be calculated via the following equation:

$$P = P_b \left[ \frac{T_b}{T_b + L_b(H - H_b)} \right]^{\frac{g_0 M}{R * L_b}}$$

where:
P=local atmospheric pressure;
$P_b$=static pressure at sea level;
$T_b$=temperature at sea level;

$L_b$=temperature lapse rate;
$H_b$=elevation at sea level;
H=local elevation;
R*=universal gas constant;
$g_0$=gravity; and
M=molar mass of air.

Figure 24:
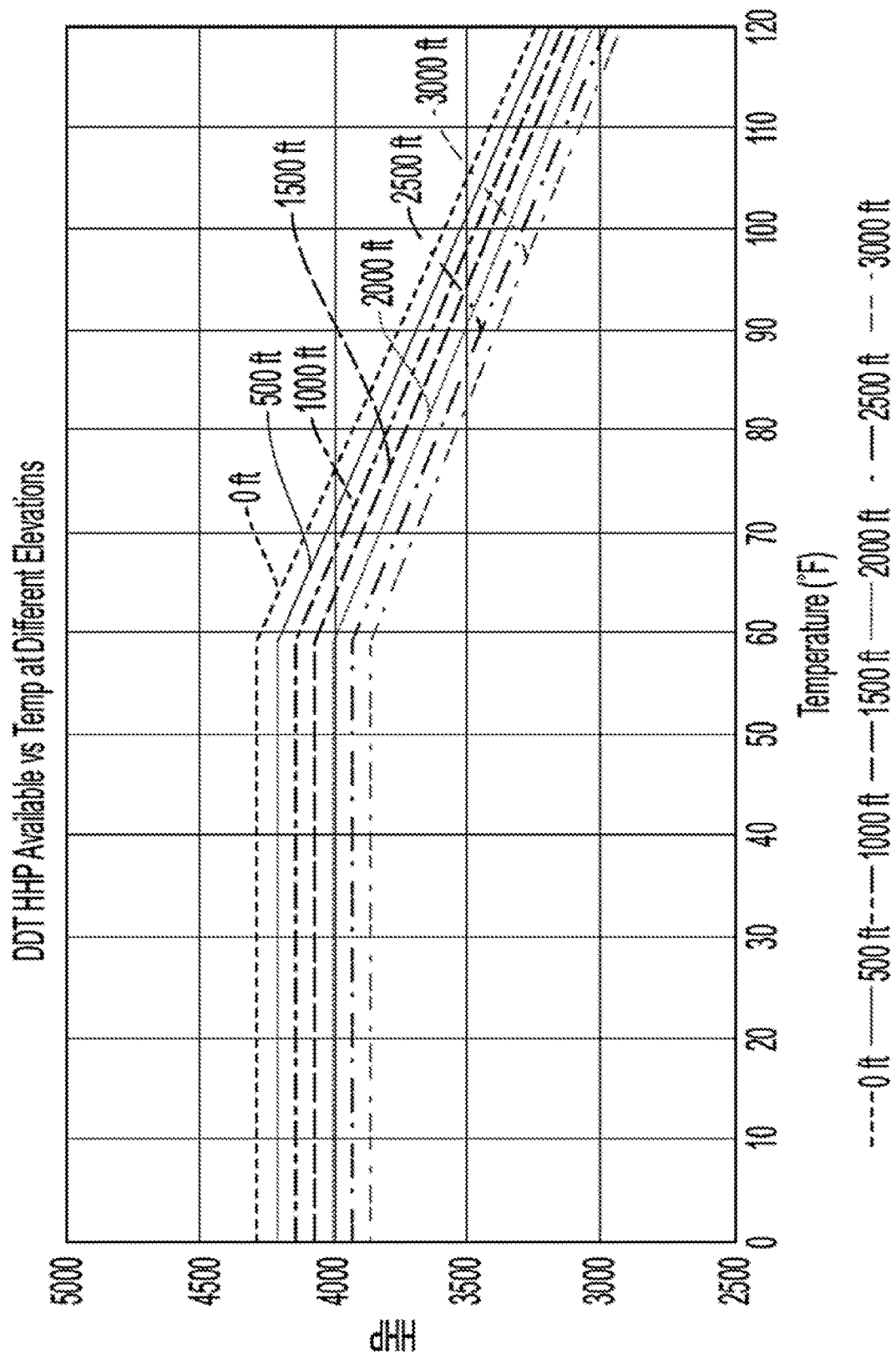
FIG. 24 illustrates example performance loss of the gas turbine with increased temperature according to some embodiments of this disclosure.

From the calculated pressure, the ideal gas law may be used to calculate a new density of the air at the constant atmospheric pressure. FIG. 24 shows the change in pressure as a function of increased elevation. It also shows the calculated density in reference to temperature change and elevation change.

$$\rho = \frac{p}{R_{sp}T}$$

where:
P=absolute pressure;
ρ=density;
T=absolute temperature; and
$R_{SP}$=specific gas constant.

Referring now to FIG. 25, the conventional factor for performance loss of the turbine with increased temperature is a 0.4% to about 0.5% reduction in performance for every one degree Fahrenheit increase over 59 degrees F. For example, it may be seen that at 500 ft, dropping the temperature from 100 degrees F. to 90 degrees F., the HHP output will increase by 140 horsepower, or about 4%.

The increase in power results from the temperature decreasing and holding the air pressure constant. The ideal gas law equation may be used to calculate the density of the air as a function of the change in temperature. As may be seen from the table illustrated in FIG. 25, a decrease to 90 degrees F. from 100 degrees F. will result in a density increase of 0.0013 lbm/ft3 or a 1.8% increase. The described relationship is that for every percentage of air density increase the output efficiency increases by approximately 2.2%.

Referring to FIGS. 22 and 23, the first internal chamber 434 of the air treatment module 430 is in fluid communication with an interior chamber 424 of the housing via at least one outlet 439 of the air treatment module. Optionally, the air treatment module 430 may further include a plurality of drift eliminator and/or coalescer pads suitable for reducing the content of liquids within the airstream flowing through the air treatment module.

The at least one air conditioning module 450 for adjusting the temperature of the airstream passing thorough the housing and toward the input side of the gas turbine may be mounted downstream of the air treatment module 430. The airstream enters the at least one air conditioning module 450 at a first temperature and exits the air conditioning module at a second temperature. The at least one air conditioning module 450 may have a conventional form such as a chiller. One skilled in the art will appreciate that other forms of conventional air conditioning modules are contemplated. The specific form of the at least one air conditioning module may be determined in part from the configuration of the gas turbine.

In some embodiments, the at least one conditioning module 450 may include at least one chiller module 455. The chiller module 455 may include a conventional arrangement of a plurality of condenser coils 456 disposed in the housing and that are configured to span the substantial width of the housing, such that the airstream passes through and/or around the plurality of condenser coils 456 to effect a desired lowering of the temperature of the airstream that is directed downstream toward the input side of the gas turbine. The plurality of condenser coils 456 may be in communication with a source of pressurized chilled refrigerant. The refrigerant may be any conventional refrigerant, such as, without limitation, R22, R410a, and the like as will be understood by those skilled in the art. In one example, the refrigerant fluid may be cooled to about 45 degrees F., but it is contemplated that the desired coolant temperature may be changed to suit varying operating conditions as desired.

It is contemplated that the at least one air conditioning module 450 may decrease the temperature of the airstream entering the inlet assembly of the gas turbine to increase the efficiency and power output. In one exemplary aspect, the at least one conditioning module 450 may preferably decrease a temperature of the airstream by between about 2 and 20 degrees F. and optionally between about 5 and 10 degrees F. In some applications, increasing the efficiency and/or the power output of the gas turbine may lead to more efficient operations. For example, in a hydraulic fracturing operation including a plurality of hydraulic fracturing units, each operating a gas turbine to supply power to drive fracturing pumps, such increases in efficiency and/or power output may facilitate reducing the number the gas turbines operating, while still providing sufficient power to meet fracturing fluid pressure and/or flow rate needs to complete the fracturing operation.

In various exemplary aspects, it is contemplated that, in elevational cross-sectional view, the plurality of condenser coils 456 of the chiller module 455 may have a planar shape, a W shape, a V shape, or other geometric shape. The chiller module 455 may further comprise a means for chilling the source of pressurized chilled refrigerant. The means for chilling the source of pressurized chilled refrigerant may be a conventional refrigeration cycle using a compressor 458 that is configured to supply pressurized chilled refrigerant to the plurality of coils. The compressor may include a plurality of compressors, which may include one or more of the following types of compressors: a reciprocating compressor, a scroll compressor, a screw compressor, a rotary compressor, a centrifugal compressor, and the like.

Optionally, the means for chilling the source of pressurized chilled supply may include at least one chill line carrying pressurized refrigerant that may be routed through and/or around a cold source. It is contemplated that the cold source may include at least one gas source in liquid form.

Optionally, the plurality of condenser coils 456 may be placed in an existing radiator package where the lube coolers and engine coolers for the gas turbine are housed. It is also optionally contemplated that the plurality of condenser coils 456 may be packaged along with the compressor and an expansion valve of a conventional refrigeration cycle system. It is contemplated that the heat rejection requirement of the plurality of condenser coils 456 may be higher than the heat rejection of the evaporator because the plurality of condenser coils 456 must also reject the heat load from the coupled compressors.

Figure 26:
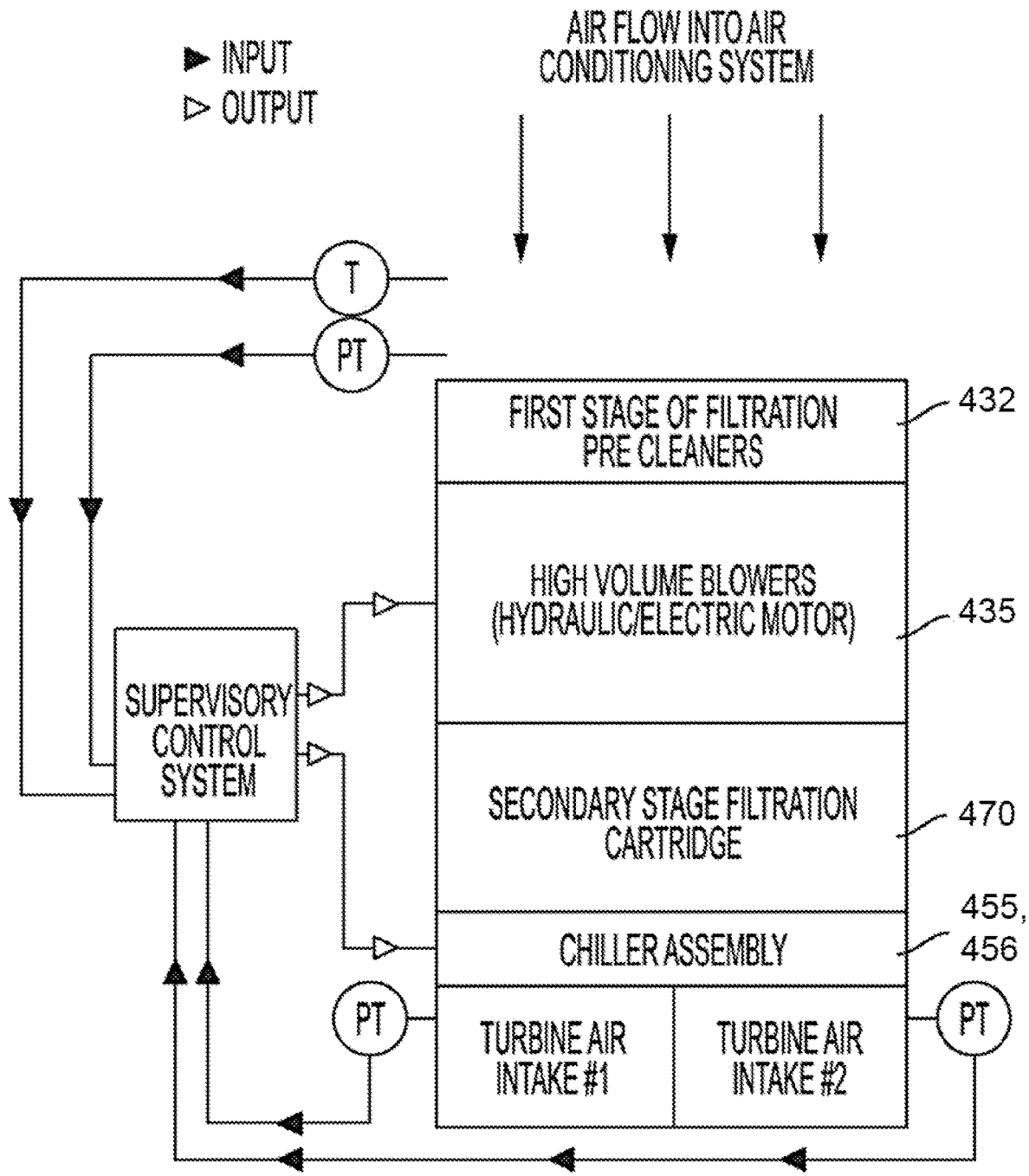
FIG. 26 is a schematic diagram of an example of an electrical system for operating the air treatment system according to some embodiments of this disclosure.
Figure 27:
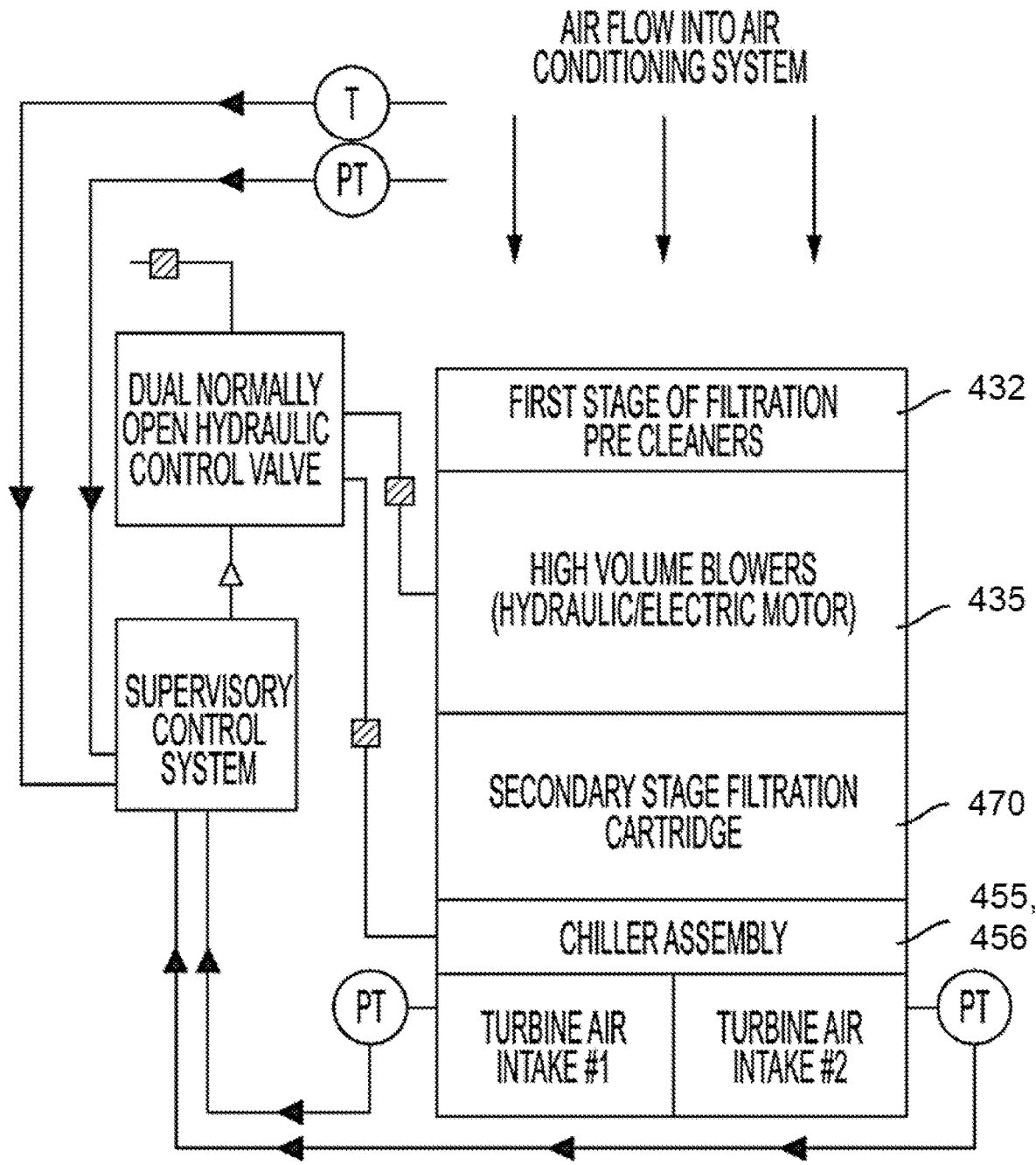
FIG. 27 is a schematic diagram of an example of a hydraulic system for operating the air treatment system according to some embodiments of this disclosure.

Referring now to FIGS. 26 and 27, schematic diagrams of an electrical system and a hydraulic system for operating the air treatment system are presented. It is contemplated that the air conditioning system 410 will not actuate the air treatment module 430 and at least one air conditioning module 450 at a constant speed or power output. For example, during a cold day with low humidity and at low elevation, the air conditioning system may only utilize the plurality of inlet air filters or pre-cleaners 432 and the optional filter module 470. In some embodiments consistent with this example, the at least one blower fan 435 may be selectively engaged to ensure the pressure drop across the inlet air filters or pre-cleaners 432 are within the turbine manufacturer's guidelines, but the at least one blower fan 435 will not be run at the respective blower fan's cubic feet per minute (cfm) rating, nor will the at least one air conditioning module 450 be attempting to reduce the temperature of the air to an unnecessary temperature. As illustrated, the example air treatment module 430 and at least one air conditioning module 450 may be selectively controlled via proportional motor control that may be operatively configured to function through a combination of the use of programmable VFDs, a PLC control system, an instrumentation and hydraulic control system, and the like.

In some embodiments, ISO conditions of 59 degrees F., 14.696 pounds per square inch atmospheric pressure, at sea level, and 60% relative humidity may be the baseline operating levels for control of the air conditioning system 410, as these are the conditions that are used to rate a turbine engine for service. As shown in FIG. 26, the assembly and implementation of instruments such as atmospheric pressure sensors and/or temperature sensors allow the air conditioning system 410 to monitor air density through the data inputs and to calculate, at a desired sample rate, the density in reference to temperature change and elevation change. Further, it is contemplated that the pressure drop through the plurality of inlet air filters or pre-cleaners 432 may be monitored via a pair of pressure sensors, which may be positioned at the air intake of the plurality of inlet air filters or pre-cleaners 432 and at the air intake of the turbine also. This noted pressure differential between the pair of pressure sensors may allow the air conditioning system 410 to command the operation of the plurality of blower fans 435 to operate at a desired speed to mitigate or overcome the sensed pressure drop.

It is contemplated that in the event there is a loss of one or more control signals from the supervisory control system of the air conditioning system 410, the chillers and blowers may be configured to automatically revert to operation at maximum output as a failsafe and/or to ensure that operation of the coupled turbine is not ceased. During operation, the pressure transducers and temperature transducers may be configured to provide continuous or intermittent feedback to the supervisory control system. As described, during normal operation according to some embodiments, the supervisory control system may operate to detect the deficiency of the inlet airstream, such as a temperature and/or pressure drop, and may be configured to send control outputs to the blower fan motors and/or the at least one air conditioning module 450, for example, to condition the airstream to mitigate or overcome the environmental losses. For example, and without limitation, the supervisory control system may include, but is not limited to, PLC, micro-controllers, computer-based controllers, and the like as will be understood by those skilled in the art.

Similarly, FIG. 27 illustrates an example use of hydraulic power to turn hydraulic motors on the blower fans 435 (if hydraulically-powered blower fans 435 are used) and the hydraulically-powered fans on the at least one air conditioning module 450 (if used). In such embodiments, proportional hydraulic control valves may be positioned and may be configured to receive operational input from the supervisory control system for the selective operation of a spool to ensure that the correct amount of hydraulic fluid is delivered into the air conditioning system.

A hydraulic fracturing operation site often encompasses a large footprint with the number of wells or wellheads and supporting components. The supporting components take time to be transported and to be setup for utilization at the fracturing operation sites. Due to the large nature of many fracturing operations, there exists a continued challenge to reduce the environmental impact resulting from fracturing operations. Accordingly, some embodiments disclosed herein are configured to reduce the environmental impact of noise pollution produced by the fracturing operations.

Specifically, some embodiments of the present disclosure are generally directed to systems and methods for dampening and directional control of exhaust air flow from a gas turbine of, for example, a direct drive turbine fracturing system. According to some embodiments, a mobile fracking system may include a trailer including a rear end, a front end, a bottom end, and a top end defining therebetween an interior space, a gas turbine housed inside the trailer in the interior space, and an exhaust attenuation system configured to receive exhaust gas from the gas turbine via an exhaust duct. The exhaust attenuation system may be attached to a portion of the trailer and may include a lower elongated plenum having an inlet adjacent the proximal end configured to receive exhaust gas from the gas turbine exhaust duct of the gas turbine and an upper noise attenuation system that is movably connected relative to the distal end of the lower elongated plenum. The upper noise attenuation system may be selectively movable between a stowed position, in which an outlet end portion of the upper noise attenuation system is positioned proximate to the distal end of the lower elongated plenum, and an operative position, in which the upper noise attenuation system defines an upper elongated plenum in fluid communication with the distal end of the lower elongated plenum and in which an outlet of the upper noise elongated plenum is spaced away from the distal end of the lower elongated plenum at a second distance that is greater than the first distance.

Figure 28:
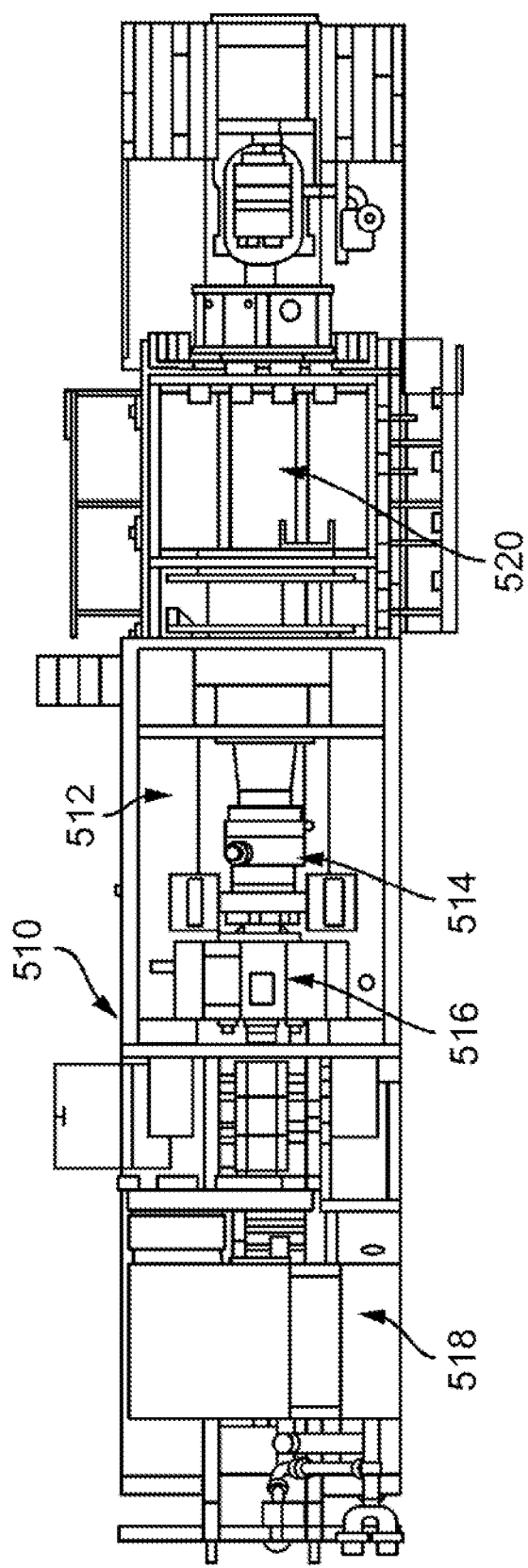
FIG. 28 is a schematic top view of an example of a mobile fracking system according to some embodiments of this disclosure.
Figure 29:
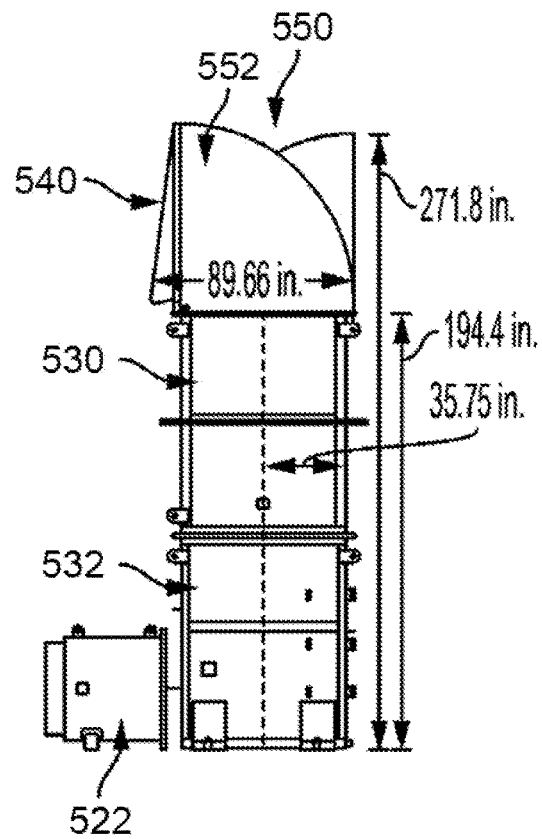
FIG. 29 illustrates an example exhaust attenuation system configured to receive exhaust gas from a gas turbine according to some embodiments of this disclosure.
Figure 30:
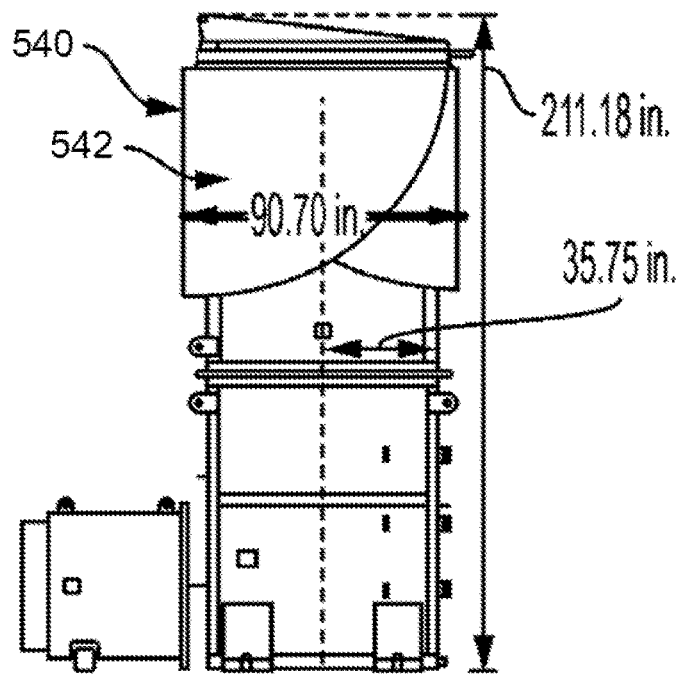
FIG. 30 illustrates an example exhaust attenuation system configured to receive exhaust gas from a gas turbine according to some embodiments of this disclosure.
Figure 31:
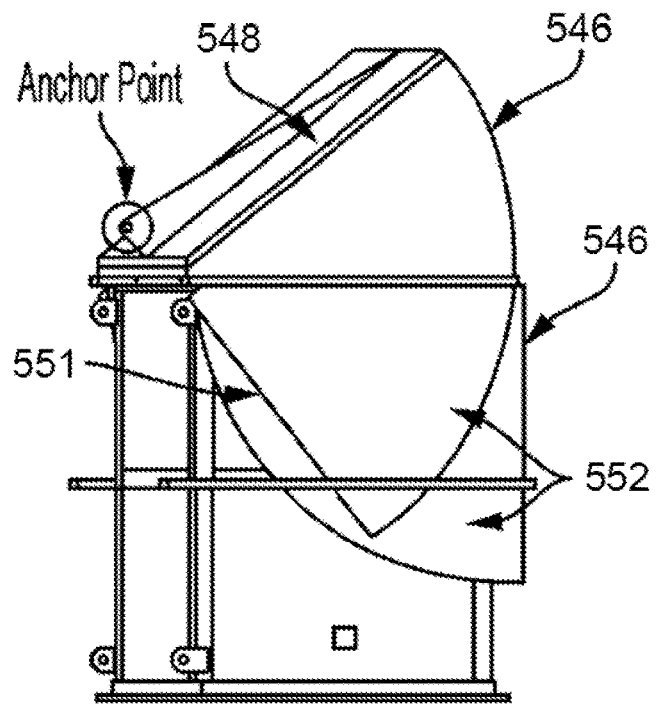
FIG. 31 shows an example exhaust attenuation system illustrating an upper noise attenuation system having a pair of opposed silencer hoods according to some embodiments of this disclosure.
Figure 32:
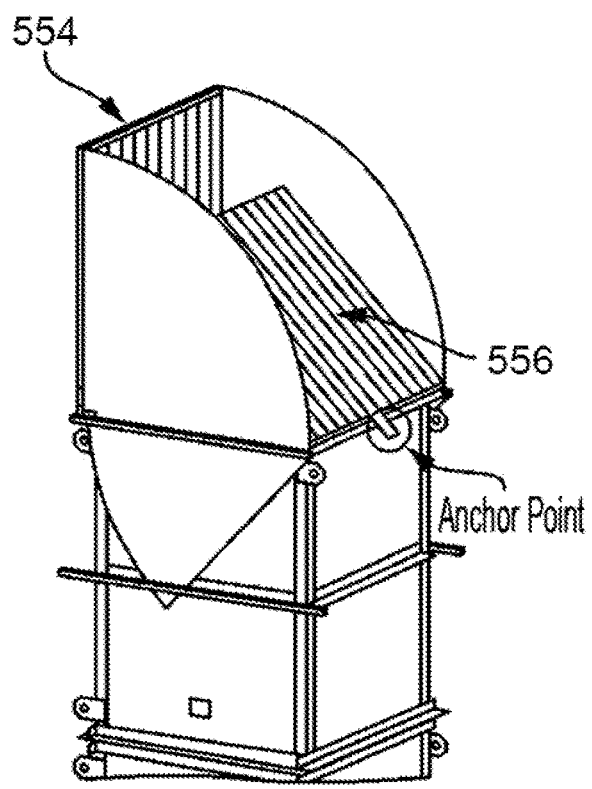
FIG. 32 shows an example lower silencer hood being moved to an operative position and shows an example upper silencer hood positioned in an operative position according to some embodiments of this disclosure.
Figures 33A, 33B:
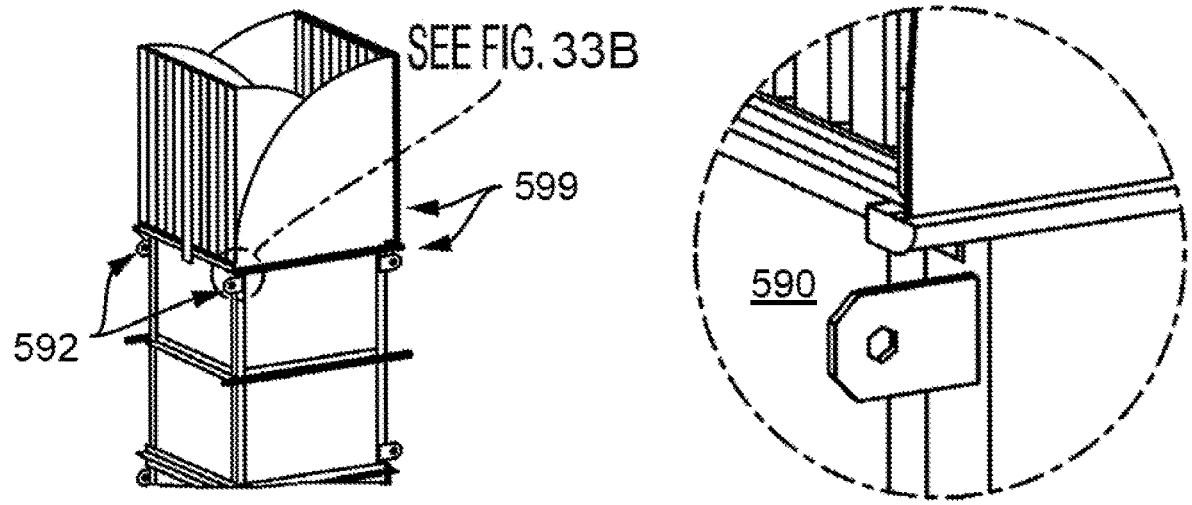
FIGS. 33A and 33B respectively show a perspective view and an enlarged perspective view of an example retention brace system having a first pair of opposing retention braces according to some embodiments of this disclosure.
Figure 34:
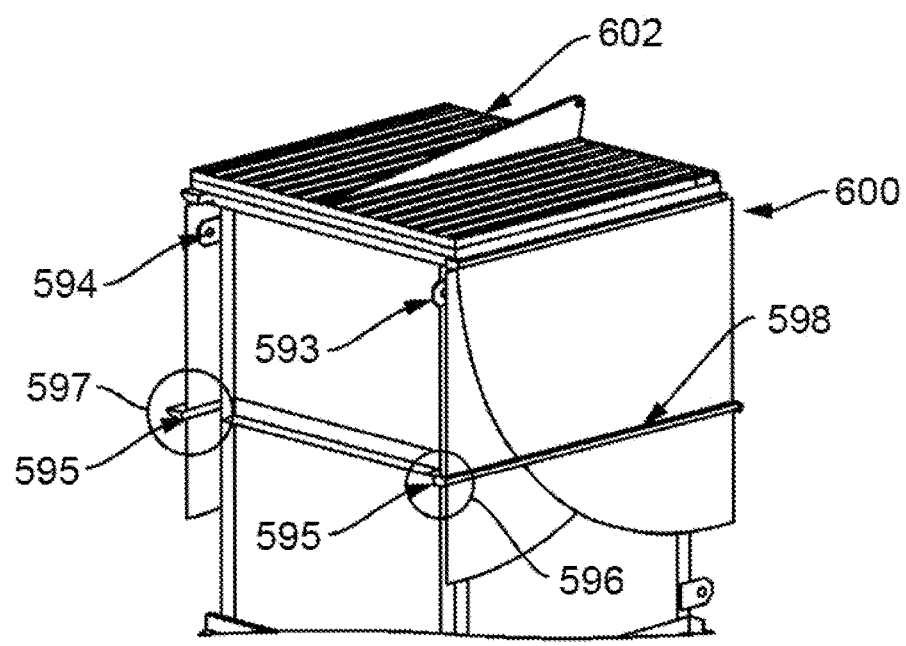
FIG. 34 shows an example retention brace system according to some embodiments of this disclosure.
Figure 35:
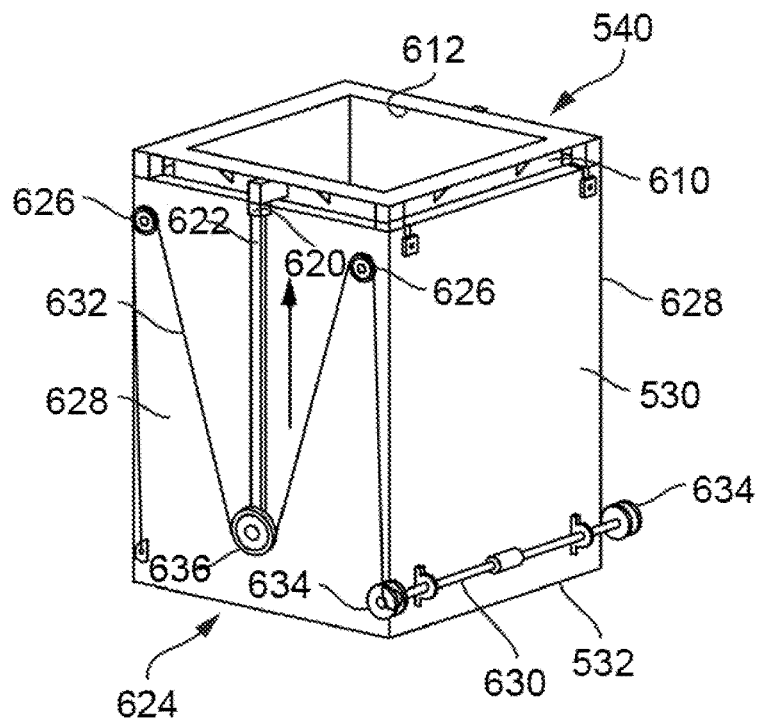
FIG. 35 shows an example upper noise attenuation system according to some embodiments of this disclosure.
Figure 36:
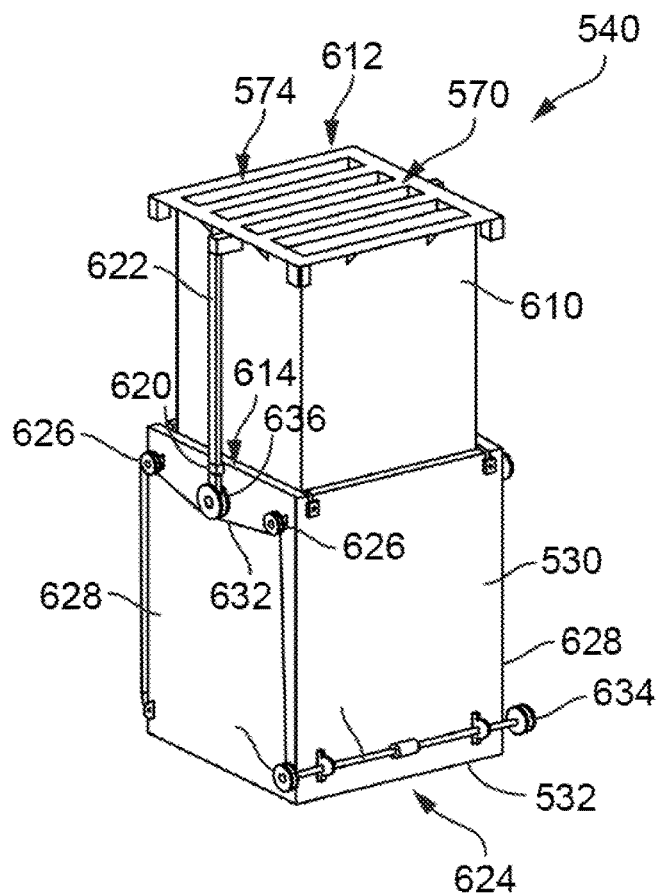
FIG. 36 shows an example upper noise attenuation system according to some embodiments of this disclosure.
Figure 37:
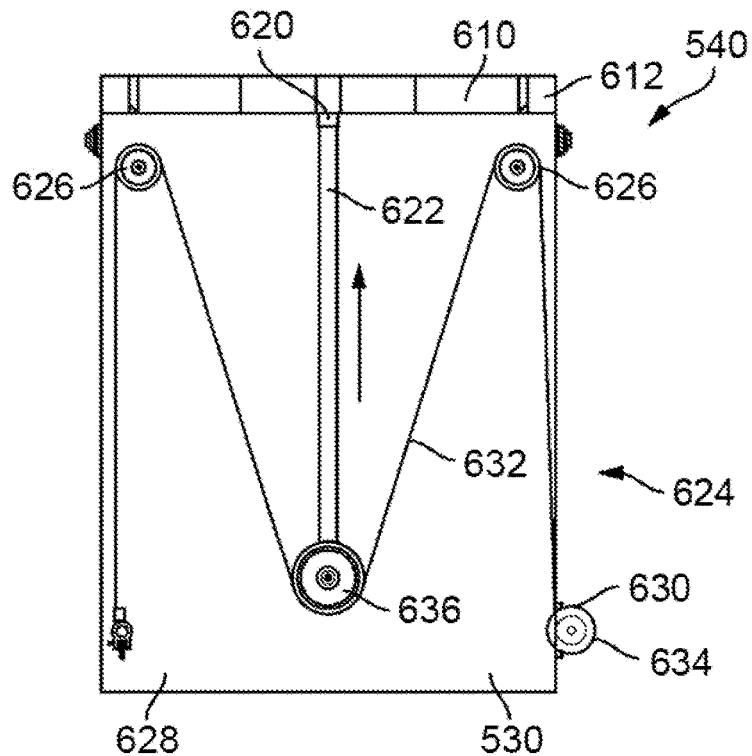
FIG. 37 shows an example guide mounted to an exterior surface of the lower elongated plenum according to some embodiments of this disclosure.

In some embodiments, a hydraulic fracturing unit (such as the hydraulic fracturing units 102, 220, previously described) 510 may include a trailer 512, a gas turbine 514, and an exhaust attenuation system 520 configured to receive exhaust gas from the gas turbine 514. The hydraulic fracturing unit 510 may be referred to herein as a "mobile fracking system." FIG. 28 is a schematic diagram of an embodiment of a mobile fracking system 510 showing the trailer 512 having a rear end, a front end, a bottom end, and a top end that defines an interior space. As shown, the gas turbine 514 is housed inside the trailer in the interior space. To improve mobility over a variety of roadways, the trailer may have a maximum height, a maximum width, and a maximum length that would be suitable for passage on conventional roads and expressways. Further, the trailer may comprise at least three axles used to support and distribute the weight on trailer. Other embodiments of the trailer may exceed three axles depending on the total transport weight and it is contemplated that the dimensions and the number of axles may be adjusted to allow for the transport over roadways that typically mandate certain height, length, and weight restrictions.

The trailer 512 may house at least one or more of the following equipment: (1) an inlet plenum; (2) the gas turbine 514; (3) the exhaust attenuation system 520 to remove exhaust gas from gas turbine into the atmosphere, (4) a gearbox and/or transmission 516 connected to a rotary output of the gas turbine, and (5) a fluid pump 518 operatively connected to the output of the gearbox. Other components not shown in FIG. 28, but which may also be located on the trailer 512 include a control system, a turbine lube oil system, and a fire suppression system. The turbine lube oil system may be configured to selectively operate turbine lube oil filtering and cooling systems. In one embodiment, the fire suppression system may also comprise sprinklers, water mist, clean agent, foam sprinkler, carbon dioxide, and/or other equipment used to suppress a fire or provide fire protection for the gas turbine. Mounting of the turbine lube oil systems and the fire suppression system onto the DDT fracturing unit reduces trailer operative footprint by eliminating the need for an auxiliary transport and connections for the turbine and generator lube oil, filtering, cooling systems and the fire suppression system to the gas turbine generator transport.

One skilled in the art will appreciate that the gas turbine 514 may be configured to generate mechanical energy (such as the rotation of a shaft) from a hydrocarbon fuel source, such as natural gas, liquefied natural gas, condensate, and/or other liquid fuels. As schematically illustrated, the gas turbine shaft is connected to the gearbox such that the gearbox converts the supplied mechanical energy from the rotation of the gas turbine shaft to a downstream shaft assembly that is rotated at a desired speed and torque to the downstream mechanically connected fluid pump. The gas turbine may be a gas turbine, such as the GE family of gas turbines, the Pratt and Whitney family of gas turbines, or any other gas turbine, dual shaft gas turbine, and/or dual-fuel turbine that generates sufficient mechanical power for the production of the desired level of brake horsepower to the downstream fluid pump for fracking operations at one or more well sites.

The trailer 512 may also comprise gas turbine inlet filter(s) configured to provide ventilation air and combustion air via one or more inlet plenums (not shown) to the gas turbine. Additionally, enclosure ventilation inlets may be added to increase the amount of ventilation air, which may be used to cool the gas turbine and ventilate the gas turbine enclosure. The combustion air may be the air that is supplied to the gas turbine to aid in the production of mechanical energy. The inlet plenum may be configured to collect the intake air from the gas turbine inlet filter and supply the intake air to the gas turbine.

In one embodiment and referring to FIGS. 29-38, the exhaust attenuation system 520 may be attached to a portion of the trailer and may include a lower elongated plenum 530 and an upper noise attenuation system 540 that is movably connected relative to the distal end of the lower elongated plenum. The lower elongated plenum 530 has a proximal end and a distal end and extends a first distance between the respective proximal and distal ends. The lower elongated plenum 530 defines an inlet 532 adjacent the proximal end of the lower elongated plenum 530 that is configured to receive exhaust gas from the gas turbine. In one aspect, the lower elongated plenum extends longitudinally away from a bottom surface of the trailer about an exhaust axis. The exhaust axis may be positioned at an angle relative to the bottom surface and, in one non-limiting example, may be substantially normal to the bottom surface, substantially vertical, and/or substantially upright.

It is contemplated that the exhaust attenuation system 520 will be constructed of materials that are capable of withstanding extreme temperatures, such as for example and without limitation, to about 1250° F. (676° C.), that are associated with exhaust gases exiting gas turbines.

In embodiments, the upper noise attenuation system 540 may be configured to be selectively movable between a stowed position and an operative, upright, position. In the stowed position, an outlet end portion 542 of the upper noise attenuation system is positioned proximate to the distal end of the lower elongated plenum, and, in the operative position, the upper noise attenuation system defines an upper elongated plenum 550 that is in fluid communication with the distal end of the lower elongated plenum. In this operative position, an outlet 552 of the upper noise elongated plenum is spaced away from the distal end of the lower elongated plenum at a second distance that is greater than the first distance. Further, it is contemplated that the upper noise attenuation system, in the operative position, may extend longitudinally away from the distal end of the lower elongated plenum about the exhaust axis.

The mobile fracking system affects a reduction in sound emission by increasing the effective length of the gas turbine exhaust stack. Attenuation of rectangular duct in the 63 Hz to 250 Hz octave frequency bands may be expressed as:

$$\Delta L_{duct} = 17.0 \left(\frac{P}{S}\right)^{-0.25} f^{-0.85} l$$

$$\Delta L_{duct} = 1.64 \left(\frac{P}{S}\right)^{-0.73} f^{-0.58} l$$

TABLE 1

Exhaust attenuation with unlined rectangular duct

| Exhaust Reference | | Exhaust Duct | | Exhaust Duct with Proposed System | | |
|---|---|---|---|---|---|---|
| PWL dB | f Hz | $\Delta L_{duct,O}$ dB | PWL dB | $\Delta L_{duct,N}$ dB | $\Delta L_{duct,N} - \Delta L_{duct,O}$ dB | PWL dB |
| 120.0 | 63.5 | 2.90 | 116.1 | 4.06 | 1.16 | 114.9 |
| 129.0 | 125 | 1.96 | 127.0 | 2.74 | 0.78 | 126.2 |
| 127.0 | 250 | 1.31 | 125.7 | 1.83 | 0.52 | 125.2 |
| 127.0 | 500 | 0.88 | 126.1 | 1.23 | 0.35 | 125.8 |
| 126.0 | 1000 | 0.59 | 125.4 | 0.82 | 0.23 | 125.2 |
| 130.0 | 2000 | 0.39 | 129.6 | 0.55 | 0.16 | 129.4 |

Table 1—Exhaust Attenuation with Unlined Rectangular Duct

For example, and without limitation, and taken from Table 1 above, proposed exhaust system may affect a 40% increase in sound attenuation and a maximum in 1.2 dB in sound pressure by selective operative increase in the elongate length of the exhaust plenum from 16.1 ft. to 22.6 ft.

In embodiments, the mobile fracking system 510 may include a first plenum 522 configured to receive exhaust gas from the gas turbine. In this aspect, a first end of the first plenum is connected to, and in fluid communication with, an exhaust outlet of the gas turbine and a second end of the first plenum connected to, and in fluid communication with, the inlet of the lower elongated plenum. For example, the gas turbine may be mounted to or otherwise supported thereon the bottom surface of the trailer and the first plenum may extend longitudinally substantially parallel to the bottom surface.

Optionally, the upper noise attenuation system 540 may include at least one array of baffles 570 that are configured to attenuate noise. The array of baffles 570 may include a plurality of baffles 572 that are distributed parallel to a common axis and that define a plurality of slots 574 defined by and between the plurality of baffles. In one exemplary aspect, the at least one array of baffles 570 may be mounted therein a portion of the upper elongated plenum in communication with the exhaust gas passing therethrough the upper elongated plenum to the outlet to supplement the noise dampening capabilities of the noise attenuation system.

In embodiments and referring to FIGS. 29-34, the upper noise attenuation system 540 may include a pair of opposed and cooperating silencer hoods 546. In this aspect, each silencer hood 546 may have a planer surface 548 having opposed side edges 550 and a pair of opposing side surfaces 552 that extend outwardly from portions of the respective side edges of the planer surface. Each silencer hood 546 may be configured to be hingeably mounted to portions of a distal end of the lower elongated plenum such that, in the operative position, the pair of opposed silencer hoods are positioned substantially upright so that the planer surfaces of the respective back edges are in parallel opposition and that the respective side surface are also in parallel opposition to form the elongated upper elongated plenum.

As exemplarily shown in the figures, the pair of opposed silencer hoods 546 may include an upper silencer hood 554 and a lower silencer hood 556 that are configured to cooperatively slideably engage relative to each other when moving therebetween the stowed position and the operative position. In this example, the respective opposed upper and lower silencer hoods may be opened in a sequential manner. First, the upper silencer hood may be raised independently from the lower silencer hood. As shown, an anchor point mounted on a back surface of the planar surface of the upper silencer hood proximate a bottom edge of the back surface may be connected to a wire that is operative connected to a spooling system that is configured for selective movement of the connected silencer hood between the stowed and operative positions. In operation, the spooling system is operated to open or otherwise urge the upper silencer hood to the operative position and may comprise a winch, such as, for example and without limitation, an electric winch, a hydraulic winch, a pneumatic winch, and the like. It is contemplated that, once the upper silencer hood is in the operative position, tension may be maintained on the wire to aid in maintaining the upper silencer hood in the operative position until the upper silencer hood is lowered to the stowed position for transport. Optionally, a mechanical limit switch on the spooling system that may be configured to determine distance the wire is required to move to open and close the respective silencer hoods 546.

Similarly, the lower silencer hood 556 may be raised independently from the upper silencer hood 554. As shown, an anchor point mounted on a back surface of the planar surface of the lower silencer hood proximate a bottom edge of the back surface may be connected to a wire that is operative connected to the spooling system. In operation, after the upper silencer hood is positioned in the operative position, the spooling system of the lower silencer hood may be operated to open or otherwise urge the lower silencer hood to the operative position. It is contemplated that, once the lower silencer hood is in the operative position, tension may be maintained on the wire to aid in maintaining the lower silencer hood in the operative position until the lower silencer hood is lowered to the stowed position for transport. In this example, the lower silencer hood would be lowered first in sequence when the respective opposed upper and lower silencer hoods are closed or otherwise moved to the stowed position.

As noted above, the respective upper and lower silencer hoods 554, 556 may be maneuvered to and about the operative and the stowed positions through the use of one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, the respective upper and lower silencer hoods 554, 556 may be maneuvered to and about the operative and the stowed positions through the use of a spooling system comprising electrical, mechanical, and/or pneumatic winches that contain spooled wire that are connected to the anchor points strategically positioned on the respective upper and lower silencer hoods 554, 556.

Optionally, the exhaust attenuation system shown in FIGS. 29-32, 33A, 33B, and 34 may further include a retention brace system 590. In this aspect, the retention brace system may include a first pair of opposing retention braces 592 and a second pair of opposing retention braces 599. The first pair of opposing retention braces 592 may include a first brace 593 mounted to exterior portions of the distal end of the lower elongated plenum and a second brace 594 mounted to an opposed exterior portions of the distal end of the lower elongated plenum. Each brace of the first pair of opposing retention braces includes a bar 595 that extends between a first end mount 596 and an opposing second end mount 597 such that, when the respective first and second end mounts are positioned therein the lower elongated plenum, the bar is spaced from an exterior surface of the distal end of the lower elongated plenum and defines a slot 598 that is sized and shaped for receipt of portions of respective side surfaces of the pair of silencer hoods.

Similarly, the second pair of opposing retention braces 599 includes a third brace 600 spaced proximally from the first brace and mounted to exterior portions the lower elongated plenum and a fourth brace 602 spaced proximally from the first brace and mounted to an opposed exterior portions of the lower elongated plenum. In this aspect, each brace of the second pair of opposing retention braces includes a bar 595 extending between a first end mount 596 and an opposing second end mount 597 such that, when the respective first and second end mounts are positioned therein the lower elongated plenum, the bar is spaced from an exterior surface of the lower elongated plenum and defines a slot 598 that is sized and shaped for receipt of respective side surfaces of the pair of silencer hoods when the pair of silencer hoods is positioned in the stowed position.

In embodiments, the upper noise attenuation system 540 may include at least one array of baffles configured to attenuate noise that is mounted therein at least a portion of the planer surface of at least one or in each of the opposed silencer hoods.

In other embodiments and referring to FIGS. 35-38, the upper noise attenuation system 540 may optionally include an elongated conduit 610 that has an exterior surface shape that is shaped and sized for complementary receipt therein a distal portion of the lower elongated plenum 530. In this aspect, in the stowed position, the elongated conduit 610 is positioned substantially therein the lower elongated plenum such that an outlet end 612 of the elongated conduit is positioned proximate to the distal end of the lower elongated plenum. In the operative position, the elongated conduit 610 is selectively movable about and along an about an exhaust axis outwardly away from the distal end of the lower elongated plenum such that a proximal end 614 of the elongated conduit is positioned proximate the distal end of the lower elongated plenum and the outlet end 612 of the elongated conduit forms the outlet of the upper elongated plenum.

In this aspect, to operatively move or otherwise urge the elongated conduit 610 about and between the stowed and operative positions, the upper noise attenuation system 540 may include at least one guide 620 mounted to an exterior surface (e.g., at an upper end thereof) of the lower elongated plenum 530. As will be appreciated, the guide 620 may define an elongated enclosed slot extending parallel to the exhaust axis. A rod 622 having a distal end mounted to an outermost edge surface of the outlet end 612 of the elongated conduit 610 may be provided that is configured for operative slideably receipt therein the slot of the guide 620. To operatively move the rod 622 and thereby move the elongated conduit 610 relative to the lower elongated plenum 530, a means for selective axial movement of the rod 622 and thus for movement of the elongated conduit 610 may be provided for selective movement of the elongated conduit 610 between the stowed position (see, e.g., FIGS. 35 and 37) and the operative position (see, e.g., FIG. 36).

Figure 38:
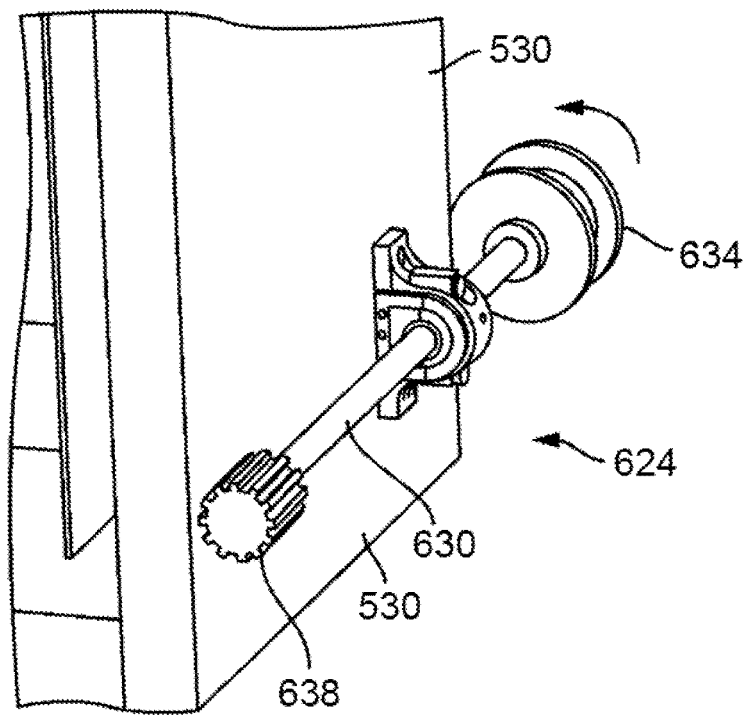
FIG. 38 schematically illustrates portions of a assembly for selective axial movement of the rod for movement of the elongated conduit between the stowed position and the operative position according to some embodiments of this disclosure.

As illustrated in FIGS. 35-38, selective axial movement of the rod 622 may be provided by an extension assembly 624. In some examples, the extension assembly 624 may include pairs of pulleys 626 connected to opposing sides 628 of the lower elongated plenum 530, and a drive shaft 630 coupled to the lower elongated plenum 530. The extension assembly 624 may also include a pair of cables 632, each of which is anchored to a lower end of the lower elongated plenum 530. A pair of drive wheels 634 may be connected to each end of the drive shaft 630, and each of the drive wheels 634 may be configured to retract or extend a respective one of the pair of cables 632, for example, such that retraction of the pair of cables 632 causes the rod 622 to push the elongated conduit 610 to extend from the lower elongated plenum 530 and into the operative position (see FIG. 36), and extension of the pair of cables 632 causes the rod 622 to return to a lowered position, thereby allowing the elongated conduit 610 to return to the stowed position (see FIGS. 35 and 37). In some examples, at ends of the respective rods 622 remote from the outlet end 612 of the elongated conduit 610, a rod pulley 636 may be provided for engaging a respective cable 632 to facilitate movement of the elongated conduit 610 relative to the lower elongated plenum 530. As shown in FIG. 38, in some examples, a drive gear 638 may be connected to the drive shaft 630 to facilitate rotation of the drive shaft 630 via an actuator including a mating gear, such as a linear actuator and/or a rotary actuator, for example, a gear shaft and a prime mover such as, for example, and without limitation, a winch. As one skilled in the art will appreciate, when such a prime mover is activated, the illustrated drive gear 638 of the drive shaft 630 rotates, which causes the complementary rotation of the drive wheels 634 connected to the respective ends of the drive shaft 630. In turn, the cables 632 will spool onto each of the drive wheels 634 and via the pulleys 626, will affect the translation of the proximal end of the respective rods 622 to extend the elongated conduit 610 into the operative position.

In this embodiment, the upper noise attenuation system may include at least one array of baffles configured to attenuate noise that may be mounted therein an outlet end of the elongated conduit.

It is contemplated that the means for selective axial movement of the rod for selective movement of the elongated conduit 610 between the stowed position and the operative position of the elongated conduit 610 may comprise one or more actuators, such as linear actuators and/or rotary actuators, and in some embodiments, one or more cables and/or one or more mechanical linkages. In some embodiments, the one or more actuators may be electrically-actuated, pneumatically-actuated, and/or hydraulically-actuated (e.g., via hydraulic cylinders and/or hydraulic motors). For example, selective movement of the elongated conduit 610 between the stowed position and the operative position of the elongated conduit 610 may be provided by the spooling system described above. In this aspect, the spooling system may comprise electrical, mechanical, and/or pneumatic winches that contain spooled wire and that are configured to spool wire onto each drum via the pulleys to affect the axial movement of the rod.

Optionally, the exhaust attenuation system 520 may further comprise a supervisory control system that is configured to utilize a series of digital input and output signals that will result in the controlled operation of the upper noise attenuation system 540. In this aspect, the exhaust attenuation system 520 may comprise a plurality of positional feedback sensors in communication with the supervisory control system. The positional feedback sensors are operatively mounted to respective portions of the upper noise attenuation system 540 such that the sensors may actuate when the upper noise attenuation system 540 is positioned in the stowed position and when in the operative, upright, position.

Each positional feedback sensor may comprise, for example and without limitation, a digital proximity switch that is configured to actuate when the positional feedback sensor's electromagnetic detection field comes in contact with a portion of the metallic surface of the exhaust stack. Upon actuation, each digital proximity switch is configured to send a digital signal to the supervisory control system indicative of the position of the respective upper and lower silencer hoods 554, 556 or, optionally, the respective position of the elongated conduit 610 relative to the distal end of the lower elongated plenum.

Optionally, it is contemplated that the positional feedback sensor may be an analog position sensor that is configured to provide positional feedback to the supervisory control system of the positions of the respective upper and lower silencer hoods 554, 556 or, optionally, the respective position of the elongated conduit 610 relative to the distal end of the lower elongated plenum. In this exemplary aspect, the analog position sensor may be configured to transmit a scaled current or voltage signal that depending on the value allows the control system to identify the accurate position of the upper noise attenuation system 540. An exemplary analog position sensor, such as a Sick absolute encoder, models AFS/AFM60 SSI, would be suitable for this application.

The positional feedback sensors allow the operator to know the position of the respective upper and lower silencer hoods 554, 556 or, optionally, the respective position of the elongated conduit 610 relative to the distal end of the lower elongated plenum and to further allow for the protection of equipment on the gas turbine skid. For example, the supervisory control system may generate an interlock signal that would prohibit the ignition of the gas turbine engine upon receipt of a signal from the respective positional feedback sensors that indicates that the upper noise attenuation system 540 is in the closed position. Thus, the interlock signal preventing turbine operation into a sealed cavity prevents the possibility of serious damage to the turbine engine due to undesired backpressure.

In operational aspects, it is contemplated that the upper noise attenuation system 540 may be actuated to move between the stowed and operative positions by manual operation of a physical lever. In this aspect, and if the spooling system includes a pneumatic winch, the selective actuation of the manual level may allow for the flow of air to the pneumatic motor resulting in rotary motion at the winch. Optionally, if the spooling system includes a hydraulic winch, the selective actuation of the manual level may allow for the flow of hydraulic oil into the stator of the hydraulic motor to produce the desired rotary motion and torque to actuate the upper noise attenuation system 540. In a further, exemplary aspect, if the spooling system includes an electrical winch, a switching device may be provided that is configured to allow for the selective application of current to the electric winch motor. The switching device may exemplarily be in the form of a toggle switch that allows the electrical circuit to the motor to be completed upon actuation such that the electric motor performs the desired rotary motion.

In a further optional aspect, the supervisory control system of the exhaust attenuation system 520 may comprise a SCADA (supervisory control and data acquisition) system. Exemplarily, if pneumatic and/or hydraulic winches are used, a directional control valve with an electrical coil may be positioned between the respective pressurized sources of air or oil and the downstream pneumatic or hydraulic motors. Operationally, an operation signal transmitted or outputted to the directional control valve from the SCADA system upon operator input. In this aspect, the operation signal could be a PWM signal with reverse polarity. For example, when the operator pushes an input on a human machine interface, which is identified by the programmable logistical controller, and the necessary output operation signal is sent to the directional control valve that allows for proportional flow of the required air or oil media to the winch motor. Optionally, this methodology may also be used for an electrical winch but, in this aspect, the output operation signal would energize a relay that allows for low voltage, high current power to reach the electrical motor and perform the proportional operation function. It is contemplated that these actuation functions may be made fully autonomous by implementing a start-up sequence such that, when the operator selects to start the unit, a series of sequenced signal outputs are driven around the frac pump trailer that will verify that the exhaust attenuation system 520 is in the open, operative position, the auxiliary power is verified to be on line, the necessary safety and communication checks performed, and then the gas turbine is allowed to start. In this exemplary aspect, a single input to actuate the exhaust attenuation system 20 to move to the open, operative position may initiate the issuance of a series of outputs from the SCADA system, which may save the operator time and may reduce complexity of how to individually perform these sequential outputs.

During fracturing operations, high and low frequency torsional vibration is a common occurrence through the driveline. Such torsional vibration is typically generated via the operation of a reciprocating pump. Reciprocating pumps are driven to pump "slugs" of fluid with as the pump reciprocates or cycles. The speed and operating pressure of the pump influences the amount of fluid pumped downstream of the pump. As the reciprocating pump is cycled, movement of the slugs create pressure fluctuations within fluid downstream of the pump. This pressure fluctuation may create "hydraulic fluid pulsation" within the pump that is added to the operating pressure of the pump. The hydraulic fluid pulsation may be transferred upstream to driving equipment used to drive the pump in the form of torque output variances. The driving equipment may include one or more components including, but not limited to, a driveshaft, an engine, a transmission, or a gearbox.

As noted, the nature of the suction and discharge strokes of the reciprocating pump generate variable torque spikes that originate from the discharge of high pressure fluid and may migrate through the drive line and cause damage and premature wear on the driveline components including the prime mover. Problematically, each reciprocating pumps operating in the field generally have their own torsional vibration frequency and amplitude profile that is dependent upon the selected operational pressure and rate. Another problem arises when a group of reciprocating pumps are connected to a common discharge line. In this operational scenario, reciprocating pumps may begin to synchronize such that the natural sinusoidal wave form of one pump will begin to mirror that of another pump from the group, which promotes pressure spikes and torsional distortion of even higher amplitude to pulsate through the drive lines.

The torque output variances may create shock loading in the pump and in the driving equipment upstream from the pump. This shock loading may shorten the life of the driving equipment including causing failure of one or more components of the driving equipment. In addition, driving equipment such as combustion engines, e.g., gas turbine engines, have a movement of inertia, natural damping effects, and stiffness coefficients. Some driving equipment may have low natural damping effects that may allow for torsional resonance interaction within the driving equipment and/or between the driving equipment and the pump. This torsional resonance may shorten the life of the driving equipment including causing failure of one or more components of the driving equipment.

Thus there is a need to provide protection of hydraulic drive line fracturing equipment from imposed high frequency/low amplitude and low frequency/high amplitude torsional vibrations.

This disclosure relates generally to vibration dampening assemblies for use with pump systems including a reciprocating pump and driving equipment configured to cycle the pump. The vibration dampening assemblies may include single mass flywheel(s) and/or torsional vibration dampener(s) to reduce or eliminate upstream shock loading and/or dampen torsional resonance from reaching the driving equipment. As a result, the vibration dampening assemblies may reduce or eliminate pump imposed high frequency/low amplitude and low frequency/high amplitude torsional vibrations.

According to some embodiments, a single mass flywheel or a series of single mass flywheels along the drive-train system components between the gear box or transmission and input shaft of a reciprocating pump may be used to reduce output speed fluctuations that may cause vibrational and torsional effects on the gearbox and engine. Further, at least one torsional vibration dampener may be connected to the drive-train system to dampen the harmonic effects of the reciprocating pump. According to some embodiments, the at least one flywheel and the at least one torsional damper may not require electrical control to be able to function, but it is contemplated that electrical sensors and instrumentation may be present to monitor the condition of the drive line.

Figure 39:
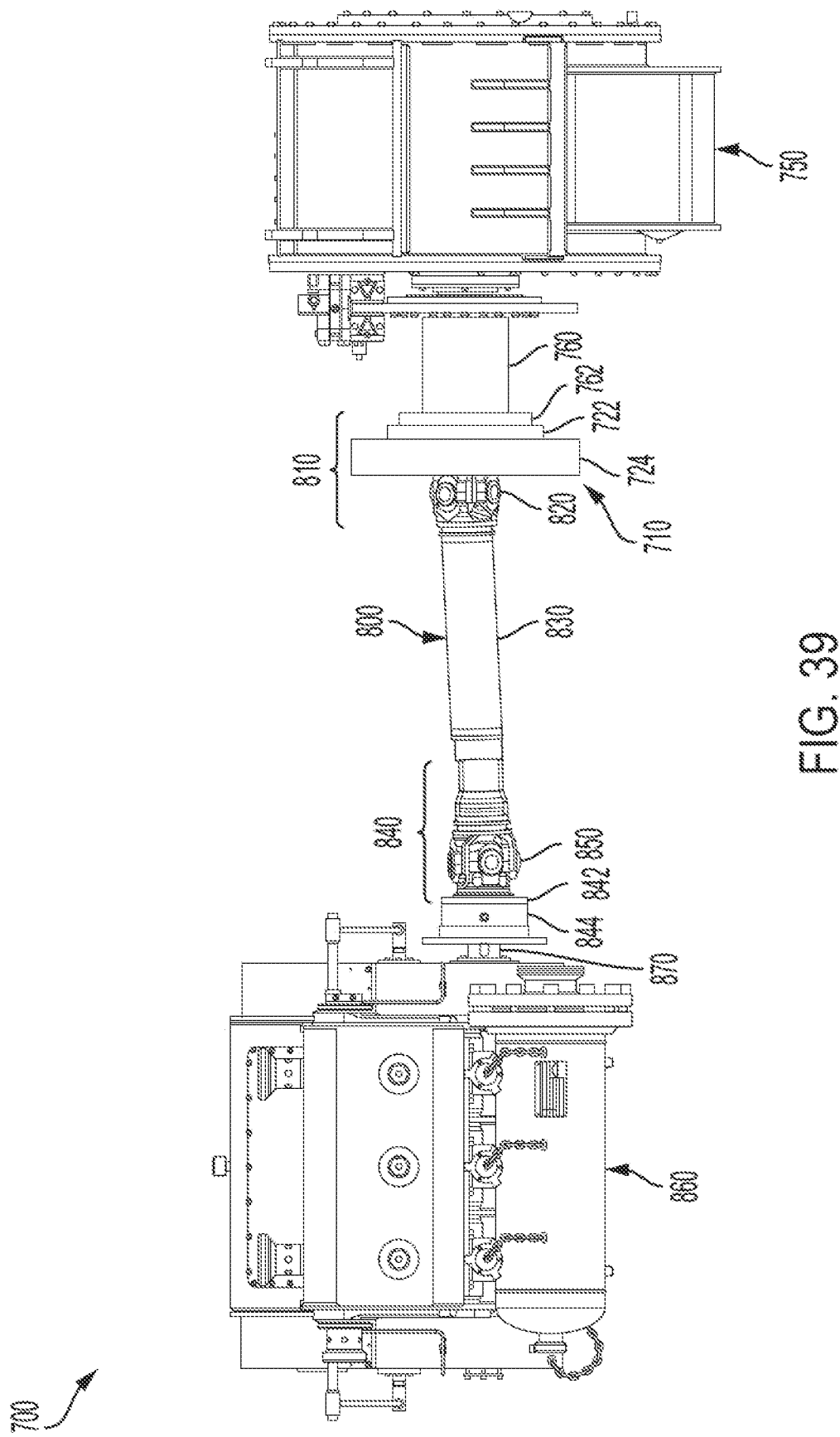
FIG. 39 is a schematic view of a pump system having a first exemplary embodiment of a vibration dampening assembly according to some embodiments of this disclosure.

Referring now to FIG. 39, an exemplary pump system 700 having a vibration dampening assembly 710 described in accordance with the present disclosure. The pump system 700 may be included within a hydraulic fracturing unit (such as hydraulic fracturing units 102, 220, 510 previously described). The pump system 700 includes driving equipment 750 and driven components including a driveshaft 800 and a pump 860. The vibration dampening assembly 710 is secured to portions of a pump system 700 between the driving equipment 750 and the pump 860 to dampen upstream high frequency/low amplitude and low frequency/high amplitude torsional vibrations generated by the operating pump 860 from reaching the driving equipment 750.

The driving equipment 750 is illustrated as a power transfer case. In some embodiments, the driving equipment 750 includes a driveshaft, a transmission, a gearbox, or an engine, e.g., an internal combustion engine or a gas turbine engine. The driving equipment 750 includes an output shaft 760 that has an output flange 762. The driving equipment 750 is configured to rotate the output shaft 760 about a longitudinal axis thereof. The driving equipment 750 may include an engine and a transmission, gearbox, and/or power transfer case that may be configured to increase a torque and decrease a rotational speed of the output shaft 760 relative to a driveshaft of the engine or that may be configured to decrease a torque and increase a rotational speed of the output shaft 760 relative to a driveshaft of the engine. The pump 860 includes in input shaft 870 having an input flange that is configure to receive input from the driving equipment 750 in the form of rotation of the input flange about a longitudinal axis of the input shaft 870.

The driveshaft 800 has a driving or upstream portion 810, a driven or downstream portion 840, and a central portion 830 between the upstream and downstream portions 810, 840. The upstream portion 810 includes an upstream flange (not shown) that is connected to the output flange 762 of the driving equipment 750 such that the upstream portion 810 rotates in response or in concert with rotation of the output shaft 760. The central portion 830 is secured to the upstream portion 810 and rotates in concert therewith. The downstream portion 840 is secured to the central portion 830 and rotates in concert therewith. The downstream portion 840 includes a downstream flange 842 that is connected to an input flange of the pump 860 such that the input flange rotates in response or in concert with rotation of the driveshaft 800. The downstream portion 840 may also include a spindle 844 adjacent the downstream flange 842. The upstream flange (not shown) may be similar to downstream flange 842 and the upstream portion 810 may include a spindle (not shown) that is similar to the spindle 844 of the downstream portion 840.

In some embodiments, the output shaft 760 of the driving equipment 750 is offset from the input shaft 870 of the pump 860 such that the longitudinal axis of the output shaft 760 is out of alignment, or is not coaxial with, the longitudinal axis of the input shaft 870. In such embodiments, the upstream portion 810 or the downstream portion 840 may include a constant velocity (CV) joint 820, 850 between the spindle 844 and the central portion 830. The CV joints 820, 850 allow for the output shaft 760 to be operably connected to the input shaft 870 when the output and input shafts 760, 870 are offset from one another.

During operation, the output shaft 760 is rotated by the driving equipment 750 to rotate the input shaft 870 of the pump 860 such that the pump 860 is driven to pump slugs of fluid. Specifically, the driving equipment 750 is configured to rotate the input shaft 870 at a constant velocity such that the pump 860 provides a constant flow of fluid. As the pump 860 pumps slugs of fluid, the pulses of the slugs of fluid create a pulsation pressure that adds to the nominal operating pressure of the pump 860.

Figure 40:
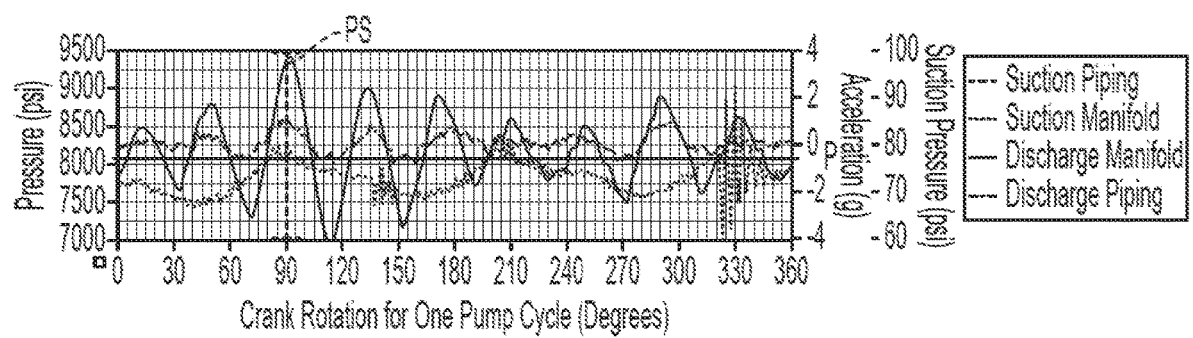
FIG. 40 is a graph illustrating a pressure, acceleration, and suction pressure of an exemplary pump of the pump system of FIG. 39 through a cycle of the pump according to some embodiments of this disclosure.

With additional reference to FIG. 40, the pressure P of the pump 860 is illustrated through an exemplary cycle of the pump 860. The pump 860 has a nominal pressure PN of 8250 psi with a normal operating pressure in a range of 7500 psi to 9000 psi. The pulsations of the operating pressure illustrate the pulsation pressure described above which is known as "hydraulic fluid pulsation." This hydraulic fluid pulsation may lead to pressure spikes PS as illustrated between points 60 and 150 of the cycle of the pump 860 in FIG. 40. The pressure spikes PS are measured as peak-to-peak pressure variations, which as shown in FIG. 40 is 2,500 psi.

The hydraulic fluid pulsation describe above may be transferred upstream from the pump 860 to the driving equipment 750 through the driveshaft 800. Specifically, the hydraulic fluid pulsation results in torque variations in a crank/pinion mechanism of the pump 860 that are transferred upstream as torque output variations at the input shaft 870 of the pump 860. These torque output variations may create a torsional shock TS at the output flange 762 of the output shaft 760. A single large torsional shock TS may damage components of the driving equipment 750. In addition, an accumulation of minor or small torsional shocks TS may decrease a service life of one or more of the components of the driving equipment 750.

With continued reference to FIG. 1, the vibration dampening assembly 710 is provided to reduce the transfer of the torsional shock TS upstream to the driving equipment 750. The vibration dampening assembly 710 may include at least one flywheel. In one aspect, the at least one flywheel may comprise a flywheel 722 that is connected to the output flange 762 and disposed about the upstream portion 810 of the driveshaft 800. In some embodiments, the flywheel 722 may be connected to the output flange 762 and be disposed about the output shaft 760.

Figure 41:
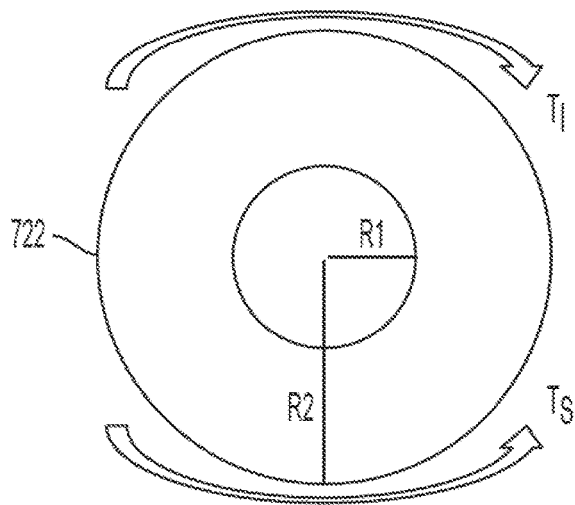
FIG. 41 is a schematic front view of a flywheel of the pump system of FIG. 39 according to some embodiments of this disclosure.

As the output shaft 760 rotates the driveshaft 800, the flywheel 722 rotates in concert with the output shaft 760. As shown in FIG. 41, torque provided by the driving equipment 750 to the input shaft 870 of the pump 860 is illustrated as an input torque TI and the torque output variations at the input shaft 870 of the pump 860 result in a reaction torque illustrated as torque spikes TS. As the flywheel 722 rotates, angular momentum of the flywheel 722 counteracts a portion of or the entire torque output variances and reduces or eliminates torsional shock TS from being transmitted upstream to the driving equipment 750. Incorporation of the flywheel 722 into the vibration dampening assembly 710 allows for the vibration dampening assembly 710 to dampen the low frequency, high amplitude torsional vibrations imposed on the drivetrain system that is caused by the hydraulic fluid pulsation.

The angular momentum of the flywheel 722 may be calculated as a rotational kinetic energy "KE" of the flywheel 722. The "KE" of the flywheel 722 may be used to absorb or eliminate a percentage of the torsional shock TS. The "KE" of the flywheel 722 is a function of the moment of inertia "I" of the flywheel 722 and the angular velocity "ω" of the flywheel 722 which may be expressed as:

$$KE = \frac{1}{2}(I\omega)^2$$

Figure 42:
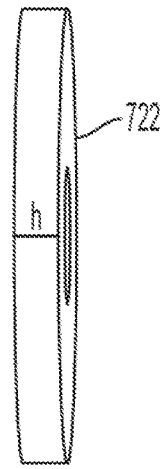
FIG. 42 is a schematic side view of the flywheel of the pump system of FIG. 41 according to some embodiments of this disclosure.

As noted above, the driving equipment 750 is configured to rotate at a constant angular velocity "ω" such that with a known "KE" or a known moment of inertia "I" the other of the "KE" or the moment of inertia "I" may be calculated. In addition, the moment of inertia "I" of the flywheel 722 is dependent on the mass "m" and the radial dimensions of the flywheel 722 and may be expressed as:

$$I = \frac{m(r_1^2 + r_2^2)}{2}$$

where r1 is a radius of rotation and r2 is a flywheel radius as shown in FIG. 41. This equation assumes that the flywheel 722 is formed of a material having a uniform distribution of mass. In some embodiments, the flywheel 722 may have a non-uniform distribution of mass where the mass is concentrated away from the center of rotation to increase a moment of inertia "I" of the flywheel 722 for a given mass. It will be appreciated that the mass may be varied for a given a radius of rotation r1 and a given a flywheel radius r2 by varying a thickness "h" of the flywheel 722 in a direction parallel an axis of rotation of the flywheel 722 as shown in FIG. 42.

The dimensions and mass of the flywheel 22 may be sized such that the flywheel 722 has a "KE" similar to a "KE" of an anticipated torque variance above a nominal operating torque of the pump 860. In some embodiments, the flywheel 722 may be sized such that the "KE" of the flywheel 722 is greater than an anticipated torque variance such that the flywheel has a "KE" greater than any anticipated torque variance and in other embodiments, the flywheel 722 may be sized such that the "KE" of the flywheel 722 is less than the anticipated torque variance such that the flywheel 722 is provided to absorb or negate only a portion of the anticipated torque variances. In particular embodiments, the flywheel 722 is sized such that the "KE" of the flywheel 722 is equal to the anticipated torque variance such that the flywheel 722 is provided to absorb or negate the anticipated torque variance while minimizing a moment of inertia "I" of the flywheel 722.

The rotational kinetic energy "KE" of the torque variance is calculated from the specifications of a particular pump, e.g., pump 860, and from empirical data taken from previous pump operations as shown in FIG. 40. For example, as shown in FIG. 40, the pressure spike PS is analyzed to determine a magnitude of the pressure spike PS and a duration of the pressure spike PS. As shown, the duration of the pressure spike PS occurred over 0.628 radians of the cycle and using the specification of the pump resulted in a torque above the nominal operating torque of 1420 lb-ft. From these values and given the constant velocity of the particular pump of 152.4 radians/second, the "KE" of a torque variance resulting from the pressure spike PS may be calculated as 8922 lb-ft or 12,097 N-m of work.

The "KE" of the torque variance may be used to size a flywheel 722 such that the flywheel 722 has a "KE" greater than or equal to the "KE" of the torque variance. Initially, equation (1) is used to calculate a desired moment of inertia "I" of the flywheel 722 solving for the "KE" of the torque variance created by the pressure spike PS for a given angular velocity "ω" of the flywheel 722. For example, the angular velocity "ω" of the output shaft 760 may be 152.4 radians/second with the "KE" of the torque variance created by the pressure spike PS being 12,097 N-m. Solving equation (1) provides a desired moment of inertia "I" of the flywheel 722 as 1.047 kg m2.

Once the desired moment of inertia "I" of the flywheel 722 is determined, equation (2) is used to determine dimensions of the flywheel 722 using desired moment of inertia "I". As shown in FIG. 42, with the desired moment of inertia "I", a set radius of rotation "r1", and a set thickness of the flywheel 722, the flywheel radius "r2" and mass "m" may be manipulated such that the flywheel 722 has dimensions and a mass that are optimized for a particular application. Referring to FIG. 42, for example and not meant to be limiting, a 10 kg flywheel with an outer radius "r2" of 0.45 m has the same moment of inertia as a 100 kg flywheel with an outer radius "r2" of 0.13 m such that either the 10 kg flywheel or the 100 kg flywheel would have the same "KE" to absorb the "KE" of the torque variance created by the pressure spike PS.

It will be appreciated that for a given system, the radius of rotation "r1" of the flywheel is set by a diameter of the spindle or flange on which the flywheel is secured, e.g., upstream flange of the upstream portion 810 or the flange 842 or the spindle 844 of the downstream portion 840 (FIG. 39). In addition, the thickness "h" of the flywheel 722 may also be manipulated to vary a mass of the flywheel for a given outer radius "r2".

Figure 44:
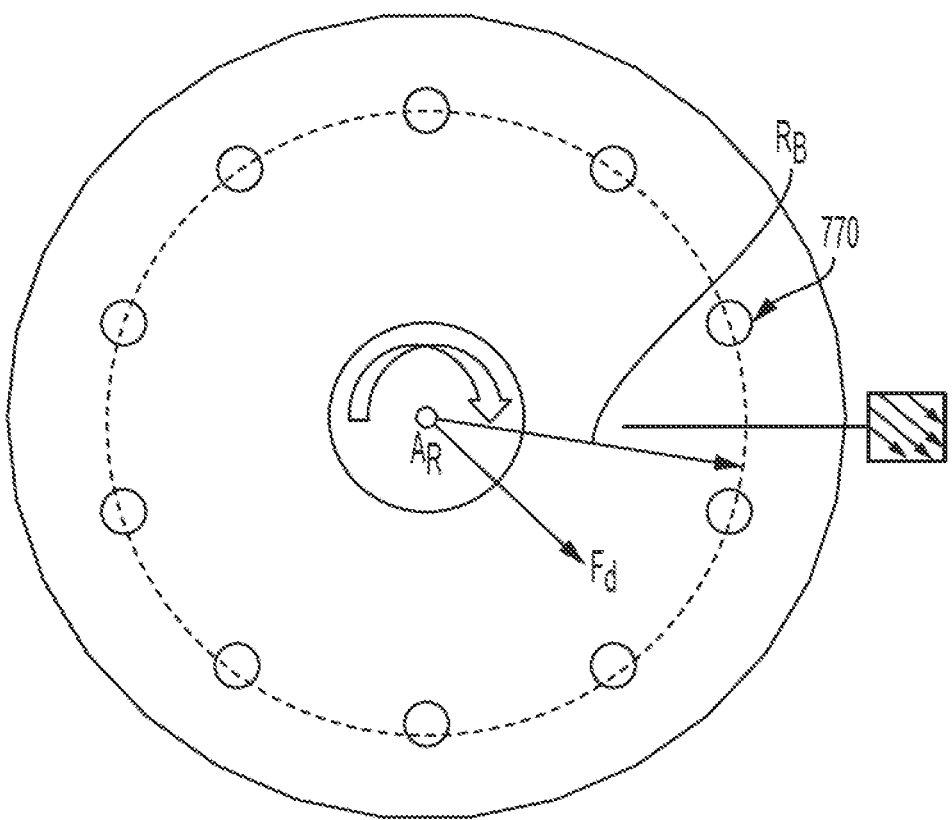
FIG. 44 is another schematic front view of a flywheel of the pump system of FIG. 39 illustrating bolt holes and rotational stresses of the flywheel according to some embodiments of this disclosure.
Figure 45:
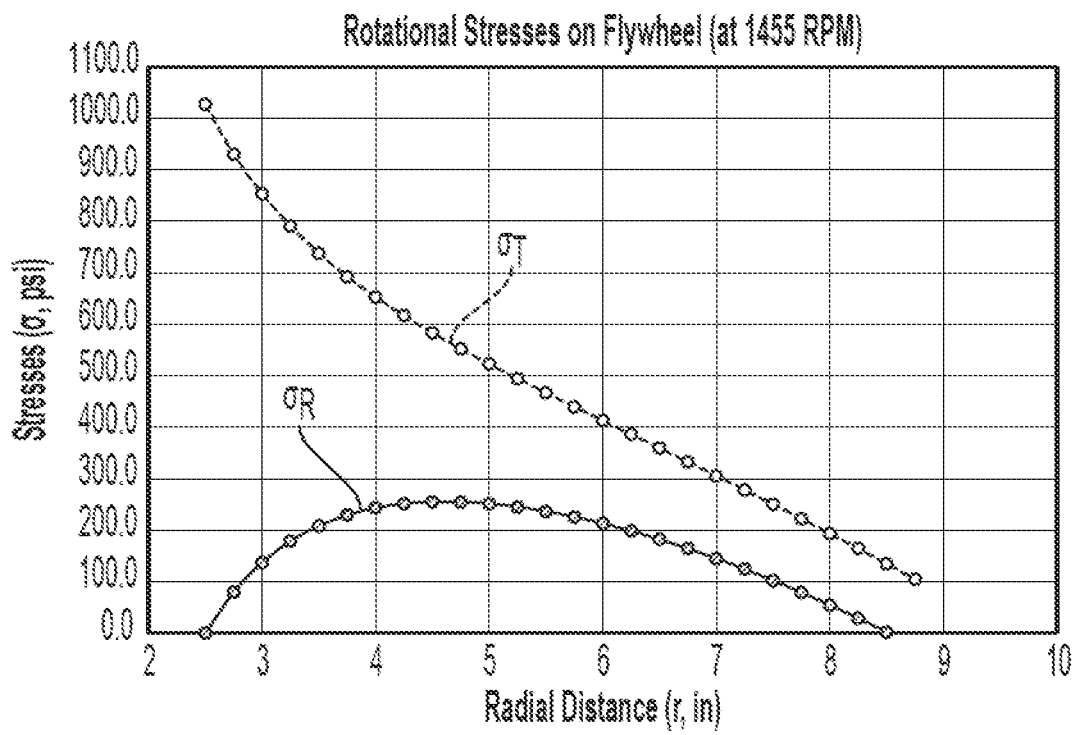
FIG. 45 is a graph illustrating tangential and radial stresses of the flywheel of FIG. 39 according to some embodiments of this disclosure.

With additional reference to FIG. 44, the flywheel 722 is subjected to rotational stresses that differ within the flywheel 722 dependent on the radial distance "rd" away from axis of rotation "AR" of the flywheel 722. It is important to choose a material for the flywheel 722 that is capable of withstanding the rotational stresses of the flywheel 722. To determine the rotational stresses of the flywheel 722, the flywheel may be treated as a thick-walled cylinder to calculate the tangential and radial stresses thereof. The calculations detailed below assume that the flywheel 722 has a uniform thickness "h", the flywheel radius "r2" is substantially larger than the thickness "h" (e.g., r2>5 h), and the stresses are constant over the thickness "h". The tangential stress "at" and radial stress "ar" of the flywheel 722 may be expressed as follows:

$$\sigma_t = \rho\omega^2\left(\frac{3+v}{8}\right)\left\{r_1^2 + r_2^2 + \frac{r_1^2(r_2^2)}{r_d^2} - \frac{(1+3v)}{3+v}(r_d^2)\right\}$$

$$\sigma_r = \rho\omega^2\left(\frac{3+v}{8}\right)\left\{r_1^2 + r_2^2 - \frac{r_1^2(r_2^2)}{r_d^2} - (r_d^2)\right\}$$

where ρ is a mass density (lb./in$^3$) of the material of the flywheel 722, ω is the angular velocity (rad/s) of the flywheel 722, and v is the Poisson's ratio of the flywheel 722. As shown in FIG. 45, when the inner radius $r_1$ is 2.5 inches and the outer radius $r_2$ is 8.52 inches the maximum tangential stress "$a_t$" is 1027 psi at 2.5 inches from the axis of rotation and the maximum radial stress "$a_r$" is 255 psi at 4.5 inches from the axis of rotation.

Figure 46:
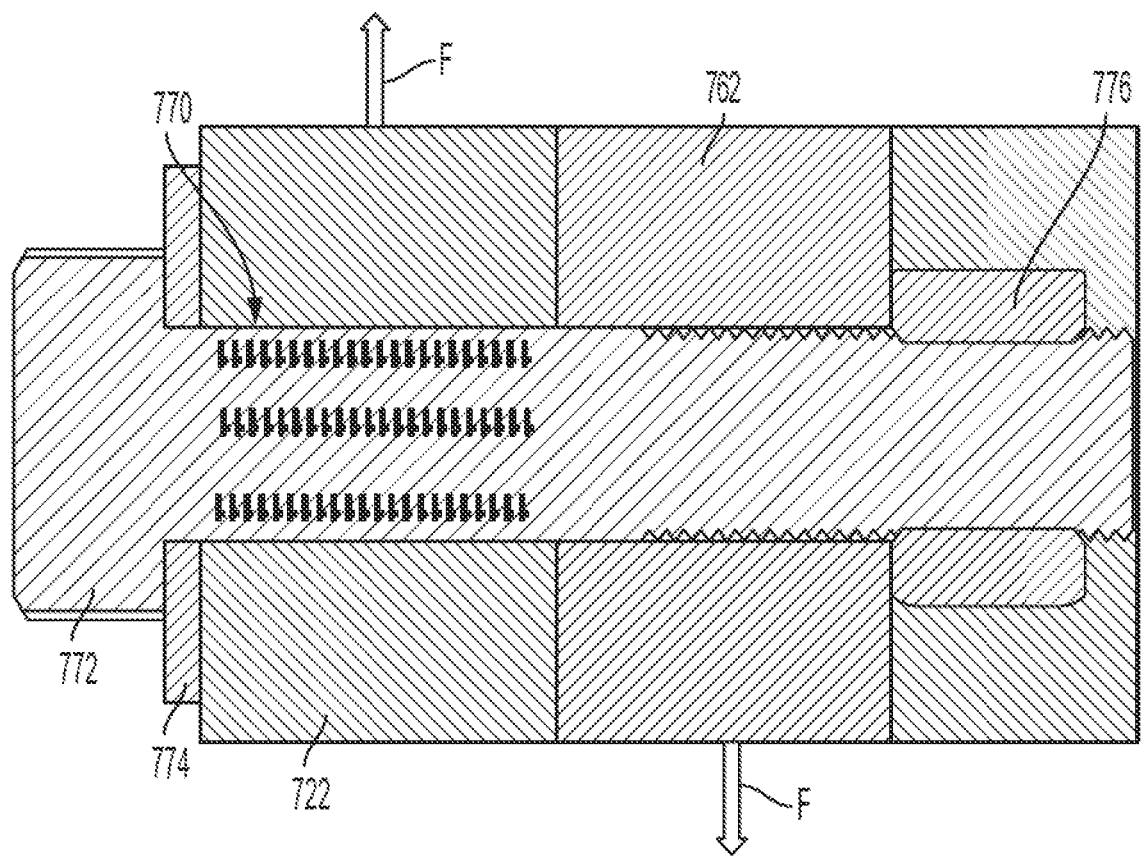
FIG. 46 is a schematic side view of a portion of the pump system of FIG. 39 illustrating a bolt and nut securing the flywheel to an output flange according to some embodiments of this disclosure.

The installation or securement of the flywheel 722 to the pump system, e.g., to output flange 762 of the output shaft 760 (FIG. 39), must also be analyzed to confirm that the means for attachment is suitable for the calculated stresses. For example, the planar stresses occurring at the point of installment may be calculated. Specifically, the flywheel 722 may be installed to the output flange 762 as described above or to the input flange of the pump as described below. For the purposes of this analysis, it will be assumed that the flywheel 722 is installed with a number of bolts 772 and nuts 776 as shown in FIG. 46. To secure the flywheel 722 to the output flange 762 (FIG. 39), each bolt 772 is passed through a bolt hole 770 defined through the flywheel 722 at a bolt radius "rB" (FIG. 6) from the axis of rotation "AR" of the flywheel 722. The planar stresses may be calculated as follows:

$$F_B = \frac{T}{r_B}$$

$$v_s = \frac{T}{A_B}$$

$$v_b = \frac{F_B}{hd}$$

where $F_B$ is a force (lbf) applied to the bolt 772, T is a torque (lb-ft) applied to the flywheel 722, $A_B$ is a bolt bearing stress area (in$^2$) of the bolt 772, d is a diameter (ft) of the bolt hole 770, $v_s$ is a shear stress (psi) of each bolt 772, and $v_b$ is a bearing stress (psi) on the flywheel 722/bolt hole 770.

Continuing the example above, given a maximum torque "T" applied to the output flange 762 of 35,750 lb-ft with a bolt radius "rB" of 7.6 inches, the force applied to the bolts FB is 56,447 lbf. With the bolt bearing area of each bolt 772 being 0.785 in2 the shear stress vS of each of the 10 bolts is 7,187 psi. With the thickness of the flywheel "h" being 1.54 inches and a diameter of each bolt hole being 1.06 inches, the bearing stress vB is 3,885 psi.

From the calculated stresses of the example above and applying a factor of safety, a material for the flywheel 722 should have should have a tensile yield strength greater than or equal to 75 ksi. Examples of some suitable materials for the flywheel 722 are 1040 carbon steel, 1050 carbon steel, or Inconel® 718; however, other suitable metals or other materials may also be used. In addition, the materials sued for the bolts 772 and the nuts 776 should have a tensile strength greater than the calculated stresses. Examples of some suitable materials for the bolts 772 and the nuts 776 are Grade 8 carbon steel, Grade 5 carbon steel, or Grade G (8) steel; however, other suitable metals or other materials may also be used.

Referring briefly back to FIG. 39, the vibration dampening assembly 710 may also include at least one torsional vibration damper. The at least one torsional vibration damper may comprise a torsional vibration damper 724 disposed upstream of the pump 860. As shown, the torsional vibration damper 724 is disposed about the upstream portion 810 of the driveshaft 800 and is connected to a downstream side of the flywheel 722. The vibration damper 724 may be connected directly to the flywheel 722 or directly to the output flange 762 of the driving equipment 750 and may be disposed about the upstream portion 810 of the driveshaft 800 or the output shaft 760. The torsional vibration damper 724 is configured to prevent torsional resonance within the driving equipment 750 that may lead to damage or fatigue of components of the driving equipment 750, the driveshaft 800, or the pump 860. Incorporation of the torsional vibration damper 724 along the drivetrain in between the gearbox and/or transmission and the single acting reciprocating pump 860 allows for the vibration dampening assembly 710 to dampen the high frequency, low amplitude torsional vibrations imposed on the drivetrain system that is caused by forced excitations from the synchronous machinery. The torsional vibration damper 724 may be a viscous, a spring-viscous, or a spring torsional vibration damper. Examples of suitable torsional vibration dampers include, but are not limited to, a Geislinger Damper, a Geislinger Vdamp®, a Metaldyne Viscous Damper, a Kendrion Torsional Vibration Dampener, a Riverhawk Torsional Vibration Dampener, and the like.

As shown FIG. 39, the vibration dampening assembly 710 is secured to the output flange 762. Specifically, the flywheel 722 is connected to the output flange 762 and the torsional vibration damper 724 is connected to the flywheel 722. However, as illustrated below with reference to FIGS. 43-45, the flywheel 722 and/or the torsional vibration damper 724 may be disposed at other positions within the pump system 700 and the vibration dampening assembly 710 may include multiple flywheels and/or multiple vibration dampers.

Figure 47:
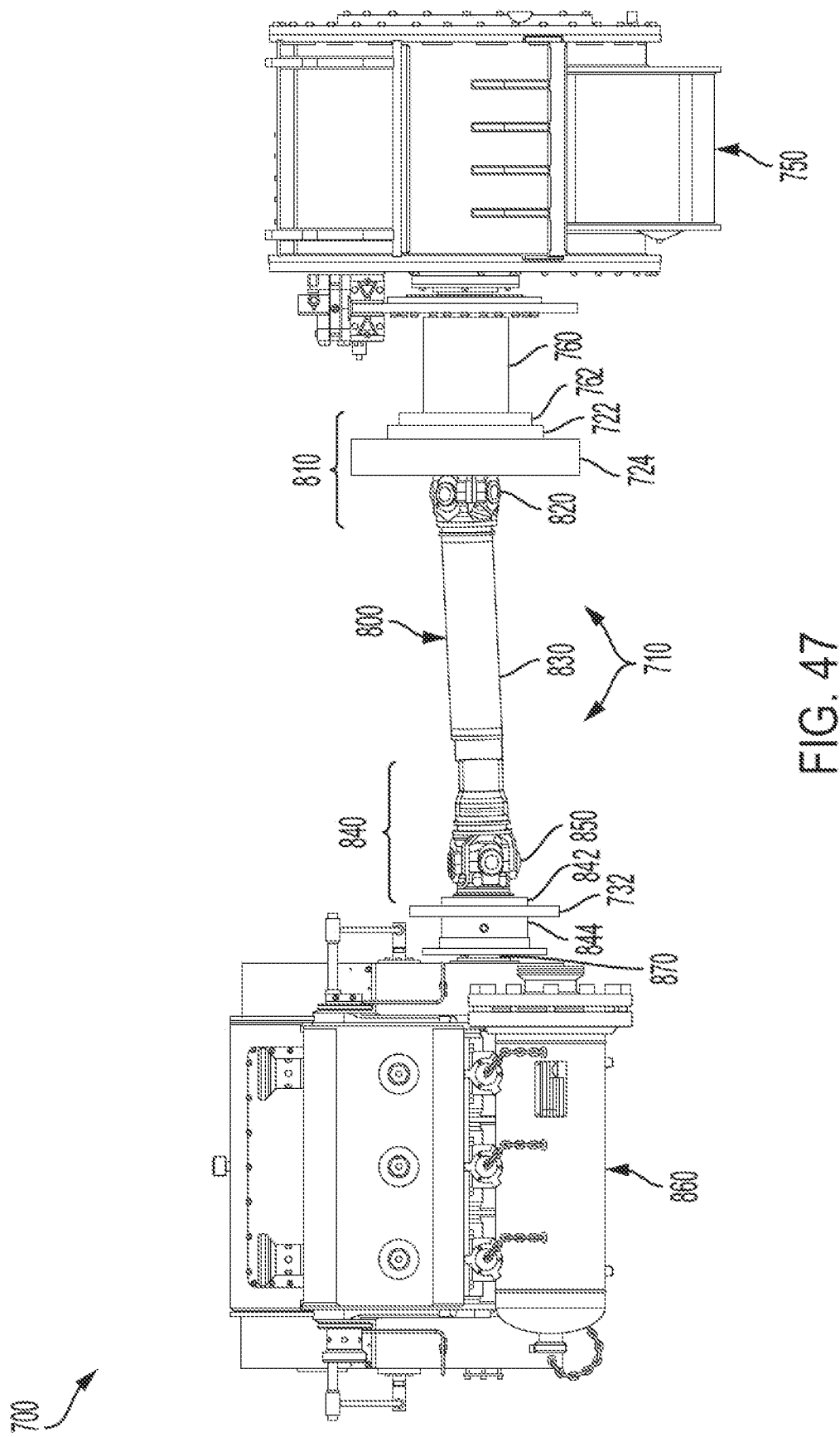
FIG. 47 is a schematic view of the pump system of FIG. 39 with another exemplary embodiment of a vibration dampening assembly according to some embodiments of this disclosure.

Referring now to FIG. 47, the vibration dampening assembly 710 includes a first flywheel 722, the torsional vibration damper 724, and a second flywheel 732. The second flywheel 732 is connected to the input flange of the pump 860. When the vibration dampening assembly 710 includes the first flywheel 722 and the second flywheel 732, the sum of the "KE" of the flywheels 722, 732 may be configured in a manner similar to the "KE" of a single flywheel as detailed above with respect to the flywheel 722. In some embodiments, each of the first and second flywheel 722, 732 is sized to have a similar moment of inertia "I". In such embodiments, the first and second flywheel 722, 732 may have similar dimensions and mass or may have different dimensions and mass while having a similar moment of inertia "I". In other embodiments, the first flywheel 722 is configured to have a moment of inertia "I" different, e.g., greater than or lesser than, a moment of inertia "I" of the second flywheel 732.

Figure 48:
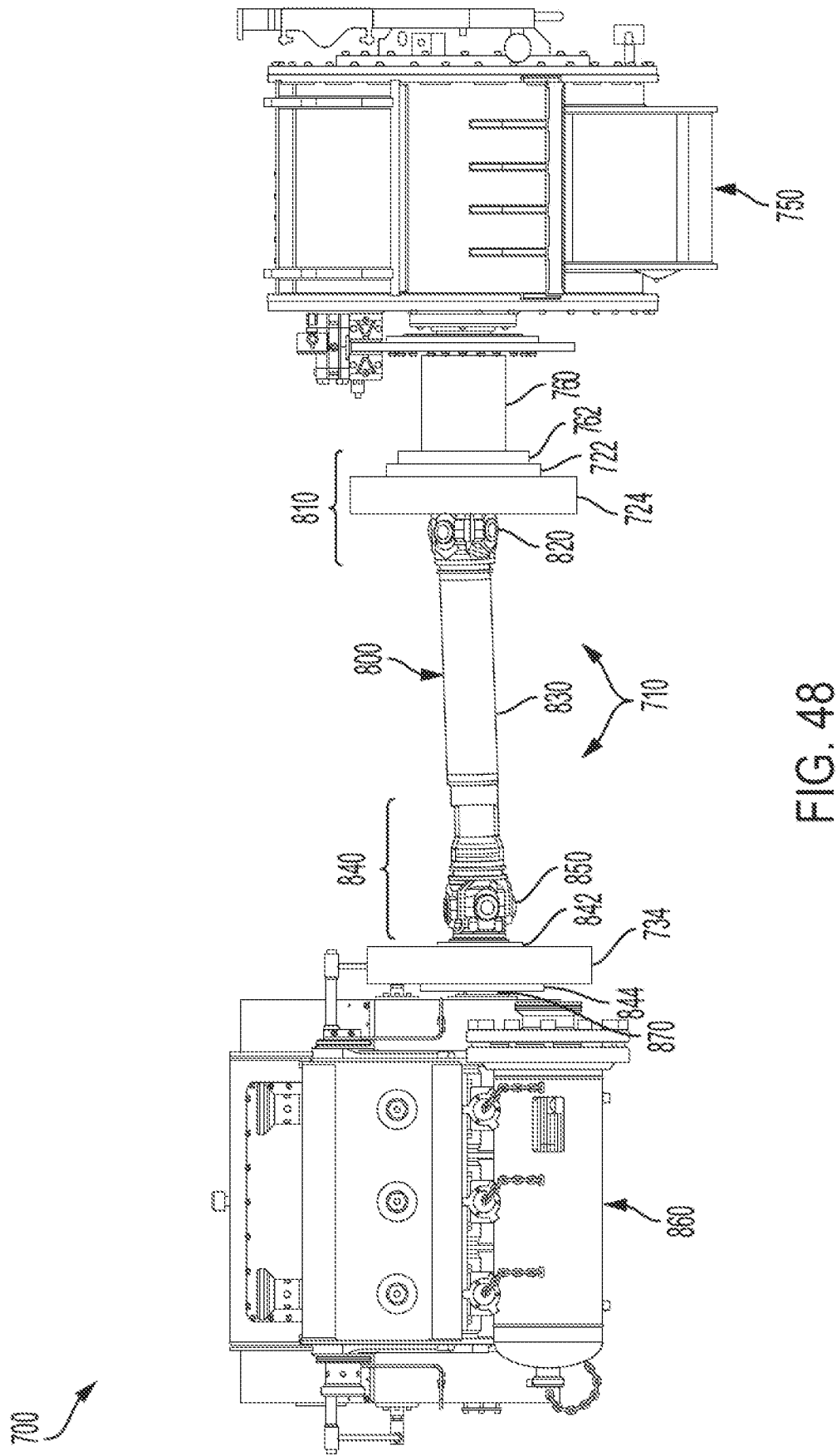
FIG. 48 is a schematic view of the pump system of FIG. 39 with another exemplary embodiment of a vibration dampening assembly according to some embodiments of this disclosure.

With reference to FIG. 48, the vibration dampening assembly 710 includes the flywheel 722, a first torsional vibration damper 724, and a second vibration damper 734. The flywheel 722 is connected to the output flange 762 of the driving equipment 750 and the first torsional vibration damper 724 is connected to the flywheel 722. The second vibration damper 734 is connected to the input flange of the pump 860. Using first and second vibration dampers 724, 734 instead of a single vibration damper may allow for greater resistance to torsional resonance within the driving equipment 750 and/or for each of the first and second vibration dampers 724, 734 to have a reduced size compared to a single vibration damper.

Figure 49:
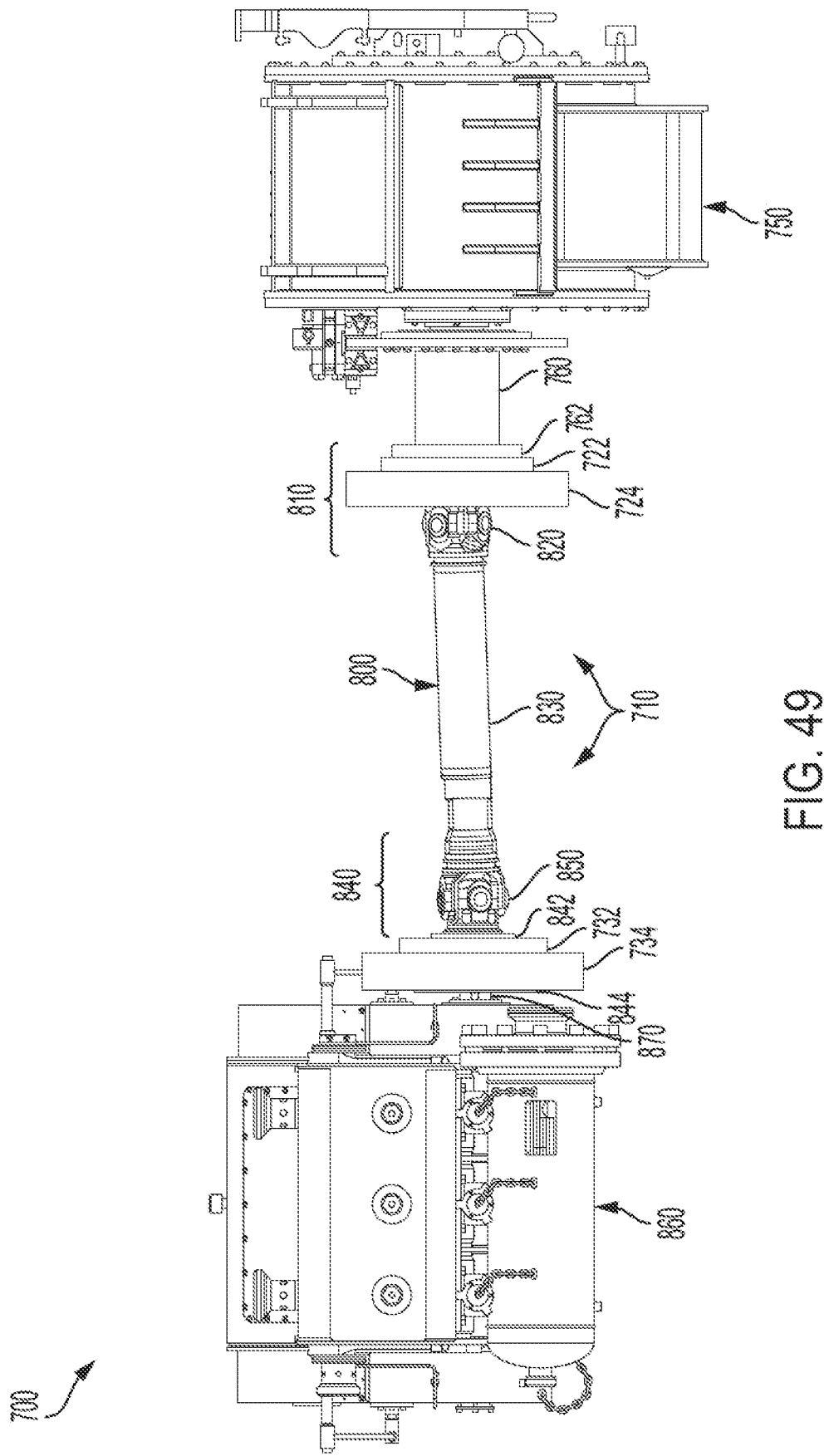
FIG. 49 is a schematic view of the pump system of FIG. 39 with another exemplary embodiment of a vibration dampening assembly according to some embodiments of this disclosure.

Referring now to FIG. 49, the vibration dampening assembly 710 includes the first flywheel 722, the first torsional vibration damper 724, the second flywheel 732, and the second vibration damper 734. The first flywheel 722 is connected to the output flange 762 of the driving equipment 750 with the first torsional vibration damper 724 connected to the first flywheel 722. The second flywheel 732 is connected to the input flange of the pump 860 with the second torsional vibration damper 734 connected to the second flywheel 732. As noted above, the first and second flywheels 722, 732 may be sized such that the sum of the "KE" of the flywheels 722, 732 is configured in a manner similar to the "KE" of a single flywheel detailed above with respect to the flywheel 722. In addition, using first and second vibration dampers 724, 734 instead of a single vibration damper which may allow for greater resistance to torsional resonance within the driving equipment 750.

The configurations of the vibration dampening assembly 710 detailed above should be seen as exemplary and not exhaustive of all the configurations of the vibration dampening assembly 710. For example, the vibration dampening assembly 710 may consist of a flywheel 732 and a torsional vibration damper 734 as shown in FIG. 49. In addition, it is contemplated that the vibration dampening assembly 710 may include more than two flywheels or more than two torsional vibration dampers. Further, the vibration dampers may each be connected directly to a respective flange, e.g., output flange 762 or input flange, and not be directly connected to a flywheel, e.g., flywheels 722, 732.

Figure 50:
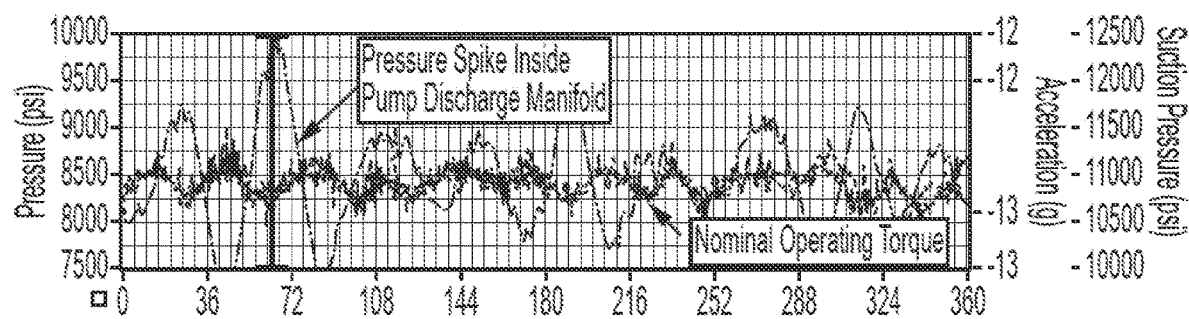
FIG. 50 is a graph showing torsional vibration analysis data results demonstrating the reduction in synthesis and torque spikes with the use of a torsional vibration dampener (TVD) and a single mass produced by a pump system such as shown in FIG. 39 according to some embodiments of this disclosure.

FIG. 50 is a graph showing torsional vibration analysis data results demonstrating the reduction in synthesis and torque spikes with the use of a torsional vibration dampener (TVD) and a single mass produced by a pump system such as shown in FIG. 39 according to an embodiment of the disclosure. A significant reduction in amplitude and frequency of the system torque spikes is noticeable over entire speed range of the reciprocating pump.

Conventional hydraulic fracturing pumping fleets have had fuel supplied from a single fuel source. In such fleets, when a hydraulic fracturing unit runs low on fuel (for example diesel), that unit may be shutdown while another stand-by hydraulic fracturing unit is brought in, refueled, and then put into service. Some inefficiencies included in this process are that the hydraulic fracturing unit once low on primary fuel must be stopped, refueled while another hydraulic fracturing unit is simultaneously being introduced into its place to make up for the loss of the pumping power that the hydraulic fracturing unit provides. This may affect the pumping performance within at least a portion of the subterranean well as requiring human intervention to perform the refueling, lining up suction and discharge valves. This may require multiple personnel to relay back the information so the process is performed in the correct series of steps. Using a single fuel source also limits the ability for the fracturing fleet to make it continuously through a section when low on fuel which results in delays in pumping completion.

In addition, in cases where the hydraulic fracturing unit needs to be taken offline for maintenance or replacement, significant disassembly is required to remove the hydraulic fracturing unit from its enclosure and to install a replacement hydraulic fracturing unit, potentially resulting in excessive downtime. In some cases, the entire trailer and enclosure may need to be removed from the site so a new, fully equipped trailer may be moved into place.

Thus, it may be seen that a need exists for more efficient ways of accessing the hydraulic fracturing units for maintenance purposes and/or replacement with minimum disruption to the system operations and the surrounding equipment. According, some embodiments of this disclosure are directed to a direct drive unit (DDU) positioner assembly, positioning system, removal system, and/or associated mechanisms for a hydraulic fracturing unit that will allow a DDU including a gearbox and a turbine engine connected to the gearbox to be detached from surrounding equipment and removed through the side of an enclosure housing the DDU. The system will allow for inspections, maintenance, or even a complete exchange of the direct drive unit with another if necessary.

Figure 51A:
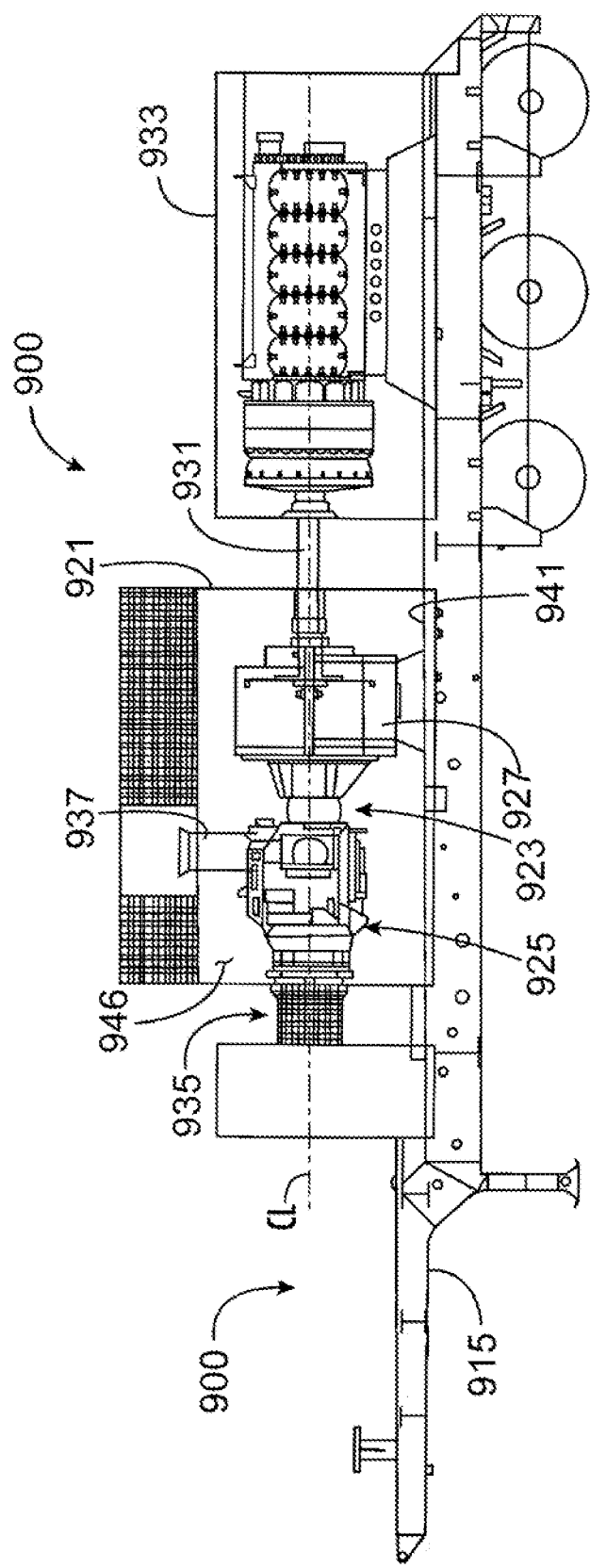
FIG. 51A is a schematic diagram of a pumping unit according to some embodiments of this disclosure.
Figure 51B:
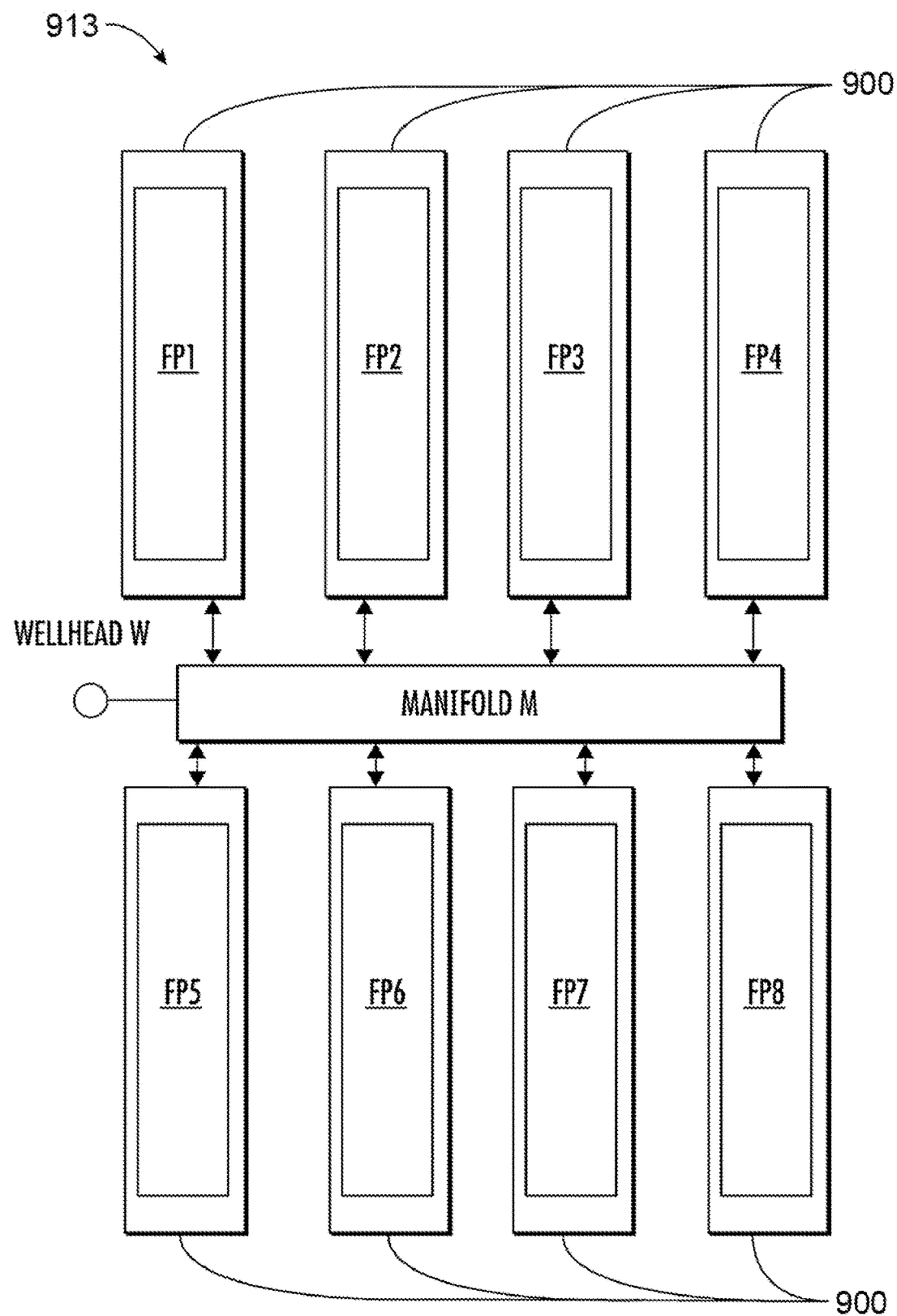
FIG. 51B is a schematic diagram of a layout of a fluid pumping system according to some embodiments of this disclosure.

FIG. 51A illustrates a schematic view of a hydraulic fracturing unit 900 for use in a high-pressure, high power, fluid pumping system 913 (FIG. 51B) for use in hydraulic fracturing operations according to one embodiment of the disclosure. The hydraulic fracturing unit 900 may be referred to herein as a "pumping unit." FIG. 51B shows a typical pad layout of the pumping units 900 (indicated as FP1, FP2, FP3, FP4, FP5, FP6, FP7, FP8) with the pumping units all operatively connected to a manifold M that is operatively connected to a wellhead W. By way of an example, the system 913 is a hydraulic fracturing application that may be sized to achieve a maximum rated horsepower of 24,000 HP for the pumping system 913, including a quantity of eight (8) 3000 horsepower (HP) pumping units 900 that may be used in one embodiment of the disclosure. It will be understood that the fluid pumping system 913 may include associated service equipment such as hoses, connections, and assemblies, among other devices and tools. As shown in FIG. 51A, each of the pumping units 900 are mounted on a trailer 915 for transport and positioning at the jobsite. Each pumping unit 900 includes an enclosure 921 that houses a direct drive unit (DDU) 923 including a gas turbine engine 925 operatively connected to a gearbox 927. The pumping unit 900 has a driveshaft 931 operatively connected to the gearbox 927. The pumping unit 900 includes a high-pressure, high-power, reciprocating positive displacement pump 933 that is operatively connected to the DDU 923 via the driveshaft 931. In one embodiment, the pumping unit 900 is mounted on the trailer 915 adjacent the DDU 923. The trailer 915 includes other associated components such as a turbine exhaust duct 935 operatively connected to the gas turbine engine 925, air intake duct 937 operatively connected to the gas turbine, and other associated equipment hoses, connections, etc. to facilitate operation of the fluid pumping unit 900.

In the illustrated embodiment, the gas turbine engine 925 is a Vericor Model TF50F bi-fuel turbine; however, the direct drive unit 923 may include other gas turbines or suitable drive units, systems, and/or mechanisms suitable for use as a hydraulic fracturing pump drive without departing from the disclosure. The gas turbine engine 925 is cantilever mounted to the gearbox 927 with the gearbox supported by the floor 941 of the enclosure 921. The gearbox 927 may be a reduction helical gearbox that has a constant running power rating of 5500 SHP and intermittent power output of 5850 SHP, or other suitable gearbox. It should also be noted that, while embodiments of the disclosure include systems and mechanisms for use with direct drive units 923 to operate fracturing pumping units 933, the disclosed systems and mechanisms may also be directed to other equipment within the well stimulation industry such as, for example, blenders, cementing units, power generators and related equipment, without departing from the scope of the disclosure.

Figure 52:
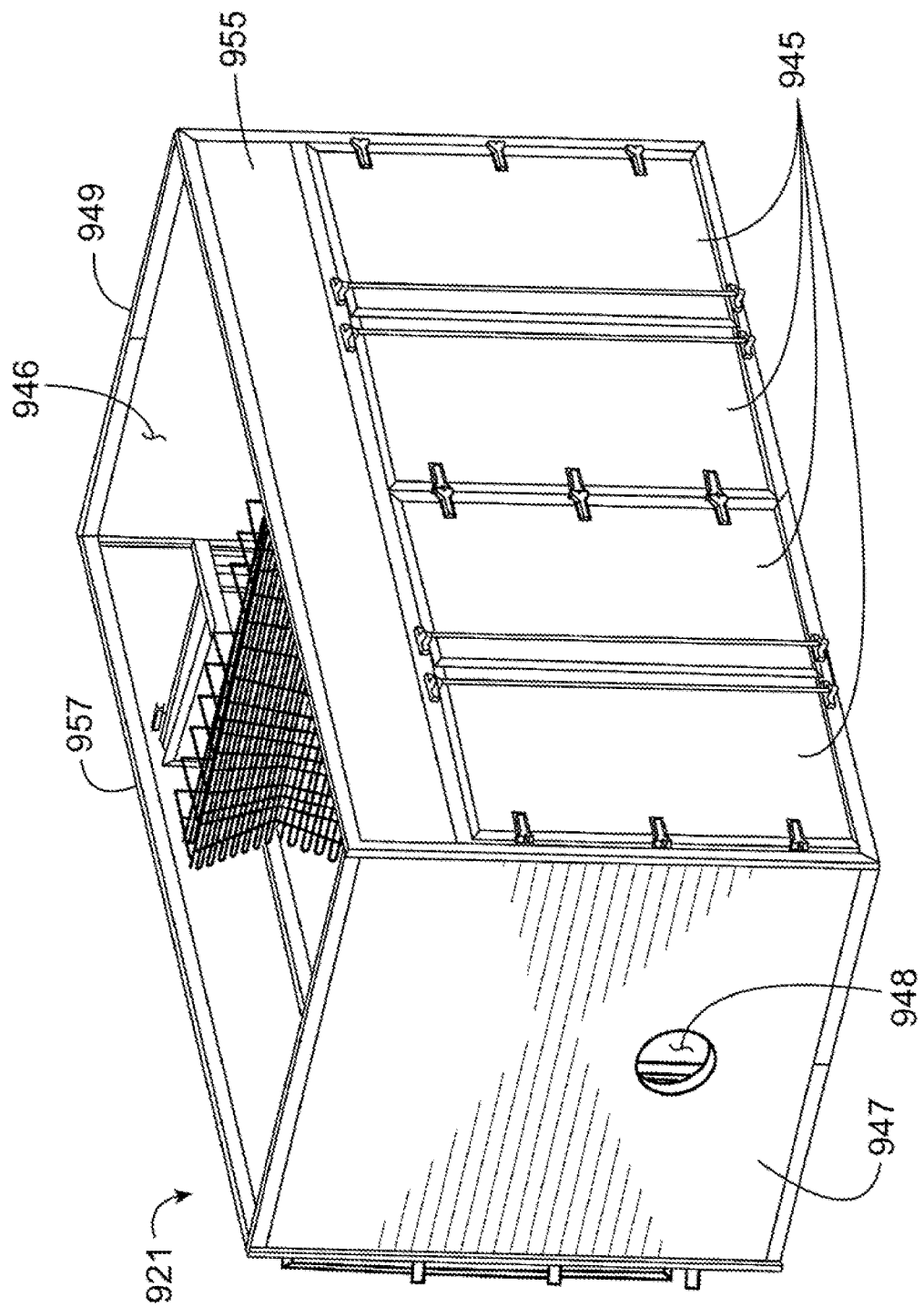
FIG. 52 is a perspective view of an enclosure for housing a direct drive unit (DDU) according to some embodiments of this disclosure.

FIG. 52 illustrates the enclosure 921 that houses the direct drive unit 923 in an interior space 946 of the enclosure. In one embodiment, the enclosure has access doors 945 for removal of the DDU 923 from the enclosure and/or other components within the enclosure. The enclosure 921 provides sound attenuation of the DDU 923 during operation.

Figure 53:
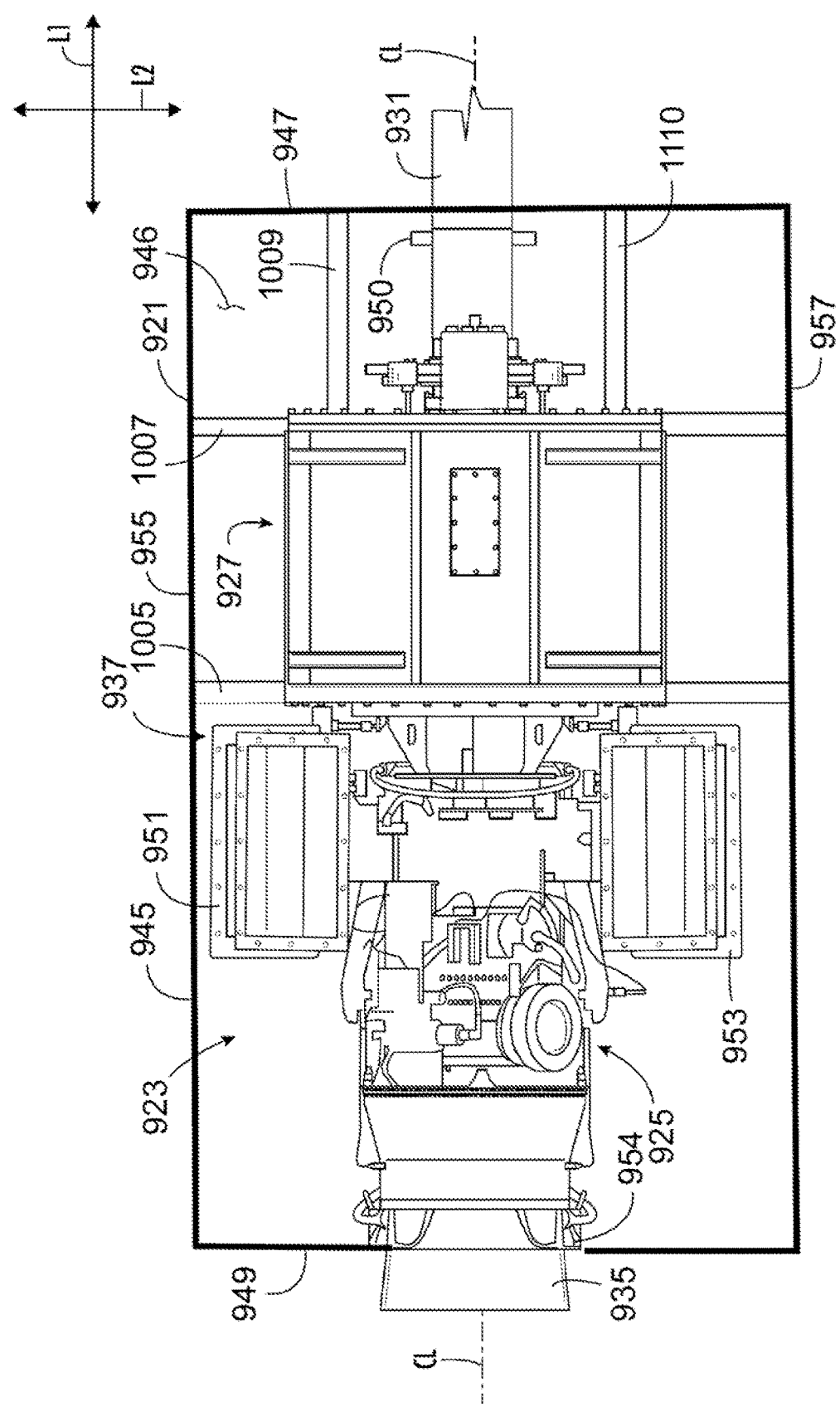
FIG. 53 is a top plan view of the enclosure housing the DDU according to some embodiments of this disclosure.

As shown in FIG. 53, the direct drive unit 923 and the enclosure 921 has a longitudinal axis L1 and a lateral axis L2 transverse to the longitudinal axis. FIG. 53 illustrates a top view of the enclosure 921 with the DDU 923 shown attached to the driveshaft 931 that extends through an opening 948 in a first longitudinal end 947 of the enclosure. An air exhaust assembly 935 extends through a second longitudinal end 949 of the enclosure. The DDU 923 has a central axis CL extending in the longitudinal direction L1 that extends through the centerline of the unit and is aligned with the centerline of the driveshaft 931. The gearbox 927 includes an outlet flange 950 that is connected to the driveshaft 931. The gas turbine engine 925 has two air inlet ports 951, 953 on a respective lateral side of the central axis CL and an exhaust duct flange 954 that connects the gas turbine engine to the air exhaust assembly 935 at the longitudinal end 949 of the enclosure 921. In one embodiment, the access doors 945 are mounted on a first lateral side 955 of the enclosure 921, but the enclosure may have additional access doors on a second lateral side 957 of the enclosure, or the access doors may be positioned only on the second lateral side without departing from the scope of this disclosure. The gas turbine engine 925 may include polymer expansion joints 961, 963 connected to air inlet ports 951, 953, to facilitate the removal of the gas turbine engine from the enclosure 921. The gas turbine engine 925 may include various fuel lines, communication lines, hydraulic and pneumatic connections, and other connections or accessories needed for operation of the gas turbine engine without departing from the disclosure. Such connections may utilize quick disconnect fittings and check valves to facilitate disconnection of the gas turbine engine 925 during removal of the DDU 923 from the enclosure 921. Further, such connections such as fuel lines and hydraulic lines may run to a single bulkhead (not shown) within or near the enclosure to allow for quick disconnection by locating these connections in a common location.

Figure 54:
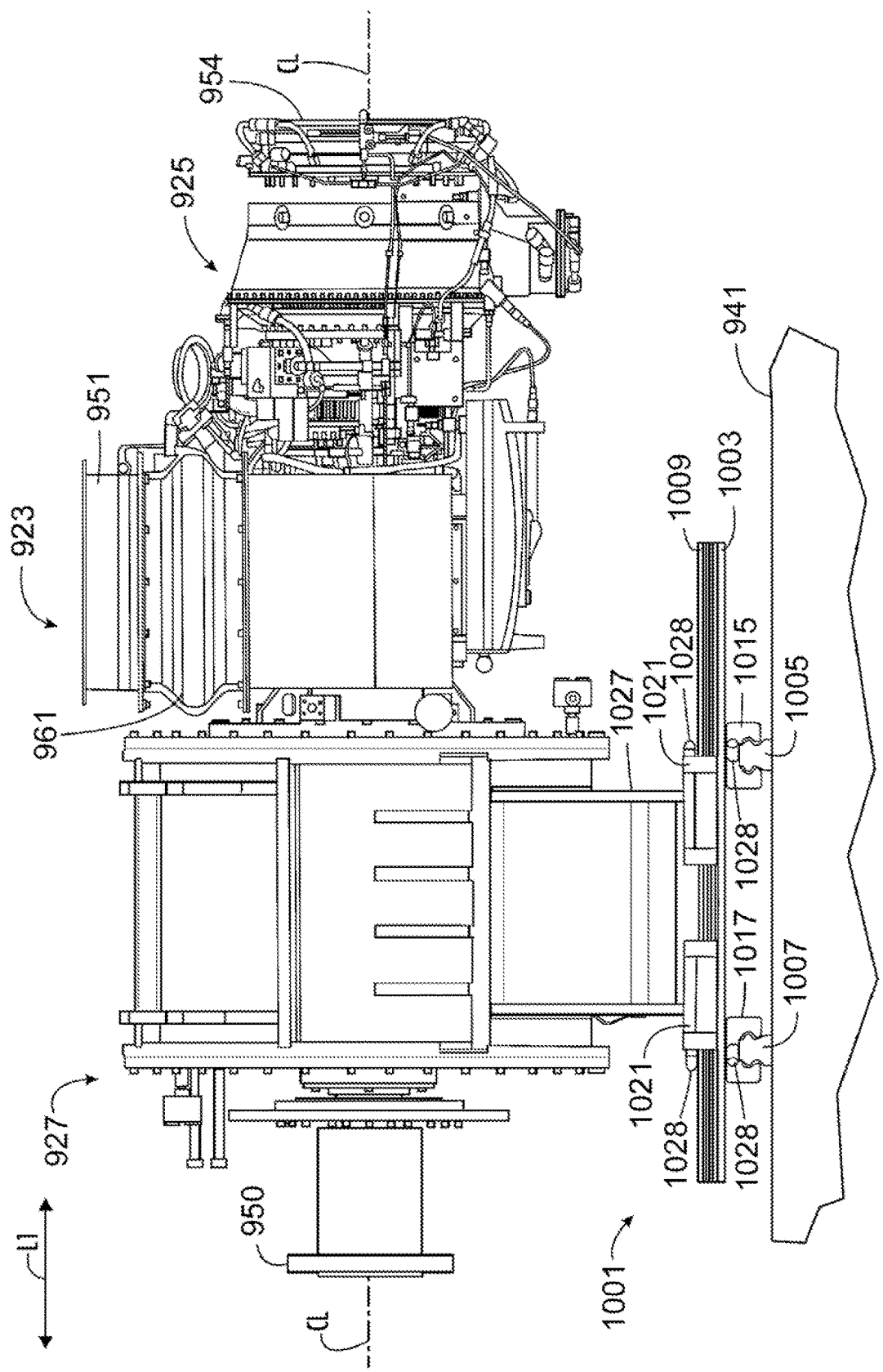
FIG. 54 is a side elevation view of the DDU mounted on a DDU positioner assembly according to some embodiments of this disclosure.

FIG. 54 is a side elevation view of the DDU 923 as viewed from the lateral side 955 of the enclosure 921, with the DDU being mounted on a DDU positioner assembly or DDU positioning system 1001 (FIGS. 54-56C) for positioning the DDU for withdrawal or removal from the enclosure through the access doors 945. In one embodiment, the DDU positioner assembly 1001 comprises a platform 1003 slidably mounted to overlie two lateral rails 1005, 1007 mounted to overlie the floor 941 of the enclosure 921 and extending laterally across the enclosure generally between the lateral sides 955, 957. The DDU positioner assembly 1001 comprises two longitudinal rails 1009, 1011 mounted to overlie the platform 1003 and extending in the longitudinal direction L1. The DDU 923 is slidably mounted on the longitudinal rails 1009, 1011 for positioning the DDU in the longitudinal direction L1. In one embodiment, the DDU positioner assembly 1001 includes lateral guide rollers 1015, 1017 mounted on a respective lateral rail 1005, 1007, and longitudinal guide rollers 1021, 1023 mounted on a respective longitudinal rail 1009, 1011. The platform 1003 is connected to the lateral guide rollers 1015, 1017 to allow slidable movement and positioning of the DDU 923 mounted on the platform in the lateral direction L2 via the lateral rails 1005, 1007. The longitudinal guide rollers 1021, 1023 are connected to a mounting base 1027 of the gearbox 927 to allow slidable movement and positioning of the DDU 923 in the longitudinal direction L1 via the longitudinal rails 1009, 1011. In one embodiment, the DDU positioner assembly 1001 includes four lateral guide rollers 1015, 1017 and four longitudinal guide rollers 1021, 1023, but more or less than eight guide rollers may be provided without departing from the scope of the disclosure. Further, more or less than two longitudinal rails 1009, 1011, and more or less than two lateral rails 1005, 1007 may be provided without departing from the scope of the disclosure. In one embodiment, the guide rollers 1015, 1017, 1021, 1023 may be a caged ball type linear motion (LM) Guide, model number SPS20LR available from THK America Inc., or any similar make or model number without departing from the scope of the disclosure. The DDU positioner assembly 1001 may be equipped with locking mechanisms 1028 mounted on a respective guide roller 1015, 1017, 1021, 1023. The locking mechanisms 1028 may be spring loaded and will default to the locked position to allow the DDU 923 to be secured in the operating position. The locking mechanism 1028 may be otherwise located on the positioning system 1001 without departing from the disclosure.

Exemplary loading calculations for sizing the guide rails 1005, 1007, 1009, 1011 are shown below and are based on the Vericor TF50F turbine parameters as follows: approximate turbine weight, 1475 lbs.; approximate fuel system weight, 85 lbs.; approximate gearbox weight, 4000 lbs.; for a total approximate weight of 5559 lbs. Various other parameters may be applicable based on the make, model, and size of the gas turbine engine 925.

Because of the arrangement the direct drive unit 923 including the gas turbine engine 925 cantilever mounted onto the gearbox 927 and extending in the longitudinal direction L1 from the gearbox, there is added load put onto the rear lateral guide rollers 1015 and the rear longitudinal guide rollers 1021, 1023 (the guide rollers mounted closest to the gas turbine engine). Accordingly, an increased load rating may be applied to the rear guide rollers 1015, 1021, 1023 if required. The calculation of the cantilever load and the reaction forces may be calculated with the formulas shown below, which may also be used for further design and implementation of the disclosed removal mechanisms.

Maximum Reaction at the fixed end may be expressed as: $R_A = qL$, where: $R_A$=reaction force in A (N, lb), q=uniform distributed load (N/m, N/mm, lb/in), and L=length of cantilever beam (m, mm, in).

Maximum Moment at the fixed end may be expressed as $M_A = -qL^2/2$

Maximum Deflection at the end may be expressed as $\delta_B = q L^4/(8 \, EI)$.

where: $\delta_B$=maximum deflection in B (m, mm, in).

In one embodiment, the longitudinal guide rollers 1021, 1023 connected to the support structure 1027 of the gearbox 927 are positioned between each pair of the lateral guide rollers 1015, 1017 to ensure equal weight distribution over the platform 1003 and to avoid cantilever loading the platform. Different configurations of platforms, sliders, rails and mounts are contemplated and considered within the scope of the disclosure. The configurations of the DDU positioner assembly 1001 may vary to suit a particular DDU 923 with various alternative combinations of makes, model, and sizes of the gas turbine engine 925 and the gearbox 927.

In one embodiment, the guide rails 1005, 1007, 1009, 1011 are made from a steel composition that has been mill finished and shot blasted to protect the rail from the high heat environment within the turbine enclosure 921 and ensure strength retention under the exposed temperatures. In one embodiment, the platform 1003 is constructed out of a composite material; however, other materials are contemplated and considered within the scope of the disclosure, such as but not limited to, steel or stainless steel. The guide rails 1005, 1007, 1009, 1011, platform 1003, and/or other components of the DDU positioner assembly 1001 may be made of various other suitable materials without departing from the scope of the disclosure.

Figure 56A:
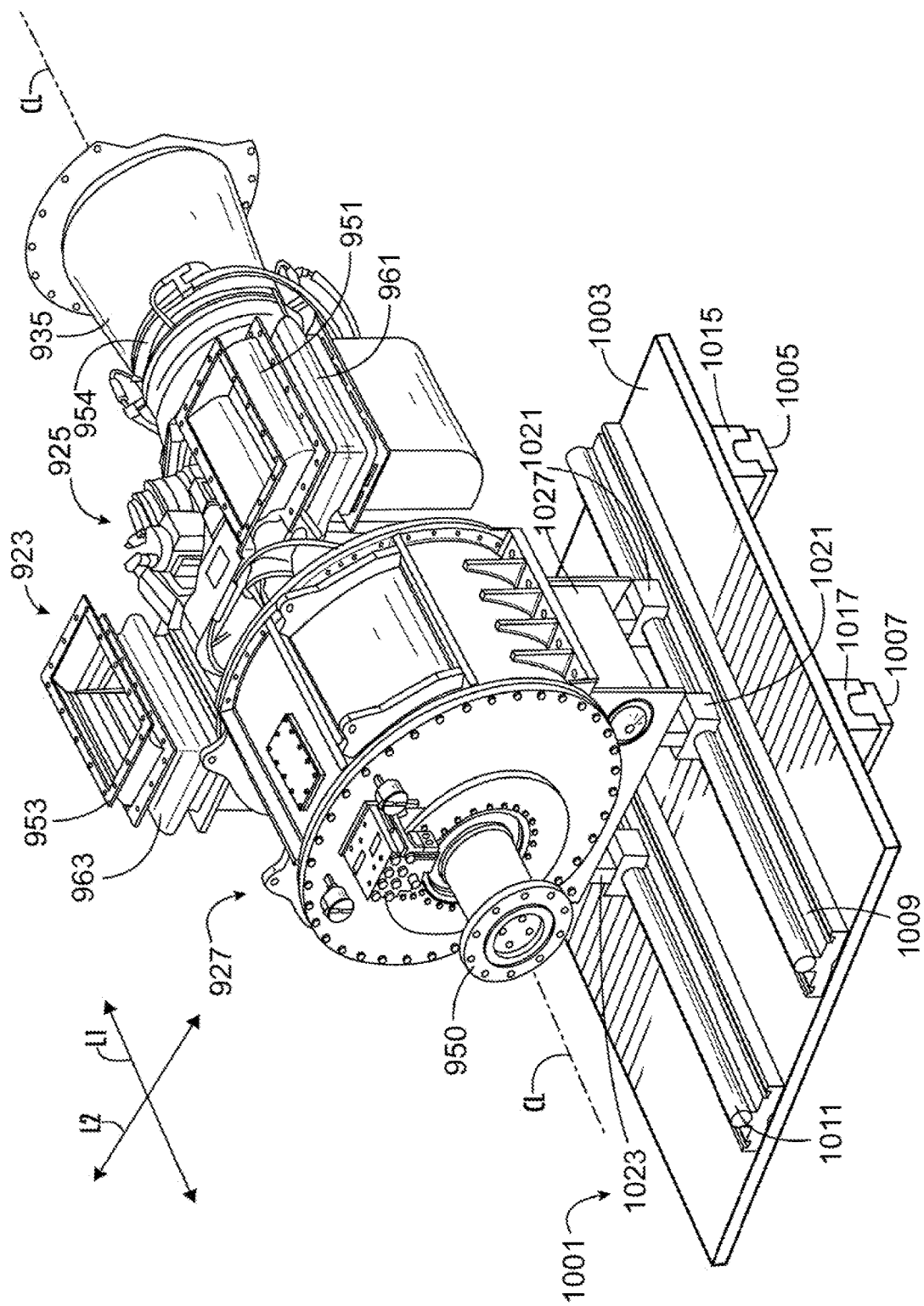
FIG. 56A is a perspective view of the DDU of FIG. 54 in a first position according to some embodiments of this disclosure.
Figure 56B:
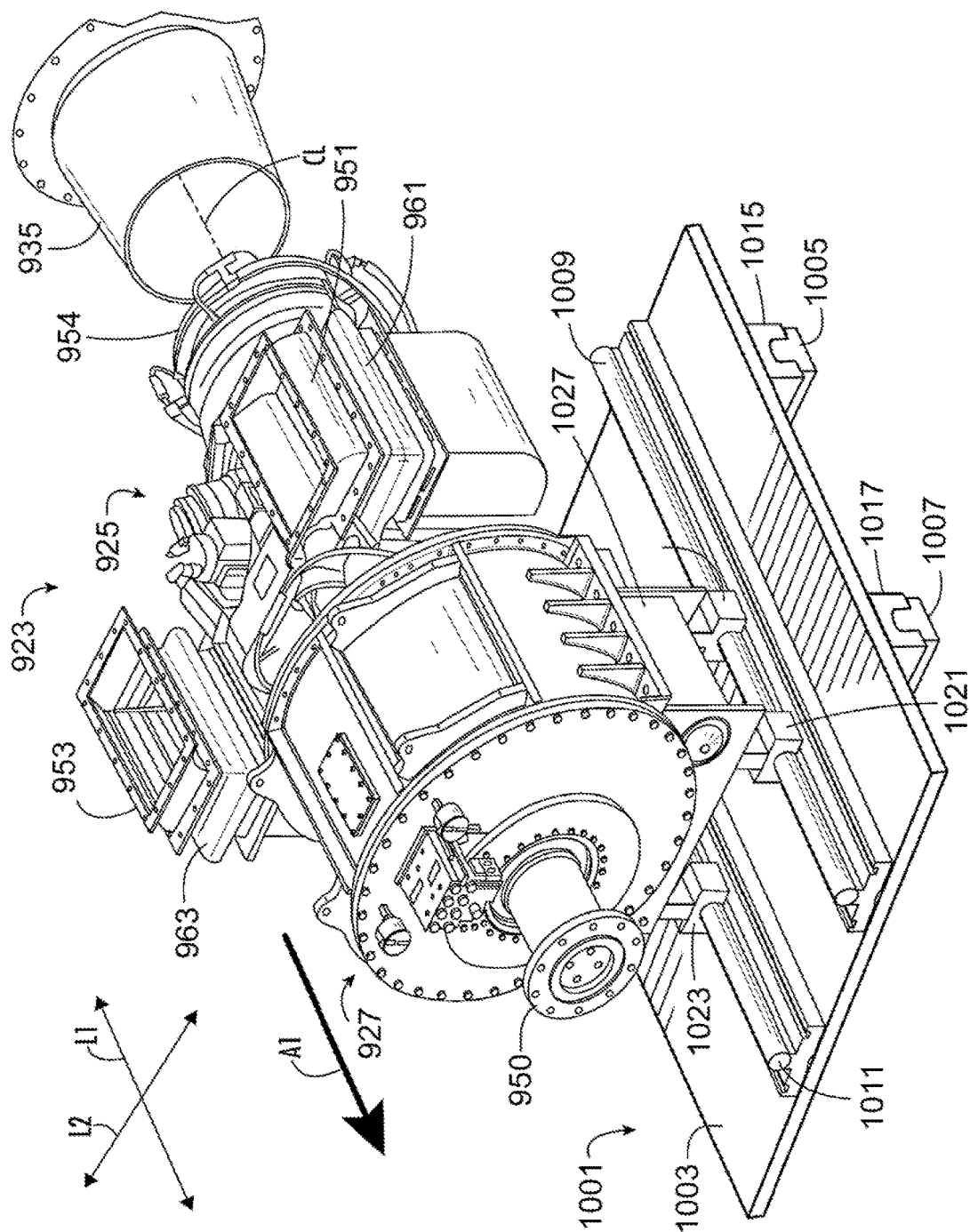
FIG. 56B is a perspective view of the DDU of FIG. 56A moved to a second position according to some embodiments of this disclosure.
Figure 56C:
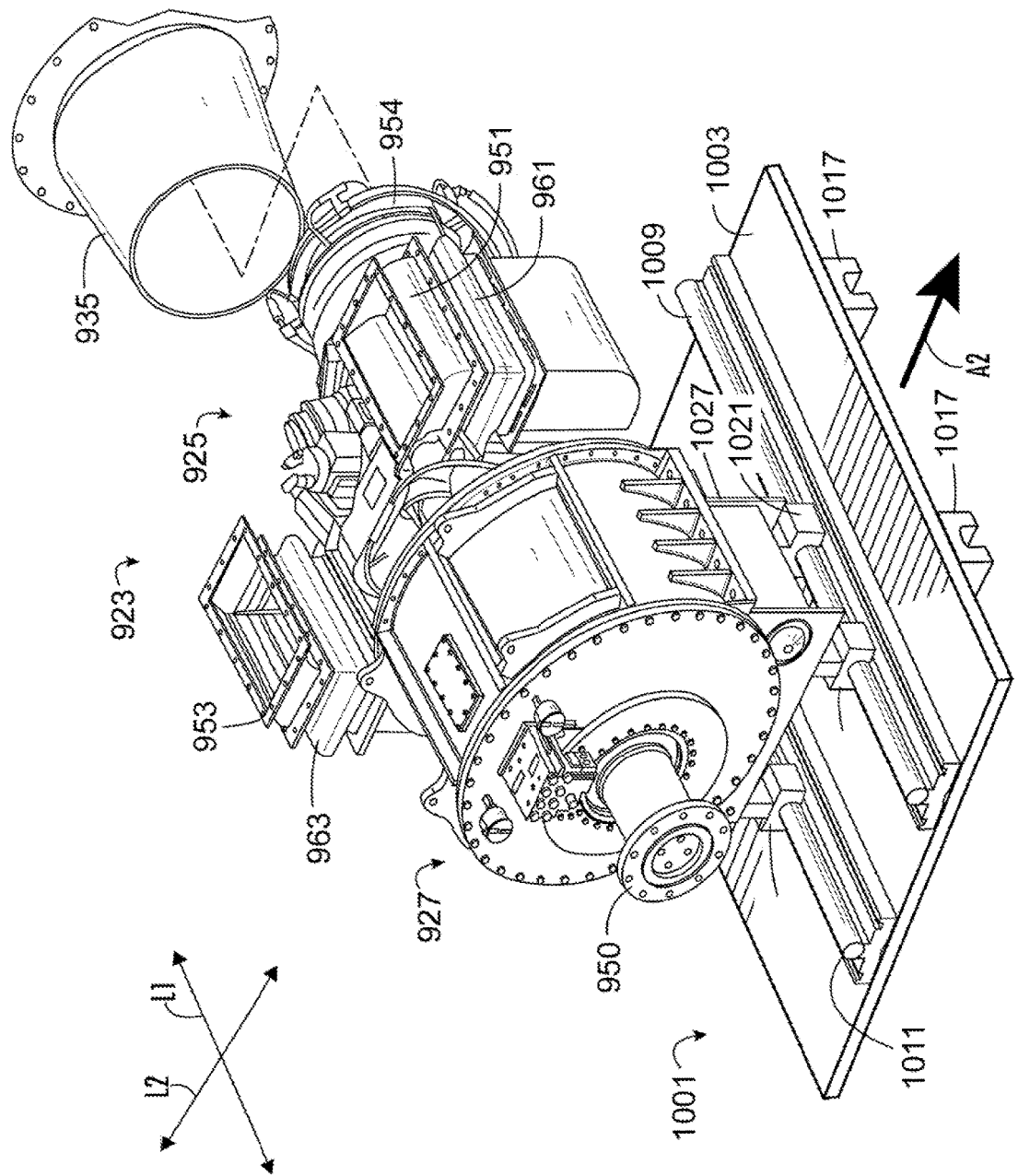
FIG. 56C is a perspective view of the DDU of FIG. 56B moved to a third position according to some embodiments of this disclosure.

FIGS. 56A-56B illustrate an exemplary method of removing the direct drive unit 923 from the enclosure 921 utilizing the DDU positioner assembly 1001. FIG. 56A shows the DDU 923 in a first/operating position for operation with the pump 933 of the pumping unit 900. The method includes accessing the enclosure 921 and disconnecting the gas turbine engine 925 from the air inlet ducting 937. The flanges of the air inlet ports 951, 953 may be disconnected from the air inlet ducting 937 and the expansion joints 961, 963 flexed to allow separation of the DDU 923 from the air inlet ducting. The gas turbine engine 925 may be disconnected from the air exhaust ducting 935 by disconnecting the exhaust duct flange 954 from the air exhaust ducting. Corresponding hoses, piping, wiring, and cabling including fuel lines, electrical lines, hydraulic lines, control lines or any other connection that is needed for operation of the gas turbine engine 925 may also be disconnected so that the gas turbine engine is free to move without damaging any of the operational connections needed for operation of the gas turbine engine. For example, the air bleed off valve ducting may be removed from the turbine engine 925 and secured at a location free of interference with movement of the turbine engine. Alternatively, some hoses, piping, wiring, etc. may include enough slack or flexibility so that the DDU 923 may be initially moved before complete disconnection of the connections from the gas turbine engine 925 are required for removal of the DDU from the enclosure 921. The gearbox 927 may be disconnected from the driveshaft 931 by disconnecting the outlet flange 950 from the driveshaft. In one embodiment, the driveshaft 931 may be a slip-fit driveshaft allowing the driveshaft to contract to facilitate disconnection from the DDU 923. In one embodiment, the driveshaft 931 may be a 390 Series, GWB Model 390.80 driveshaft available Dana Corporation, or other suitable driveshaft. The gearbox 927 may be disconnected from any other connections needed for operation of the DDU 923 to obtain freedom of movement of the gearbox without damaging any of the operating connections.

Figure 55:
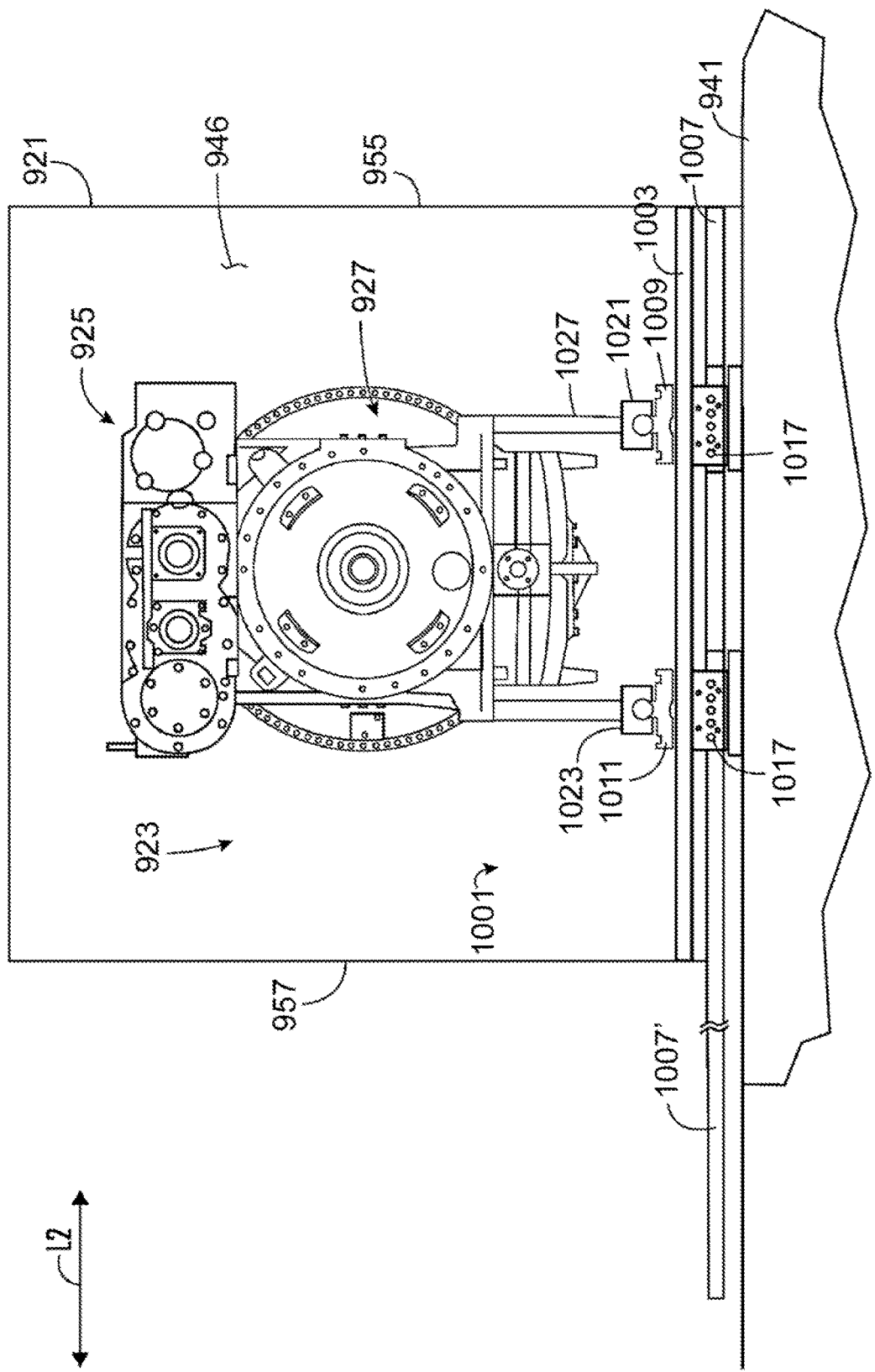
FIG. 55 is an end elevation view of the DDU of FIG. 54 according to some embodiments of this disclosure.

Once the gas turbine engine 925 is disconnected from the respective connections and the gearbox 927 is disconnected from the driveshaft 931, the DDU positioner assembly 1001 is operated to position the direct drive unit 923 for withdrawal from the enclosure 921. As shown in FIG. 56B, the DDU 923 is positioned in a second position where the DDU is first moved in the longitudinal direction L1 in the direction of arrow A1 by sliding the DDU along the longitudinal rails 1009, 1011. In one embodiment, prior to initial movement of the DDU 923 in the longitudinal direction L1, the longitudinal locks 1028 associated with the longitudinal guide rollers 1021, 1023 must be released to allow the movement of the DDU in the longitudinal direction. After the movement of the DDU 923 in the longitudinal direction L1 to the second position, the longitudinal locks 1028 may be reengaged to lock the longitudinal guide rollers 1021, 1023 and prevent further or additional unwanted movement of the DDU 923 along the longitudinal rails 1009, 1011, and the lateral locks 1028 associated with the lateral guide rollers 1015, 1017 may be disengaged to allow lateral movement of the DDU 923. Next, the platform 1003 may be moved to a third position by moving in the lateral direction L2 in the direction of arrow A2 (FIG. 56C) by sliding movement of the lateral guide rollers 1015, 1017 along the lateral guide rails 1005, 1007. The DDU 923 is mounted to the platform 1003 and moves with the platform in the lateral direction L2 to the third position of FIG. 56C. As shown in FIGS. 53 and 55, the lateral guide rails 1005, 1007 may extend to the access doors 945 in either side 955, 957 of the enclosure 921. In some embodiments, lateral guide rail extensions 1007' (FIG. 55) may be used to extend outside of the enclosure 921 to allow the platform 1003 and DDU 923 to be slid out of the enclosure onto an adjacent supporting structure or vehicle (e.g., maintenance inspection platform or other suitable structure), or the platform 1003 and DDU 923 may be accessed through the access doors 945 of the enclosure 921 by a lifting mechanism (e.g., a forklift, crane, or other suitable lifting mechanism) to fully remove the DDU from the enclosure. The various method steps described herein for the method of positioning or removing the DDU 923 may be otherwise performed in an alternative order or simultaneously, or more or less steps may be used without departing from the scope of the disclosure.

FIGS. 57-60 illustrates a second embodiment of a DDU positioner assembly or system 2001 for positioning the direct drive unit 923 housed in the enclosure 921. In the illustrated embodiment, the DDU 923 includes a gas turbine engine 925 and a gearbox 927 identical to the first embodiment of the disclosure, but the DDU positioner assembly 2001 may be used to position a DDU that is alternatively configured without departing from the disclosure. As such, like or similar reference numbers will be used to describe identical or similar features between the two embodiments.

Figure 57:
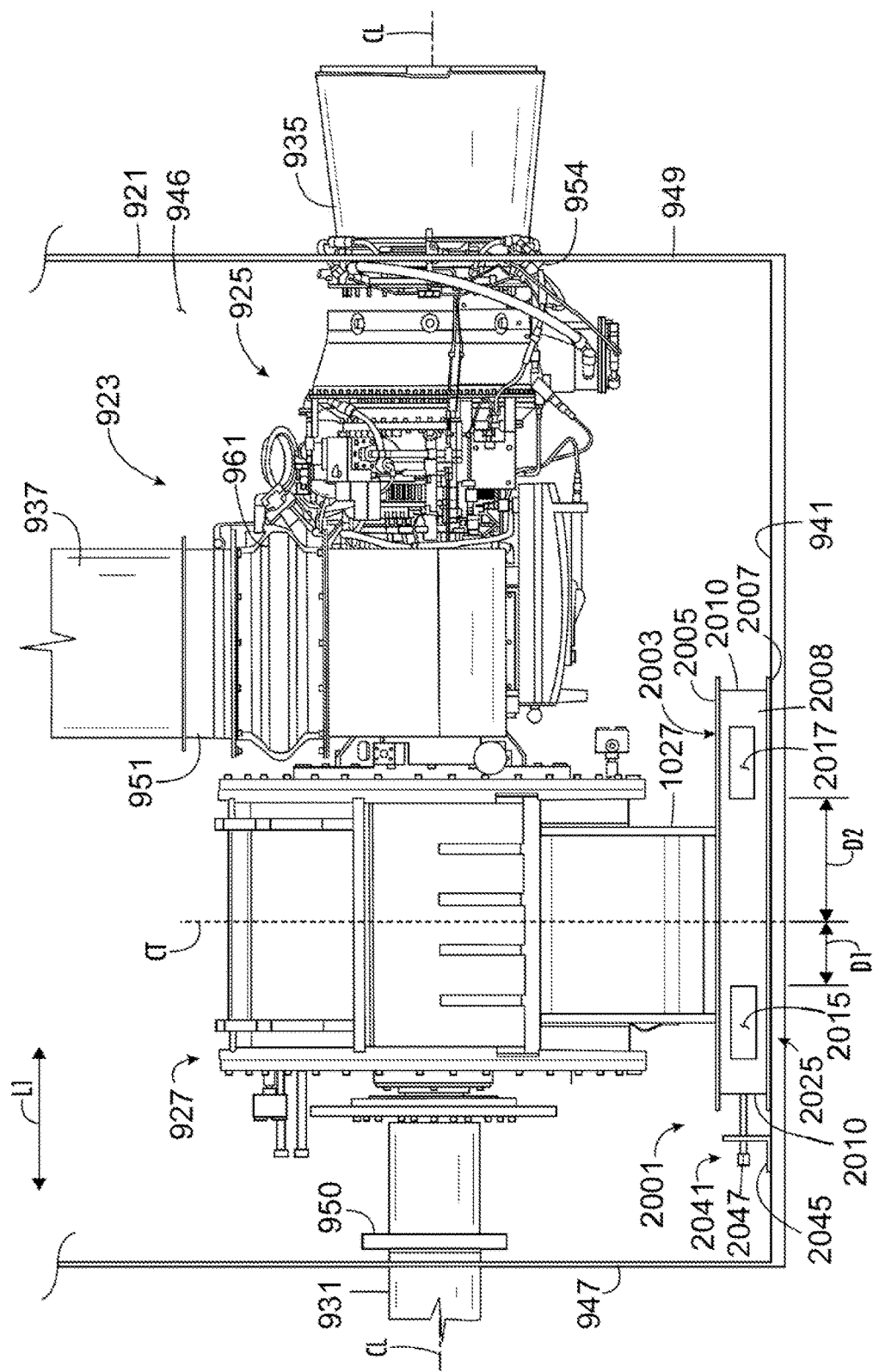
FIG. 57 is a side elevation view of the DDU mounted on a DDU positioner assembly according to some embodiments of this disclosure.

In one embodiment, the DDU positioner assembly 2001 includes a platform 2003 that supports the gearbox 927 and has a top surface 2005, a bottom surface 2007, two sides 2008, and two ends 2010. The gearbox 927 is fixedly mounted to the top surface 2005 of the platform 2003. The platform 2003 is slidably mounted on the base 941 of the enclosure 921 with the bottom surface 2007 of the platform being in slidable engagement with the floor of the enclosure. In a first or operating position (FIGS. 57 and 58A) of the direct drive unit 923, the platform 2003 is fixedly attached to the base 941 by a plurality of fasteners 2011. Upon removal of the fasteners 2011, the platform 2003 is capable of slidable movement with respect to the base 941. The platform 2003 is connected to the support structure 1027 of the gearbox 927 so that the drive unit 923 moves with the platform. In one embodiment, the platform 2003 has two lifting openings 2015, 2017 extending between respective sides 2008 of the platform. As shown in FIG. 57, the lifting opening 2015 towards the front of the gearbox 927 (closest to the drive shaft flange 950) is spaced a first distance D1 from a centerline CT of the gearbox and the lifting opening 2017 towards the rear of the gearbox (closest to the gas turbine engine 925) is spaced a second distance from the centerline CT of the gearbox, with the distance D2 being greater than the distance D2. The rear lifting opening 2017 is farther from the centerline CT of the gearbox 927 because of the cantilever mounted gas turbine engine 925 that shifts the center of gravity of the DDU 923 from the centerline CT of the gearbox in the longitudinal direction toward the gas turbine engine. The platform 2003 may be otherwise configured and/or arranged without departing from the scope of the disclosure.

In one embodiment, the DDU positioner assembly 2001 includes a lubricator or lubrication system 2021 (FIG. 59) to convey lubricant (e.g., grease or other suitable lubricant) from a lubricant reservoir 2044 to a location between the bottom surface 2007 of the platform 2003 and the base 941 of the enclosure. The DDU positioner assembly 2001 includes a lubrication portion 2025 (FIG. 10) of the base 941 below the platform 2003. As shown in FIG. 60, the portion 2025 of the base 941 includes a plurality of lubrication grooves 2027. The lubrication grooves 2027 are in fluid communication with the lubricator 2021 so that the lubricator provides lubricant to the grooves to facilitate sliding engagement between the platform 2003 and the portion 2025 of the base 941. The lubricator 2021 includes a source of lubricant 2044, tubing 2043, and other required components (e.g., pump, controls, etc.) for delivering the lubricant to the lubrication portion 2025 at a sufficiently high pressure for lubricant to fill the grooves 2027 of the lubrication portion 2025. In one embodiment, the lubricator 2021 may be an automatic lubricator such as a model TLMP lubricator available from SKF Corporation, or the lubricator may be any other suitable lubricator including other automatic lubricators or manual lubricators without departing from the scope of the disclosure. In one embodiment, the lubrication portion 2025 of the base 941 is an integral portion with the base or the floor of the enclosure 921, but the lubrication portion 2025 may be a separate pad or component that is mounted between the base and the platform without departing from the disclosure. The lubricator 2021 may be mounted inside the enclosure 921 or at least partially outside the enclosure without departing from the scope of the disclosure.

In one embodiment, the DDU positioner assembly 2001 includes drive fasteners 2041 mounted at one end 2010 of the platform 2003. In the illustrated embodiment, the drive fasteners 2041 include a bracket 2045 mounted to the floor 941 of the enclosure 921 and an impact screw 2047 operatively connected to the bracket and the platform 2003. The drive fasteners 2041 may have other components and be otherwise arranged without departing from the disclosure. Further, more or less than two drive fasteners 2041 may be provided without departing from the disclosure.

Figure 58A:
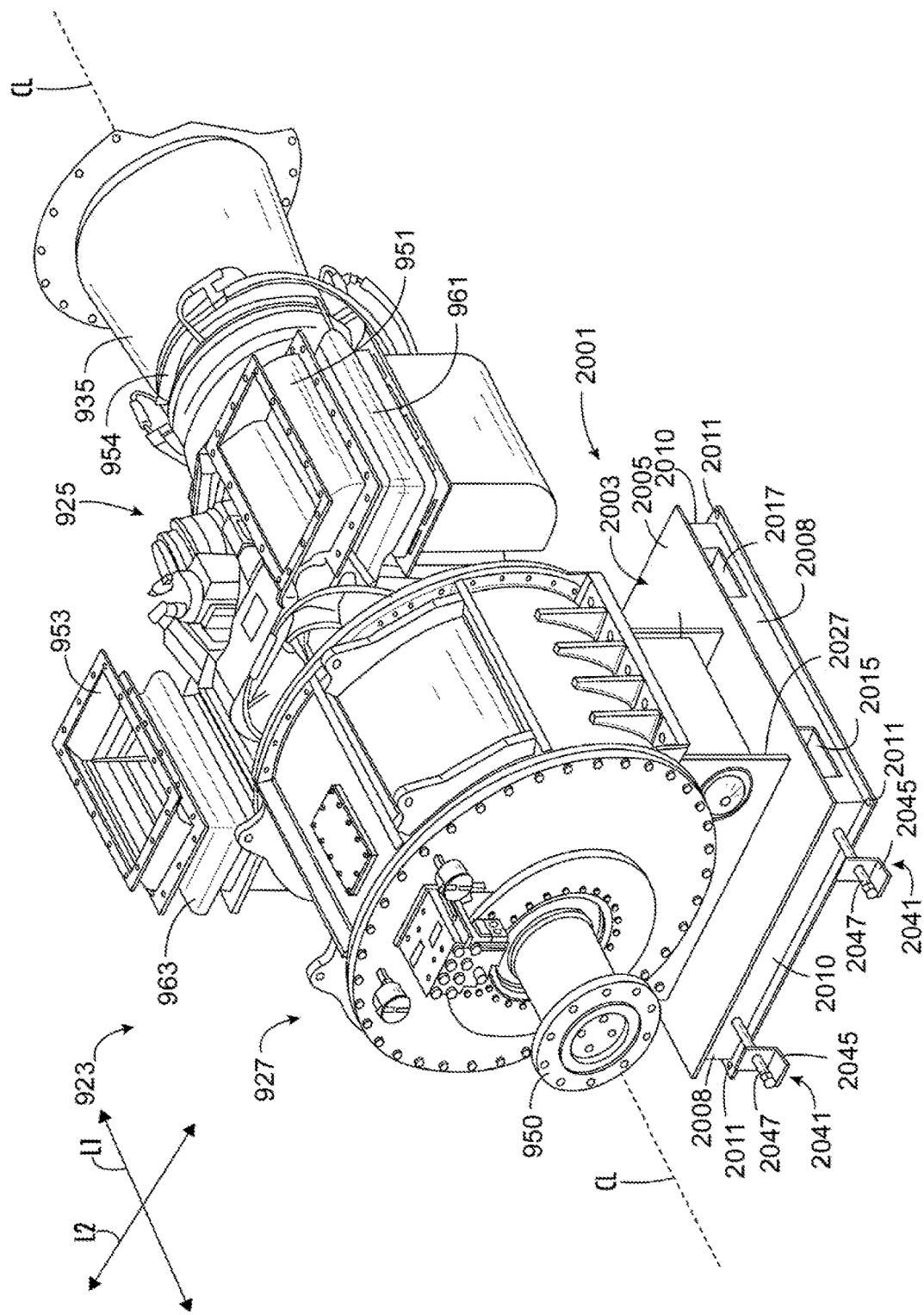
FIG. 58A is a perspective view of the DDU of FIG. 57 in a first position according to some embodiments of this disclosure.
Figure 58B:
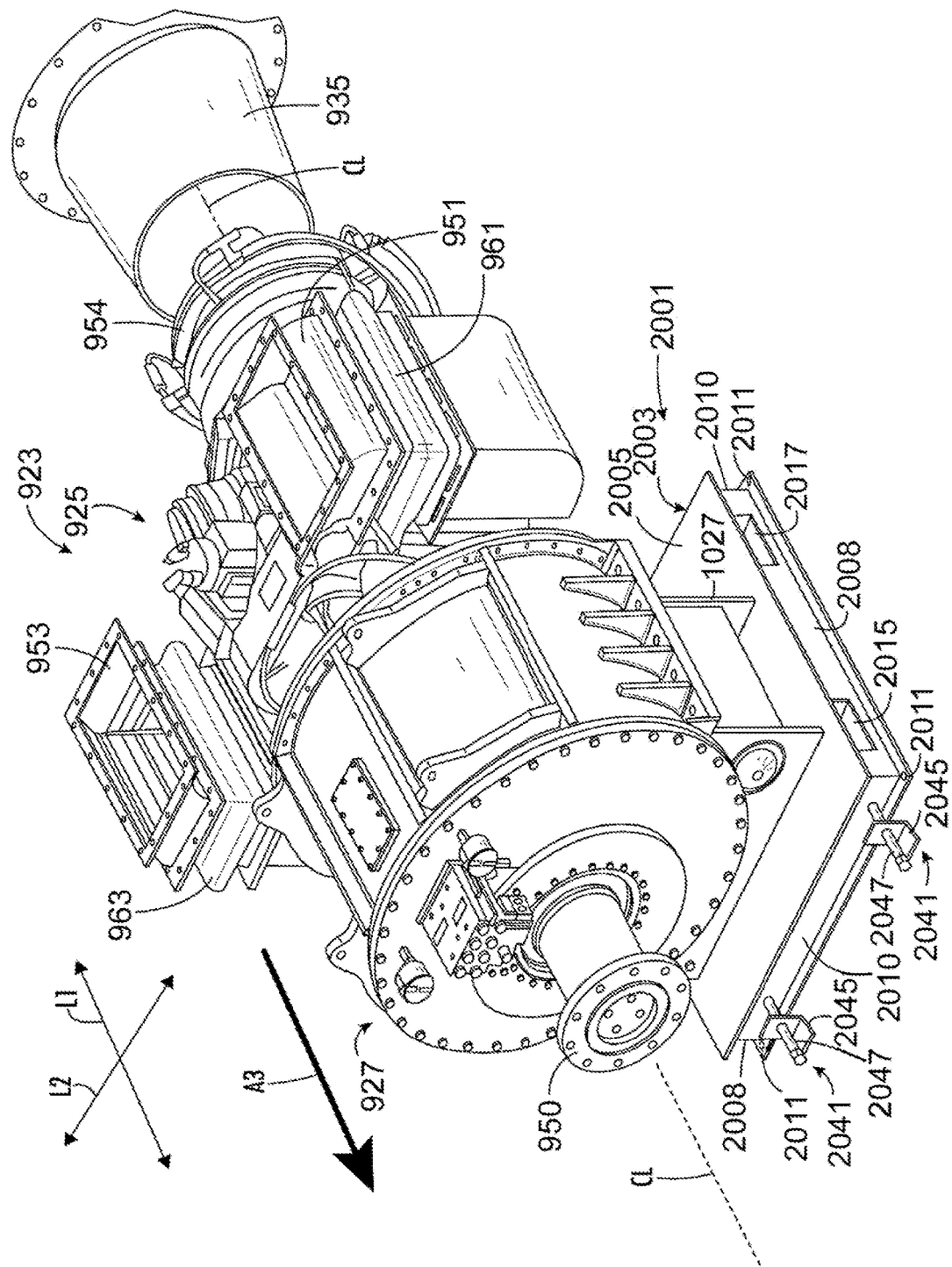
FIG. 58B is a perspective view of the DDU of FIG. 58A moved to a second position according to some embodiments of this disclosure.
Figure 58C:
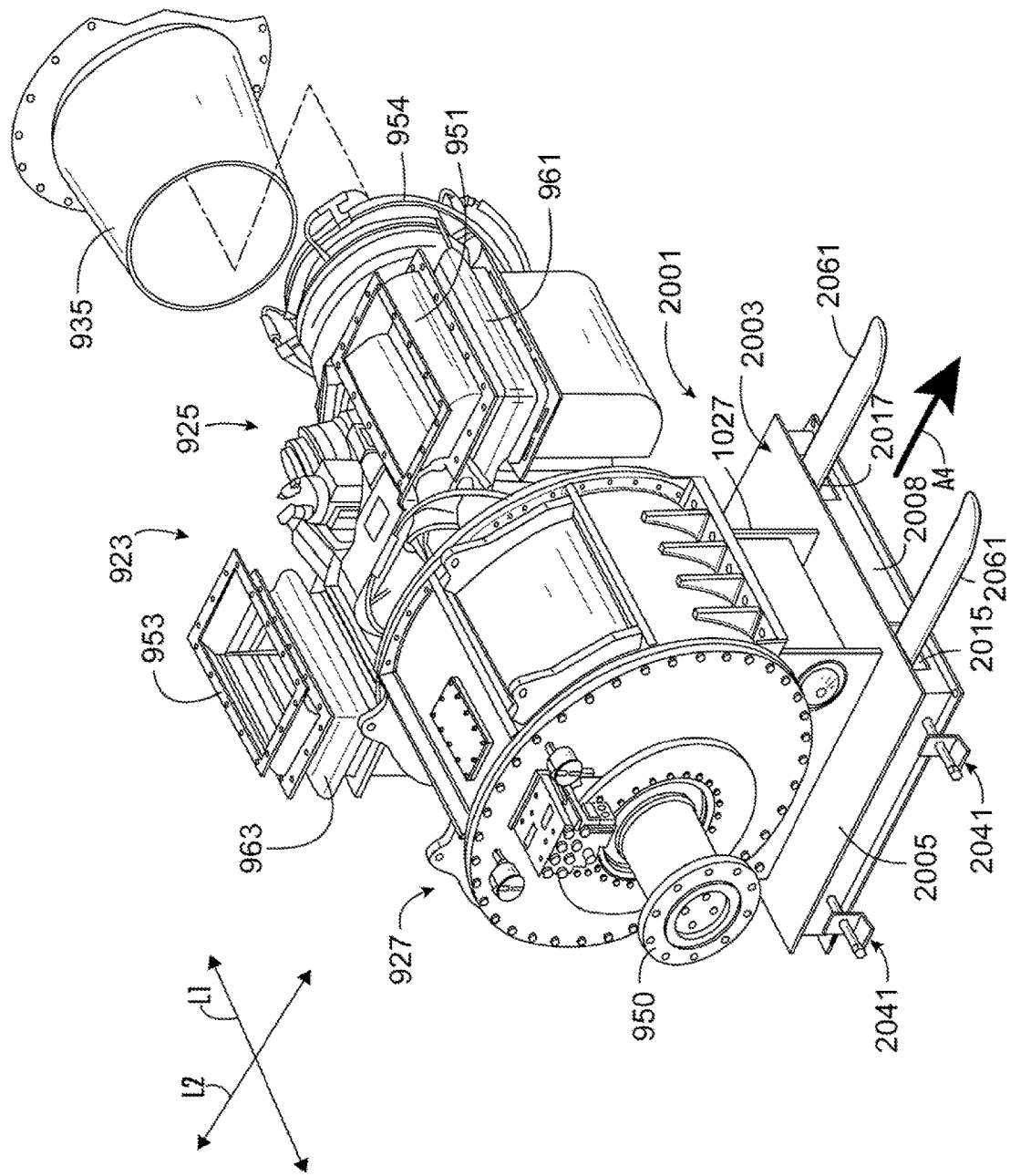
FIG. 58C is a perspective view of the DDU of FIG. 58B moved to a third position according to some embodiments of this disclosure.
Figure 59:
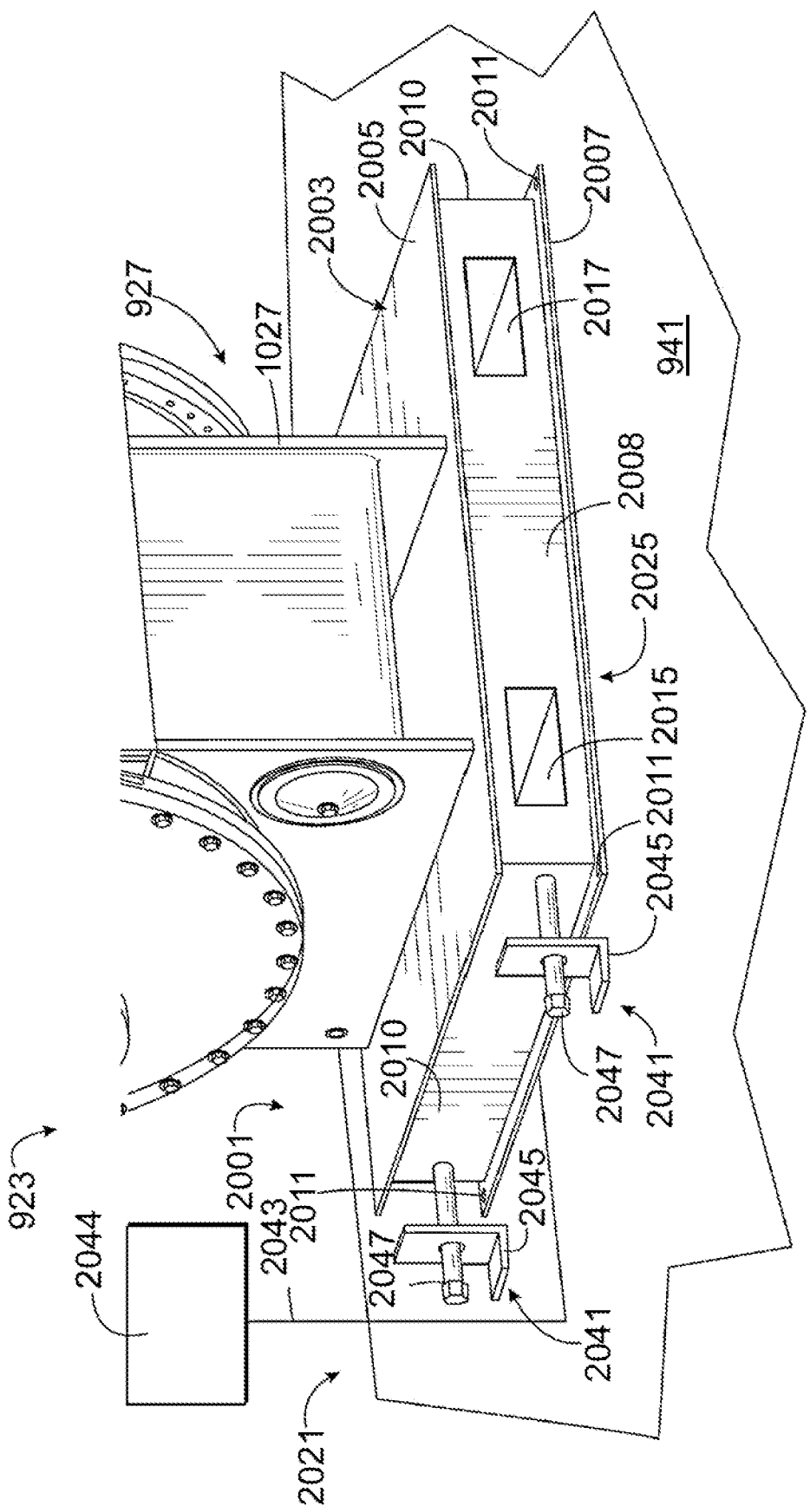
FIG. 59 is an enlarged detail of a portion of the DDU positioner assembly according to some embodiments of this disclosure.
Figure 60:
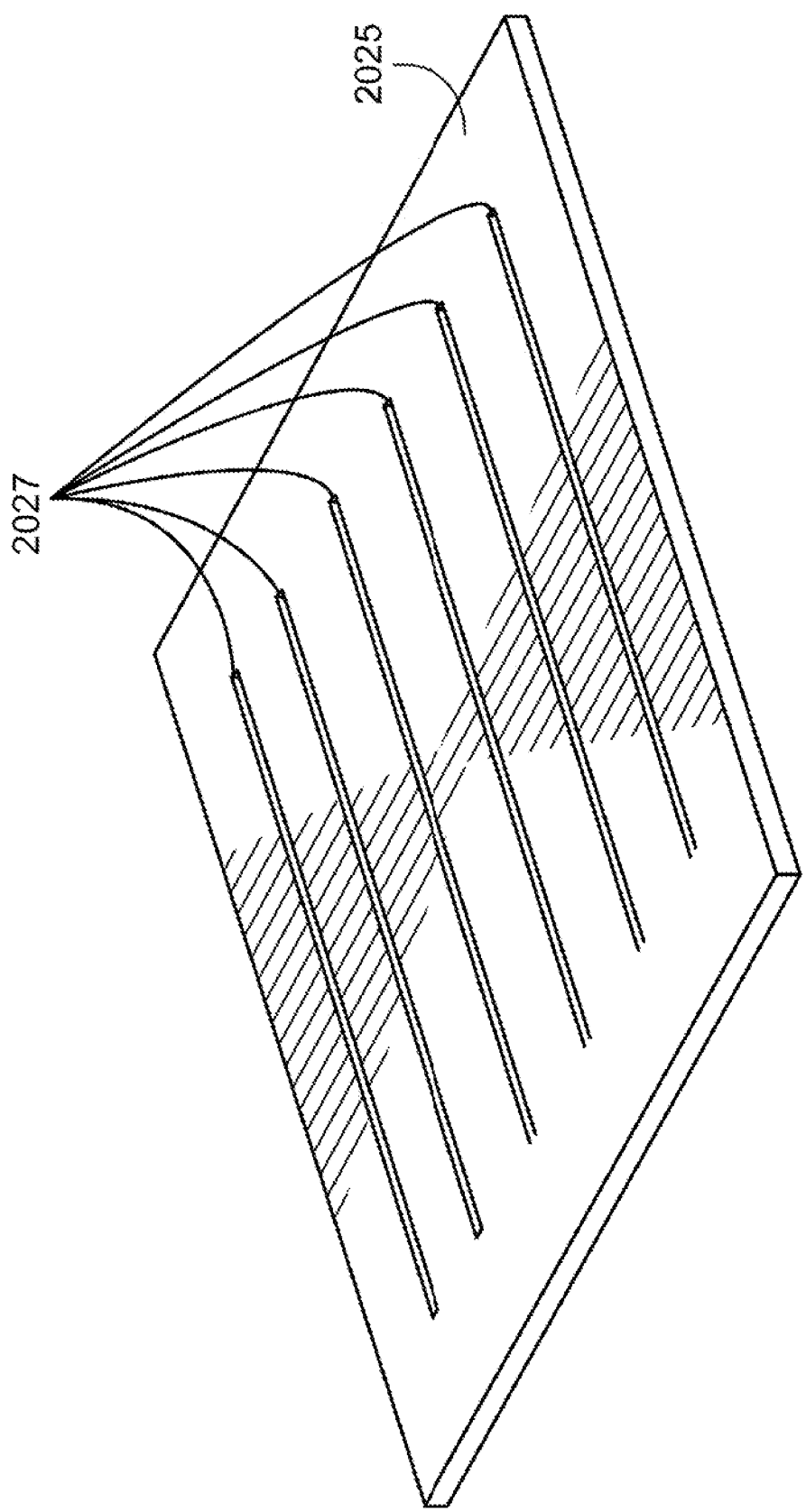
FIG. 60 is a detail of a portion of the DDU positioner assembly according to some embodiments of this disclosure.

FIGS. 58A-59 illustrate an exemplary method of removing the DDU 923 from the enclosure 921 utilizing the DDU positioner assembly 2001 of the second embodiment. The method is similar to the method of the first embodiment, in that the gas turbine engine 925 is disconnected from the air inlet ducting 937, the air exhaust ducting 935, and from other corresponding connections and components in a similar manner as discussed above for the first embodiment so that the gas turbine engine is free to move without damaging any of the operational connections and components needed for operation of the gas turbine engine. Further, the gearbox 927 is disconnected from the driveshaft 931 in a similar manner as the first embodiment, so that the DDU 923 has clearance for movement in the longitudinal direction L1 without interference with the driveshaft.

FIG. 58A shows the direct drive unit 923 in the first/operating position. Once the gas turbine engine 925 is disconnected from the respective components and connections and the gearbox 927 is disconnected from the driveshaft 931 and any other connections, the DDU positioner assembly 2001 is operated to position the DDU 923 for withdrawal from the enclosure 921. First, the fasteners 2011 fixedly attaching the platform 2003 to the base 941 are removed. The lubricator 2021 is operated to convey lubricant to the lubrication grooves 2027 of the lubrication portion 2025 of the base 941. After a sufficient amount of lubrication is located between the platform 2003 and the lubrication portion 2025 of the base 941, the drive fasteners 2041 may be operated to move the platform 2003 in the longitudinal direction L1 to a second position (FIG. 58B). As the impact screws 2047 of the drive fasteners 2041 are turned, the platform 2003 is slid in the longitudinal direction L1 in the direction of arrow A3 (FIG. 58B). The lubricant provided in the lubrication grooves 2027 and between the lubrication portion 2025 and the bottom surface 2007 of the platform reduces the sliding friction and allows the rotation of the impact screws 2047 in the bracket 2045 to advance the platform in the direction of arrow A3. The platform 2003 is moved in the direction of arrow A3 a sufficient amount to allow access to the lifting openings 2015, 2017 by a lifting mechanism (e.g., forklift) 2061 (FIG. 58C). The lifting mechanism 2061 may include a forklift or other lifting mechanism that may access the interior 946 of the enclosure through the enclosure access doors 945. The lifting mechanism 2061 is inserted into the lifting openings 2015, 2017 of the platform 2003, and the DDU 923 is lifted and/or slid in the direction of arrow A4. The lifting mechanism 2061 may move the DDU 923 to the third position (FIG. 58C), or transfer the DDU onto an adjacent supporting structure or vehicle (e.g., maintenance inspection platform or other suitable structure), or completely remove the platform 2003 and DDU 923 from the enclosure. The various method steps described herein for the method of positioning or removing the DDU 923 by operating the DDU positioner assembly 2001 may be otherwise performed in an alternative order or simultaneously, or more or less steps may be used without departing from the scope of the disclosure.

Figure 61:
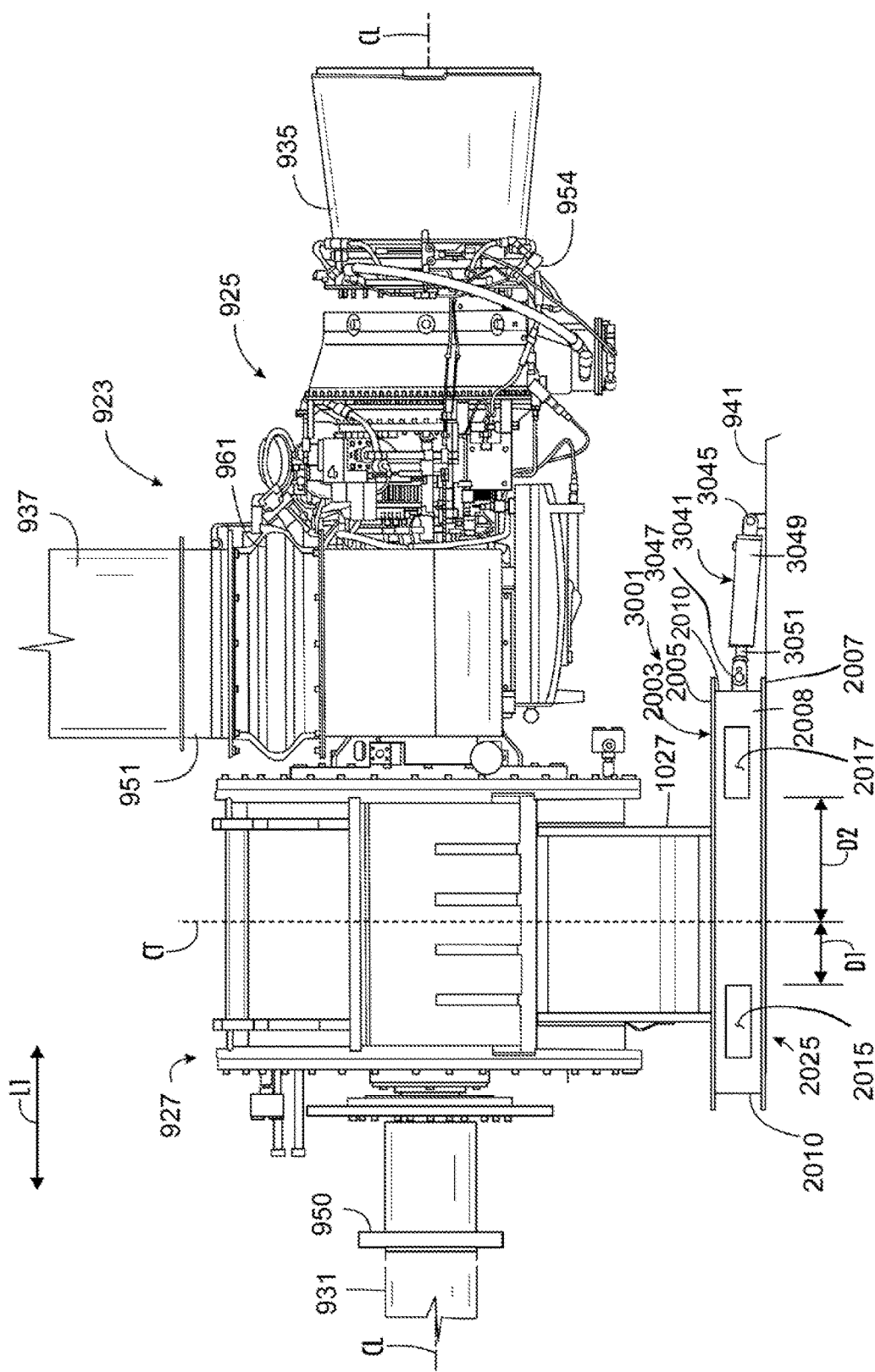
FIG. 61 is a side elevation view of the DDU mounted on a DDU positioner assembly according to some embodiments of this disclosure.
Figure 62A:
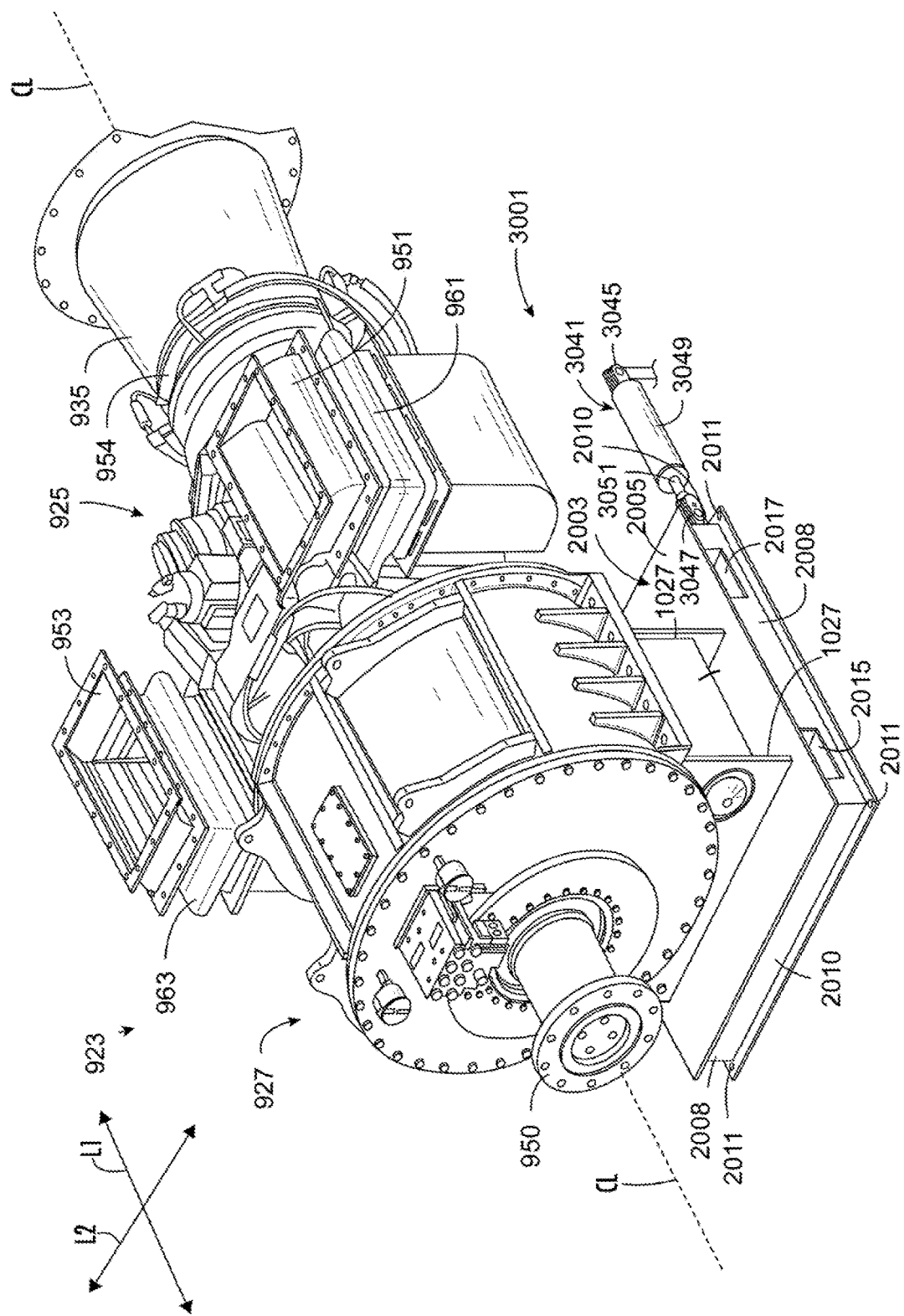
FIG. 62A is a perspective view of the DDU of FIG. 61 in a first position according to some embodiments of this disclosure.
Figure 62B:
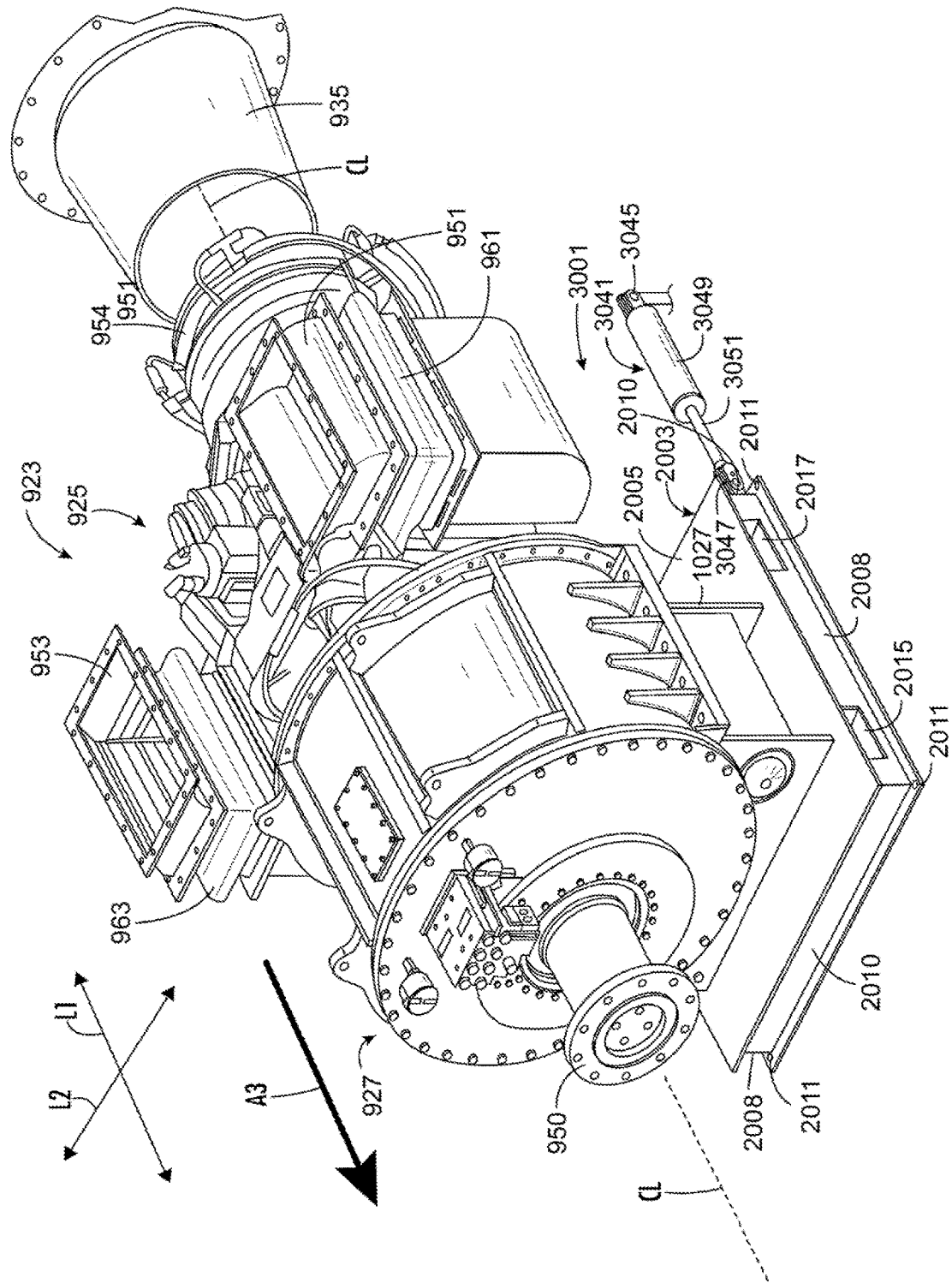
FIG. 62B is a perspective view of the DDU of FIG. 62A moved to a second position according to some embodiments of this disclosure.
Figure 62C:
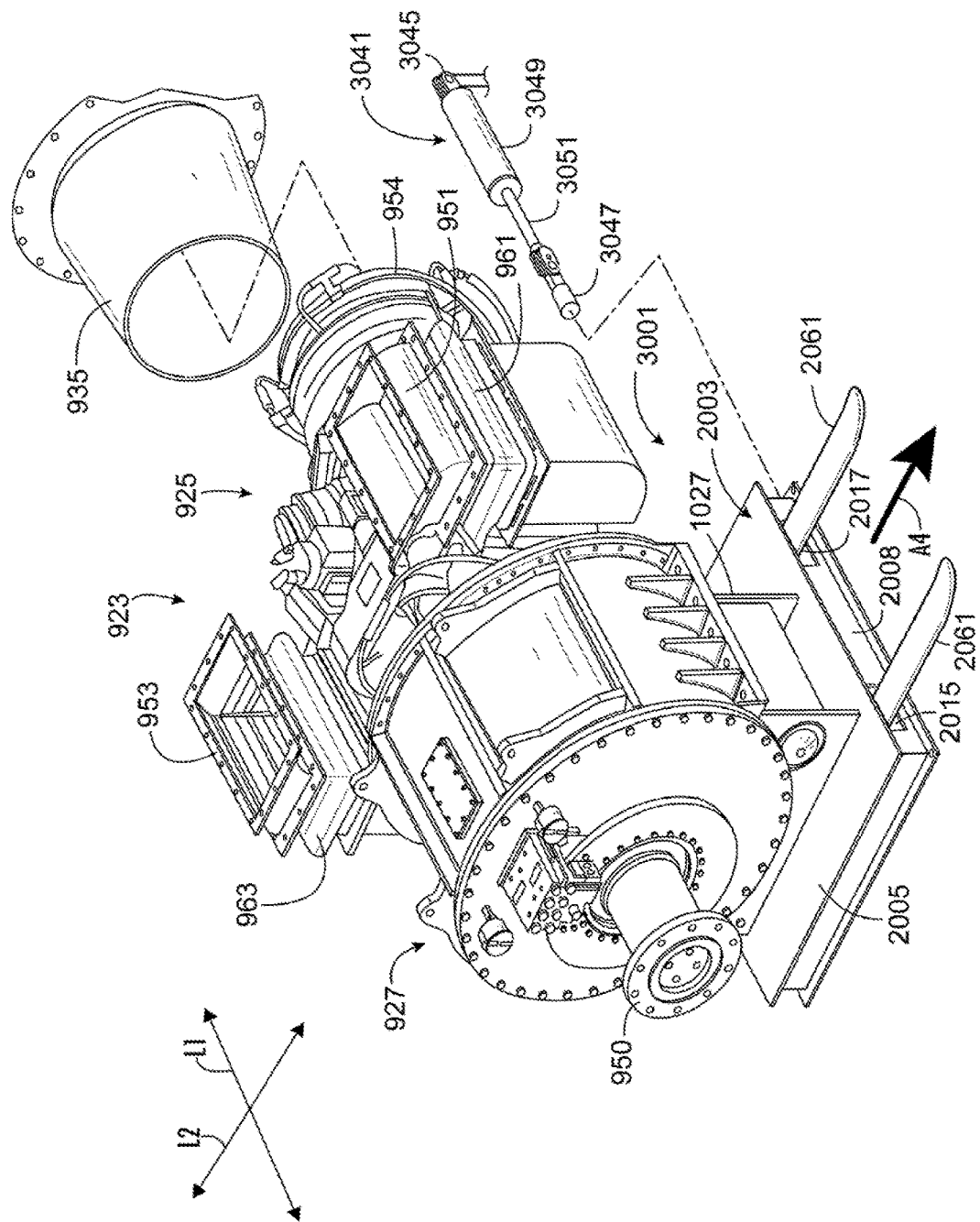
FIG. 62C is a perspective view of the DDU of FIG. 62B moved to a third position according to some embodiments of this disclosure.

FIGS. 61-62C illustrate a third embodiment of a DDU positioner assembly or system 3001 for positioning the direct drive unit 923 housed in the enclosure 921. In the illustrated embodiment, the DDU 923 includes a gas turbine engine 925 and a gearbox 927 identical to the first and second embodiments of the disclosure, but the DDU positioner assembly 3001 may be used to position a DDU that is alternatively configured without departing from the disclosure as will be understood by those skilled in the art. The DDU positioner assembly 3001 is generally similar to the DDU positioner assembly 2001 of the second embodiment, except the drive fasteners 2041 have been removed and an actuator 3041 is added to the DDU positioner assembly of the third embodiment. As such, like or similar reference numbers will be used to describe identical or similar features between the second and third embodiments.

As shown in FIG. 61, the DDU positioner assembly 3001 includes the actuator 3041 that has a first end 3045 connected to the base 941 of the enclosure 921 and a second end 3047 connected to the end 2010 of the platform 2003. In one embodiment, the actuator 3041 is a hydraulic cylinder that has a piston rod 3051 that is extendible from a cylinder body 3049 upon operation of the actuator. The actuator 3041 may be controlled by a manual control valve or the actuator may be configured for remote operation by connection to corresponding automated control valves. In the illustrated embodiment, one actuator 3041 is shown, but the DDU positioner assembly 3001 may include more than one actuator without departing from the scope of the disclosure. Further, the actuator 3041 may be otherwise located for attachment to the platform 2003 without departing from the scope of the disclosure.

FIGS. 62A-62C illustrate an exemplary method of removing the DDU 923 from the enclosure 921 utilizing the DDU positioner assembly 3001 of the second embodiment. The method is similar to the method of the utilizing the DDU positioner assembly 2001 of the second embodiment, in that the gas turbine engine 925 is disconnected from the air inlet ducting 937, the air exhaust ducting 935, and from other corresponding connections and components in a similar manner as discussed above for the first embodiment so that the gas turbine engine is free to move without damaging any of the operational connections and components needed for operation of the gas turbine engine. Further, the gearbox 927 is disconnected from the driveshaft 931 in a similar manner as the first embodiment, so that the DDU 923 has clearance for movement in the longitudinal direction L1 without interference with the driveshaft. Also, the DDU positioner assembly 3001 of the third embodiment includes the lubricator 2021 (FIG. 59) for providing lubrication to lubrication grooves 2027 of the lubrication portion 2025 of the base 941 to facilitate sliding of the platform 2003 in the longitudinal direction L1, so that the DDU positioner assembly of the third embodiment operates in a similar manner as the DDU positioner assembly 201 of the second embodiment.

FIG. 62A shows the direct drive unit 923 in the first/operating position. Once the gas turbine engine 925 is disconnected from the respective components and connections, and the gearbox 927 is disconnected from the driveshaft 931 and any other connections, the DDU positioner assembly 3001 is operated to position the DDU 923 for withdrawal from the enclosure 921. First, the fasteners 2011 fixedly attaching the platform 2003 to the base 941 are removed. The lubricator 2021 is operated to convey lubricant to the lubrication grooves 2027 of the lubrication portion 2025 of the base 941. After a sufficient amount of lubrication is located between the platform 2003 and the lubrication portion 2025 of the base 941, the actuator 3041 may be operated to move the platform 2003 in the longitudinal direction L1 to a second position (FIG. 62B). The extension of the piston rod 351 of the actuator 341 exerts a force on the platform 2003 to slide the platform in the longitudinal direction L1 in the direction of arrow A3 (FIG. 62B). The lubricant provided in the lubrication grooves 2027 and between the lubrication portion 2025 and the bottom surface 2007 of the platform reduces the sliding friction and allows the actuator 3041 to advance the platform in the direction of arrow A3. As with the previous embodiment, the platform 2003 is moved in the direction of arrow A3 a sufficient distance to allow access to the lifting openings 2015, 2017 by a lifting mechanism (e.g., forklift) 261 (FIG. 58C). The lifting mechanism 2061 may include a forklift or other lifting mechanism that may access the interior 946 of the enclosure through the enclosure access doors 945. The lifting mechanism 2061 is inserted into the lifting openings 2015, 2017 of the platform 2003, and the DDU 923 is lifted and/or slid in the direction of arrow A4. Prior to moving the platform 2003 in the direction of arrow A4, the actuator 3041 may be disconnected from the platform (FIG. 62C) with the first end 3047 of the actuator being separated from the platform and the second end 3045 of the actuator remaining attached to the floor 941 of the enclosure. Alternatively, the second end 3045 of the actuator 3041 may be disconnected from the floor 941 of the enclosure and the first end 3047 of the actuator may remain attached to the platform 2003, or both ends of the actuator may be disconnected and the actuator removed without departing from the enclosure.

The lifting mechanism 2061 may move the DDU 293 to the third position (FIG. 62C), or transfer the DDU onto an adjacent supporting structure or vehicle (e.g., maintenance inspection platform or other suitable structure), or completely remove the platform 203 and DDU 23 from the enclosure. The various method steps described herein for the method of positioning or removing the DDU 923 by operating the DDU positioner assembly 3001 may be otherwise performed in an alternative order or simultaneously, or more or less steps may be used without departing from the scope of the disclosure.

The embodiments disclosed herein include systems and methods for addressing many of the challenges associated with performing a hydraulic fracturing operation, including some challenges that are associated with the use of gas turbine engines to power the one or more pumps of the hydraulic fracturing system. While a number of embodiments of systems and components (and related methods) are described herein, it should be appreciated that other embodiments are contemplated that utilize a combination (including a subset) of features of one or more (or all) of the various embodiments that are particularly described. Thus, the description of the various embodiments should not be interpreted as limiting the particular combinations or sub-combinations of features that may be utilized in other embodiments according to this disclosure. Moreover, the embodiments disclosed herein may also be relevant to hydraulic fracturing system that utilize prime movers that are not gas turbine engines (such as diesel engines, electric motors, etc.). Thus, unless otherwise required, the embodiments disclosed herein may be employed to improve the operations of hydraulic fracturing systems that do and that do not employ gas turbine engines.

The preceding discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the discussion herein and in the claims, the terms "including" and "comprising" are used in an open-ended fashion, and thus should be interpreted to mean "including, but not limited to . . . ." Also, the terms "connect," "connects," "couple," "couples" and the like is intended to mean either an indirect or direct connection. Thus, if a first device couples or connects to a second device, that connection may be through a direct connection of the two devices, or through an indirect connection that is established via other devices, components, nodes, and connections.

This application is a continuation-in-part of U.S. Non-Provisional application Ser. No. 18/148,209, filed Dec. 29, 2022, titled "MOBILE GAS TURBINE INLET AIR CONDITIONING SYSTEM AND ASSOCIATED METHODS," which is a continuation of U.S. Non-Provisional application Ser. No. 17/954,118, filed Sep. 27, 2022, titled "MOBILE GAS TURBINE INLET AIR CONDITIONING SYSTEM AND ASSOCIATED METHODS," now U.S. Pat. No. 11,598,263, issued Mar. 7, 2023, which is a continuation of U.S. Non-Provisional application Ser. No. 17/403,373, filed Aug. 16, 2021, titled "MOBILE GAS TURBINE INLET AIR CONDITIONING SYSTEM AND ASSOCIATED METHODS," now U.S. Pat. No. 11,560,845, issued Jan. 24, 2023, which is a continuation of U.S. Non-Provisional application Ser. No. 17/326,711, filed May 21, 2021, titled "MOBILE GAS TURBINE INLET AIR CONDITIONING SYSTEM AND ASSOCIATED METHODS," now U.S. Pat. No. 11,156,159, issued Oct. 26, 2021, which is a continuation U.S. Non-Provisional application Ser. No. 17/213,802, filed Mar. 26, 2021, titled "MOBILE GAS TURBINE INLET AIR CONDITIONING SYSTEM AND ASSOCIATED METHODS," now U.S. Pat. No. 11,060,455, issued Jul. 13, 2021, which is a continuation of U.S. Non-Provisional application Ser. No. 16/948,289, filed Sep. 11, 2020, titled "MOBILE GAS TURBINE INLET AIR CONDITIONING SYSTEM AND ASSOCIATED METHODS," now U.S. Pat. No. 11,002,189, issued May 11, 2021, which claims priority to and the benefit of U.S. Provisional Application No. 62/704,565, filed May 15, 2020, titled "MOBILE GAS TURBINE INLET AIR CONDITIONING SYSTEM AND ASSOCIATED METHODS," and U.S. Provisional Application No. 62/900,291, filed Sep. 13, 2019, titled "MOBILE GAS TURBINE INLET AIR CONDITIONING SYSTEM," the disclosures of which are incorporated herein by reference in their entireties.

This application is also a continuation-in-part of U.S. Non-Provisional application Ser. No. 17/676,949, filed Feb. 22, 2022, titled "TURBINE ENGINE EXHAUST DUCT SYSTEM AND METHODS FOR NOISE DAMPENING AND ATTENUATION," which is a divisional of U.S. Non-Provisional application Ser. No. 17/519,827, filed Nov. 5, 2021, titled "TURBINE ENGINE EXHAUST DUCT SYSTEM AND METHODS FOR NOISE DAMPENING AND ATTENUATION," now U.S. Pat. No. 11,415,056, issued Aug. 16, 2022, which is a continuation of U.S. Non-Provisional application Ser. No. 17/502,120, filed Oct. 15, 2021, titled "METHODS FOR NOISE DAMPENING AND ATTENUATION OF TURBINE ENGINE," now U.S. Pat. No. 11,560,848, issued Jan. 24, 2023, which is a continuation of U.S. Non-Provisional application Ser. No. 17/498,916, filed Oct. 12, 2021, titled "TURBINE ENGINE EXHAUST DUCT SYSTEM AND METHODS FOR NOISE DAMPENING AND ATTENUATION," now U.S. Pat. No. 11,459,954, issued Oct. 4, 2022, which is a continuation of U.S. Non-Provisional application Ser. No. 17/182,325, filed Feb. 23, 2021, titled "TURBINE ENGINE EXHAUST DUCT SYSTEM AND METHODS FOR NOISE DAMPENING AND ATTENUATION," now U.S. Pat. No. 11,242,802, issued Feb. 8, 2022, which is a continuation of U.S. Non-Provisional application Ser. No. 16/948,290, filed Sep. 11, 2020, titled "TURBINE ENGINE EXHAUST DUCT SYSTEM AND METHODS FOR NOISE DAMPENING AND ATTENUATION," now U.S. Pat. No. 10,961,914, issued Mar. 30, 2021, which claims priority to and the benefit of, U.S. Provisional Application No. 62/704,567, filed May 15, 2020, titled "TURBINE ENGINE EXHAUST DUCT SYSTEM FOR NOISE DAMPENING AND ATTENUATION," and U.S. Provisional Application No. 62/899,957, filed Sep. 13, 2019, titled "TURBINE ENGINE EXHAUST DUCT SYSTEM FOR NOISE DAMPENING AND ATTENUATION," the disclosures of which are incorporated herein by reference in their entireties.

This is also a continuation-in-part of U.S. Non-Provisional application Ser. No. 18/108,821, filed Feb. 13, 2023, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," which is a continuation of U.S. Non-Provisional application Ser. No. 17/585,766, filed Jan. 27, 2022, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," which is a continuation of U.S. Non-Provisional application Ser. No. 17/469,970, filed Sep. 9, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,280,331, issued Mar. 22, 2022, which is a continuation of U.S. Non-Provisional application Ser. No. 17/363,151, filed Jun. 30, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,149,726, issued Oct. 19, 2021, which is a continuation of U.S. Non-Provisional application Ser. No. 17/213,562, filed Mar. 26, 2021, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,092,152, issued Aug. 17, 2021, which is a continuation of U.S. Non-Provisional application Ser. No. 16/948,291, filed Sep. 11, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," now U.S. Pat. No. 11,015,594, issued May 25, 2021, which claims priority to and the benefit of U.S. Provisional Application No. 62/704,560, filed May 15, 2020, titled "SYSTEMS AND METHOD FOR USE OF SINGLE MASS FLYWHEEL ALONGSIDE TORSIONAL VIBRATION DAMPER ASSEMBLY FOR SINGLE ACTING RECIPROCATING PUMP," and U.S. Provisional Application No. 62/899,963, filed Sep. 13, 2019, titled "USE OF SINGLE MASS FLYWHEEL ALONGSIDE TORSIONAL VIBRATION DAMPER SYSTEM FOR SINGLE ACTING RECIPROCATING PUMP," the disclosures of which are incorporated herein by reference in their entireties.

This application is also a continuation-in-part of U.S. Non-Provisional application Ser. No. 18/116,383, filed Mar. 2, 2023, titled "POWER SOURCES AND TRANSMISSION NETWORKS FOR AUXILIARY EQUIPMENT ONBOARD HYDRAULIC FRACTURING UNITS AND ASSOCIATED METHODS," which is a continuation of U.S. Non-Provisional application Ser. No. 17/976,095, filed Oct. 28, 2022, titled "POWER SOURCES AND TRANSMISSION NETWORKS FOR AUXILIARY EQUIPMENT ONBOARD HYDRAULIC FRACTURING UNITS AND ASSOCIATED METHODS," which is a continuation of U.S. Non-Provisional application Ser. No. 17/555,815, filed Dec. 20, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,530,602, issued Dec. 20, 2022, which is a continuation of U.S. Non-Provisional application Ser. No. 17/203,002, filed Mar. 16, 2021, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 11,236,739, issued Feb. 1, 2022, which is a divisional of U.S. Non-Provisional application Ser. No. 16/946,079, filed Jun. 5, 2020, titled "POWER SOURCES AND TRANSMISSION NETWORKS FOR AUXILIARY EQUIPMENT ONBOARD HYDRAULIC FRACTURING UNITS AND ASSOCIATED METHODS," now U.S. Pat. No. 10,989,180, issued Apr. 27, 2021, which claims the benefit of and priority to U.S. Provisional Patent Application No. 62/899,971, filed Sep. 13, 2019, titled "AUXILIARY DRIVE SYSTEMS AND ALTERNATIVE POWER SOURCES," the disclosures of which are incorporated herein by reference in their entireties.

This application is also continuation-in-part of U.S. Non-Provisional application Ser. No. 18/147,880, filed Dec. 29, 2022, titled "DIRECT DRIVE UNIT REMOVAL SYSTEM AND ASSOCIATED METHODS," which is a continuation of U.S. Non-Provisional application Ser. No. 17/936,885, filed Sep. 30, 2022, titled "DIRECT DRIVE UNIT REMOVAL SYSTEM AND ASSOCIATED METHODS," now U.S. Pat. No. 11,578,660, issued Feb. 14, 2023, which is a continuation of U.S. Non-Provisional application Ser. No. 17/883,693, filed Aug. 9, 2022, titled "DIRECT DRIVE UNIT REMOVAL SYSTEM AND ASSOCIATED METHODS," now U.S. Pat. No. 11,512,642, issued Nov. 29, 2022, which is a continuation of U.S. Non-Provisional application Ser. No. 17/808,792, filed Jun. 24, 2022, titled "DIRECT DRIVE UNIT REMOVAL SYSTEM AND ASSOCIATED METHODS," now U.S. Pat. No. 11,473,503, issued Oct. 18, 2022, which is a continuation of U.S. Non-Provisional application Ser. No. 17/720,390, filed Apr. 14, 2022, titled "DIRECT DRIVE UNIT REMOVAL SYSTEM AND ASSOCIATED METHODS," now U.S. Pat. No. 11,401,865, issued Aug. 2, 2022, which is a continuation of U.S. Non-Provisional application Ser. No. 17/671,734, filed Feb. 15, 2022, titled "DIRECT DRIVE UNIT REMOVAL SYSTEM AND ASSOCIATED METHODS," now U.S. Pat. No. 11,346,280, issued May 31, 2022, which is a continuation of U.S. Non-Provisional application Ser. No. 17/204,338, filed Mar. 17, 2021, titled "DIRECT DRIVE UNIT REMOVAL SYSTEM AND ASSOCIATED METHODS," now U.S. Pat. No. 11,319,878, issued May 3, 2022, which is a continuation of U.S. Non-Provisional application Ser. No. 17/154,601, filed Jan. 21, 2021, titled "DIRECT DRIVE UNIT REMOVAL SYSTEM AND ASSOCIATED METHODS," now U.S. Pat. No. 10,982,596, issued Apr. 20, 2021, which is a divisional of U.S. Non-Provisional application Ser. No. 17/122,433, filed Dec. 15, 2020, titled "DIRECT DRIVE UNIT REMOVAL SYSTEM AND ASSOCIATED METHODS," now U.S. Pat. No. 10,961,912, issued Mar. 30, 2021, which is a divisional of U.S. Non-Provisional application Ser. No. 15/929,924, filed May 29, 2020, titled "DIRECT DRIVE UNIT REMOVAL SYSTEM AND ASSOCIATED METHODS," now U.S. Pat. No. 10,895,202, issued Jan. 19, 2021, which claims the benefit of and priority to U.S. Provisional Application No. 62/899,975, filed Sep. 13, 2019, titled "TURBINE REMOVAL SYSTEM," the disclosures of which are incorporated herein by reference in their entireties.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed is:

1. A pumping unit, comprising:
   a gas turbine engine;
   an enclosure housing the gas turbine engine;
   an exhaust assembly connected to the gas turbine engine;
   an air intake duct connected to the gas turbine engine;
   an air treatment system connected to the air intake duct, the air treatment system comprising one or more inlet pre-cleaners configured to eject debris, each of the one or more inlet pre-cleaners having a cylindrical tubular portion configured to channel air toward the air intake duct;
   a gearbox operatively coupled to the gas turbine engine;
   a drive shaft having a first end and a second end, wherein the first end of the drive shaft is operatively coupled to the gearbox; and
   a pump comprising an input shaft operatively coupled to the second end of the drive shaft, wherein the gas turbine engine, the gearbox, the drive shaft, and the pump are disposed along a longitudinal axis of the pumping unit.

2. The pumping unit of claim 1, further comprising a trailer configured to support both the pump and the enclosure.

3. The pumping unit of claim 1, wherein the gas turbine engine is a dual fuel, dual shaft gas turbine engine.

4. The pumping unit of claim 1, wherein the gas turbine engine is cantilever mounted to the gearbox and the gearbox is supported by a floor of the enclosure.

5. The pumping unit of claim 1, further comprising a brake configured to stop rotation of the drive shaft.

6. The pumping unit of claim 1, wherein a longitudinal axis of the drive shaft is offset from a longitudinal axis of the input shaft of the pump.

7. The pumping unit of claim 1, further comprising an electric generator mechanically linked to the gearbox, the electric generator configured to convert electricity from mechanical energy generated by the gas turbine engine.

8. The pumping unit of claim 1, further comprising one or more torsional vibration dampers operably connected to the input shaft of the pump and configured to reduce tortional resonance within the gas turbine engine, the gearbox, the drive shaft, or the pump.

9. The pumping unit of claim 2, further comprising:
   auxiliary equipment comprising lubrication and cooling equipment driven by hydraulic motors to support operation of the hydraulic fracturing unit including the pump; and
   one or more hydraulic power arrangements configured to power the auxiliary equipment, each hydraulic power arrangement comprising a hydraulic power source including an electric motor configured to drive a plurality of pumps via a hydraulic pump drive to generate hydraulic power.

10. The pumping unit of claim 9, wherein the auxiliary equipment is powered by an electric power arrangement, the electric power arrangement comprising an electric motor located on a gooseneck area of the trailer, wherein the electric motor is configured to drive the auxiliary equipment.

11. A pumping unit, comprising:
    a chassis;
    an enclosure disposed on the chassis, the enclosure housing a gas turbine engine and a gearbox operatively coupled to the gas turbine engine, wherein the enclosure comprises:
       a first lateral side;
       a second lateral side; and
       a door mounted on the first lateral side proximate to the gas turbine engine;
    an exhaust assembly connected to the gas turbine engine;
    an air intake duct connected to the gas turbine engine;
    an air treatment system connected to the air intake duct, the air treatment system comprising one or more inlet pre-cleaners configured to eject debris particles via inertia of the debris particles;
    a drive shaft having a first end and a second end, wherein the first end of the drive shaft is operatively coupled to the gearbox; and
    a pump disposed on the chassis, the pump comprising an input shaft operatively coupled to the second end of the drive shaft, wherein the gas turbine engine, the gearbox, the drive shaft, and the pump are disposed along a longitudinal axis of the pumping unit.

12. The pumping unit of claim 11, wherein the gas turbine engine is a dual fuel, dual shaft gas turbine engine.

13. The pumping unit of claim 11, wherein the gas turbine engine is cantilever mounted to the gearbox and the gearbox is supported by a floor of the enclosure.

14. The pumping unit of claim 11, further comprising a brake configured to stop rotation of the drive shaft.

15. The pumping unit of claim 11, wherein a longitudinal axis of the drive shaft is offset from a longitudinal axis of the input shaft of the pump.

16. The pumping unit of claim 11, further comprising one or more torsional vibration dampers operably connected to the input shaft of the pump and configured to reduce tortional resonance within the gas turbine engine, the gearbox, the drive shaft, or the pump.

17. The pumping unit of claim 11, further comprising a fuel line connected to the pumping unit and configured to supply field gas from a fuel source to the gas turbine engine.

18. The pumping unit of claim 11, further comprising:
auxiliary equipment comprising lubrication and cooling equipment driven by hydraulic motors to support operation of the hydraulic fracturing unit including the pump; and
one or more hydraulic power arrangements configured to power the auxiliary equipment, each hydraulic power arrangement comprising a hydraulic power source including an electric motor configured to drive a plurality of pumps via a hydraulic pump drive to generate hydraulic power,
wherein the auxiliary equipment is powered by an electric power arrangement, the electric power arrangement comprising an electric motor configured to drive the auxiliary equipment.

19. A hydraulic fracturing system comprising:
a plurality of hydraulic fracturing units;
a fuel line configured to supply fuel from a fuel source to the plurality of hydraulic fracturing units; and
a first hydraulic fracturing unit of the plurality of hydraulic fracturing units comprising:
  a gas turbine engine;
  an enclosure housing the gas turbine engine;
  an exhaust assembly connected to the gas turbine engine;
  an air intake duct connected to the gas turbine engine;
  an air treatment system connected to the air intake duct, the air treatment system comprising one or more inlet pre-cleaners configured to eject debris;
  a gearbox operatively coupled to the gas turbine engine;
  a drive shaft having a first end and a second end, wherein the first end of the drive shaft is operatively coupled to the gearbox; and
  a pump comprising an input shaft operatively coupled to the second end of the drive shaft, wherein the gas turbine engine, the gearbox, the drive shaft, and the pump are disposed along a longitudinal axis of the pump, and wherein a longitudinal axis of the drive shaft is offset from a longitudinal axis of the input shaft of the pump.

20. The hydraulic fracturing system of claim 19, wherein the first hydraulic fracturing unit further comprises:
auxiliary equipment comprising lubrication and cooling equipment driven by hydraulic motors to support operation of the hydraulic fracturing unit including the pump; and
one or more hydraulic power arrangements configured to power the auxiliary equipment, each hydraulic power arrangement comprising a hydraulic power source including an electric motor configured to drive a plurality of pumps via a hydraulic pump drive to generate hydraulic power.

21. The hydraulic fracturing system of claim 19, wherein the gas turbine engine is a dual fuel, dual shaft gas turbine engine.

22. The hydraulic fracturing system of claim 19, wherein the fuel line is connected to the pump and configured to supply field gas from a fuel source to the gas turbine engine.

23. The hydraulic fracturing system of claim 20, wherein the auxiliary equipment is powered by an electric power arrangement, the electric power arrangement comprising an electric motor located on a gooseneck area of a trailer, wherein the electric motor configured to drive the auxiliary equipment.

* * * * *